United States Patent
Takahashi

(10) Patent No.: US 8,115,941 B2
(45) Date of Patent: Feb. 14, 2012

(54) IMAGE FORMING APPARATUS AND PRINT CONTROLLING METHOD FOR THE SAME

(75) Inventor: Yasuhiro Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 12/167,043

(22) Filed: Jul. 2, 2008

(65) Prior Publication Data
US 2009/0021765 A1  Jan. 22, 2009

(30) Foreign Application Priority Data
Jul. 5, 2007 (JP) .................. 2007-177634

(51) Int. Cl.
*G06K 15/00* (2006.01)
(52) U.S. Cl. ...................... 358/1.14; 399/366
(58) Field of Classification Search .......... 358/1.1–1.16, 358/401–498
See application file for complete search history.

(56) References Cited

U.S. PATENT DOCUMENTS

| 2002/0135810 | A1 | 9/2002 | Ikenoue et al. |
| 2003/0179399 | A1 | 9/2003 | Matsunoshita |
| 2008/0101651 | A1* | 5/2008 | Matsunoshita ............... 382/100 |

FOREIGN PATENT DOCUMENTS

| JP | 58-216267 A | 12/1983 |
| JP | 61-285578 A | 12/1986 |
| JP | 04-227365 A | 8/1992 |
| JP | 05-244412 A | 9/1993 |
| JP | 06-020027 A | 1/1994 |
| JP | 07-058950 A | 3/1995 |
| JP | 2003-280469 A | 10/2003 |
| JP | 2004-336806 A | 11/2004 |
| JP | 2005-079628 A | 3/2005 |
| JP | 2006-013627 A | 1/2006 |
| JP | 2007-088827 A | 4/2007 |

* cited by examiner

*Primary Examiner* — Benny Tieu
*Assistant Examiner* — Michael Tzeng
(74) *Attorney, Agent, or Firm* — Canon USA Inc IP Division

(57) ABSTRACT

An image forming apparatus includes: a combining unit configured to combine a document image and a coded image; a setting determining unit configured to determine whether a setting for combining a document image including a previously combined coded image and an other coded image is made when a reproduction of the document image is instructed; and a prohibiting unit configured to prohibit the combining unit from combining the document image including the previously combined coded image and the other coded image according to the setting when the result of the determination indicates that the setting is made.

27 Claims, 43 Drawing Sheets

CASE WHERE DOUBLE-EMBEDDING DOES NOT OCCUR

FIG. 12

COPY PROHIBITION SETTING

- ⦿ PERMIT COPYING
- ◯ PROHIBIT COPYING
- ◯ SET COPY PERMITTING CONDITIONS

[ OK ]  [ CANCEL ]

FIG. 13

TRACKING INFORMATION SETTING

- ☒ USER NAME
- ☐ TIME

[ OK ]  [ CANCEL ]

FIG. 17

| AREA | PURPOSE | ANALYSIS SPEED | DATA SIZE |
|---|---|---|---|
| FIRST AREA | REALTIME DETECTION INFORMATION SUCH AS COPY RESTRICTION | SPEED SUBSTANTIALLY EQUAL TO SCAN SPEED | SMALL |
| SECOND AREA | NON-REALTIME DETECTION INFORMATION SUCH AS TRACKING INFORMATION | COMPARATIVELY LOW SPEED | LARGE |

010,111,110,011 = 2,7,6,3

2,7,6,3 = 010,111,110,011

CASE WHERE DOUBLE-EMBEDDING DOES NOT OCCUR

CASE WHERE DOUBLE-EMBEDDING OCCURS

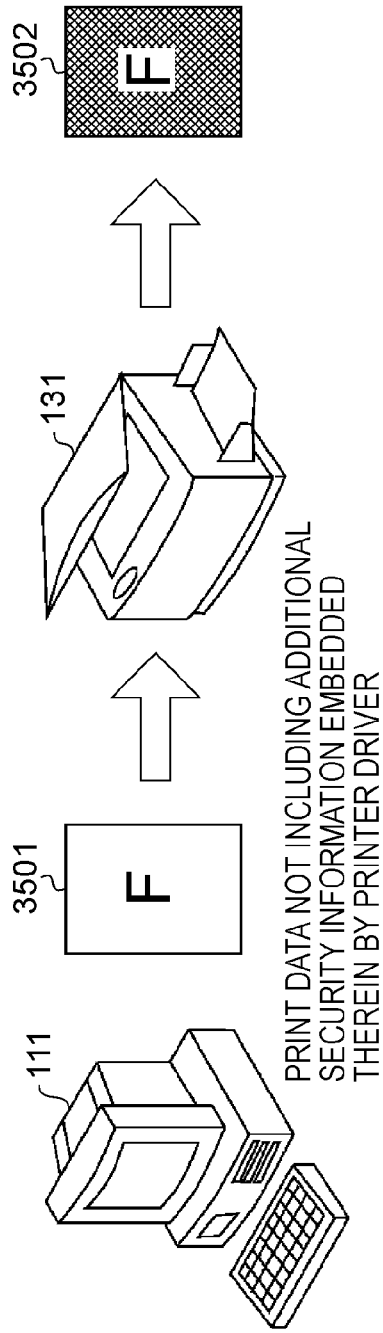
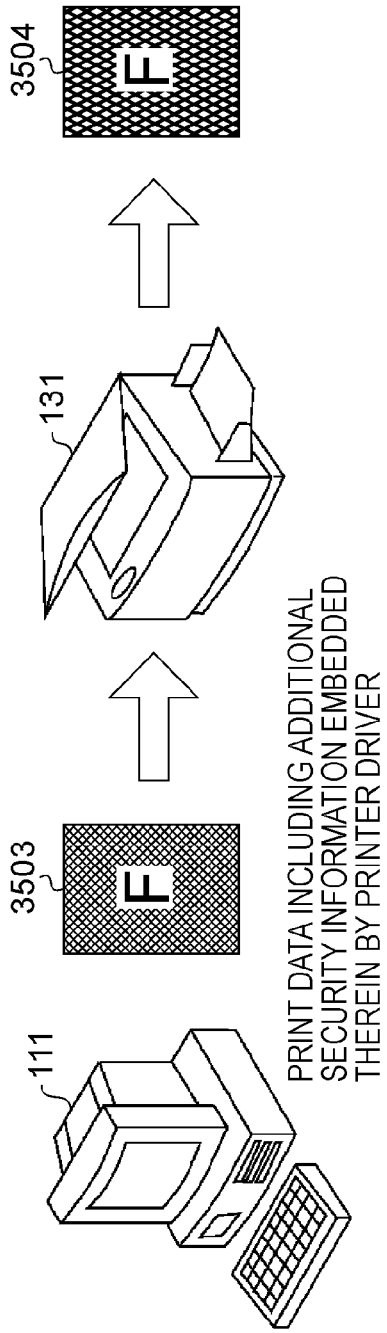

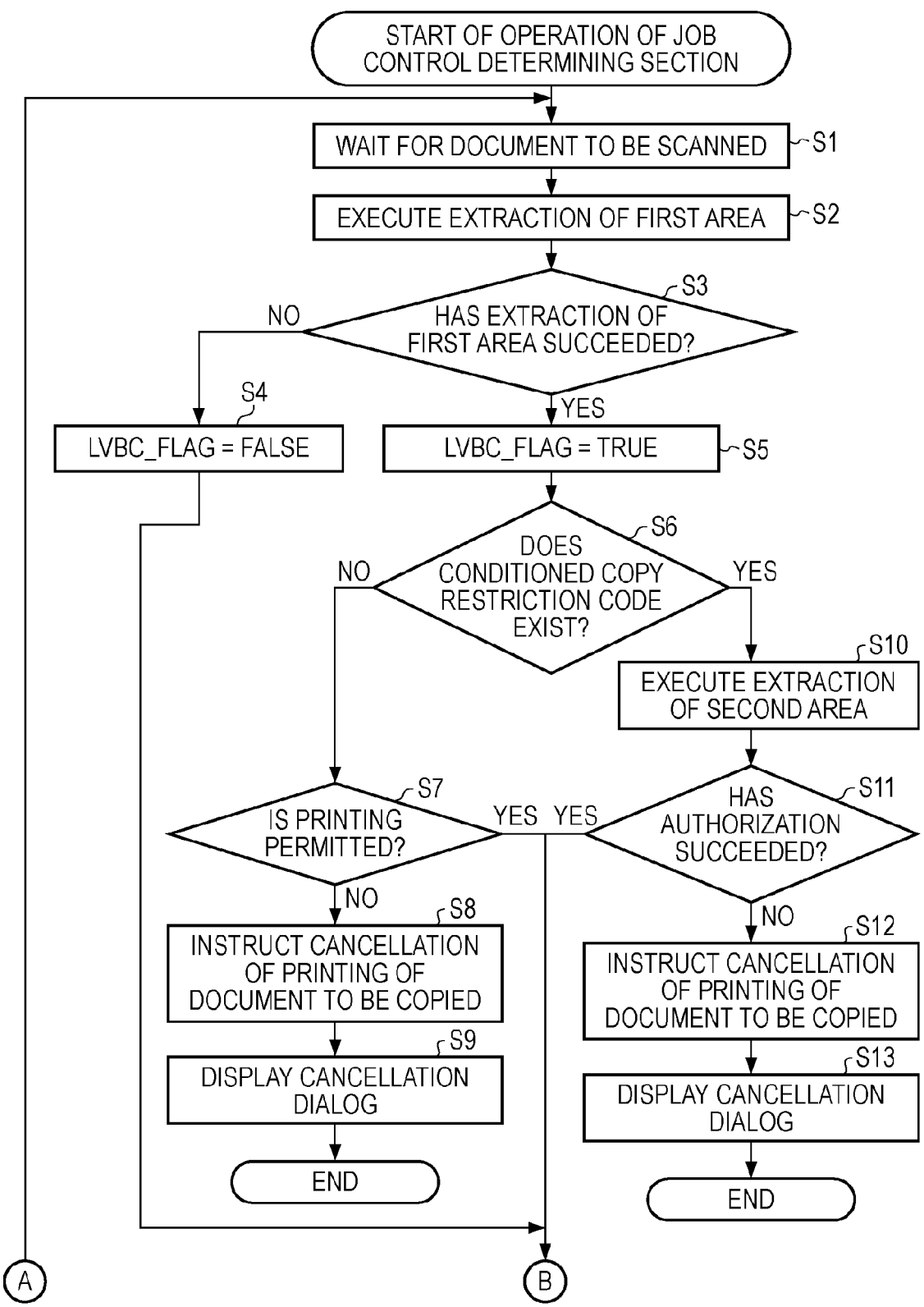

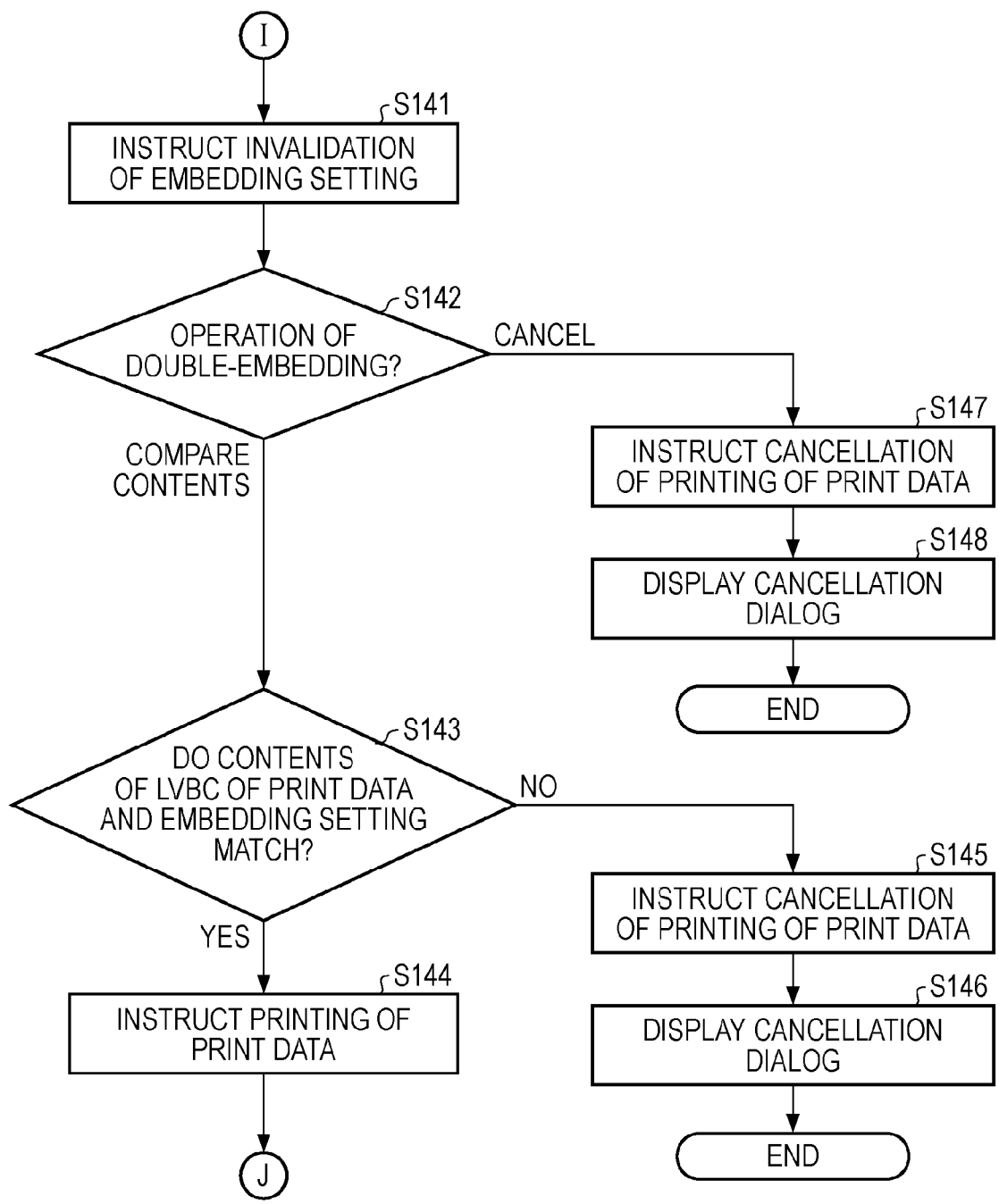

IMAGE FORMING APPARATUS AND PRINT CONTROLLING METHOD FOR THE SAME

BACKGROUND OF THE INVENTION

1. Field of the Invention

The present invention relates to an image forming apparatus that prints a document image according to a print instruction and a print controlling method for the same.

2. Description of the Related Art

With promotion of information technology (IT) in offices, interest for security has been rising recently. For example, as seen in repeatedly caused leakage of client information held by companies, confidential information of organizations and privacy of individuals are threatened, which has become a big social issue.

To cope with such an issue, an IT mechanism for providing an access right to electronic confidential information or a monitoring apparatus at firewall is introduced to prevent the confidential information from being leaked to outside of the companies. Alternatively, measures of prohibiting portable media, such as a notebook personal computer (PC) and a universal serial bus (USB) flash memory, from being carried in or out are taken.

By taking the above-described measures using the IT mechanism, the electronic confidential information can be protected to some extent. This is because the electronic information can be referred to only using the IT and it is easier to introduce the IT mechanism thereto.

On the other hand, when confidential information is printed on paper media with an image forming apparatus or the like, carrying out of a sheet having confidential information of organizations or private information of individuals printed thereon can escape the above-described IT mechanism. Accordingly, it is more difficult to confirm and prohibit such a sheet from being carried out than to restrict electronic confidential information from being carried out, which makes it difficult to maintain the security.

To cope with such an issue, various measures for information leakage have been considered. As a first measure for information leakage, a system that embeds tracking information on paper media in addition to a main image using known information embedding techniques, such as the digital watermarking and the 2-dimensional barcode, at the time of printing has been suggested.

Even if information leakage involving paper media occurs, this system can extract the above-described tracking information by analyzing the leaked document. Accordingly, since the responsibility for careless carrying out of a document can be investigated using the tracking information, a deterrent effect can be expected.

Furthermore, as a second measure for information leakage, a system for embedding copy restriction information for prohibiting copying in paper media using known information embedding techniques, such as the digital watermarking and the 2-dimensional barcode, at the time of printing has been suggested.

In this system, a compatible image forming apparatus extracts the above-described copy restriction information to detect whether copying is permitted at the time of execution of a copy operation, thereby being able to control continuance or cancellation of the copy operation for each page.

A system for embedding, as condition information, password information and permitted user information as well as copy restriction information simply indicating whether copying is permitted and for permitting only specific users to copy a document has been suggested. For example, Japanese Patent Laid-Open No. 2003-280469 disclosing a system of this kind is known. Hereinafter, the above-described tracking information and copy restriction information are collectively referred to as "additional security information".

In the related art, such additional security information can be unconditionally embedded regardless of whether additional security information has previously been embedded in a document.

However, when a plurality of pieces of additional security information is embedded in a document, an image forming apparatus according to the related art may be unable to extract the additional security information due to interference of the plurality of pieces of additional security information.

SUMMARY OF THE INVENTION

An image forming apparatus according to an aspect of the present invention includes: a combining unit configured to combine a document image and a coded image; a setting determining unit configured to determine whether a setting for combining a document image including a previously combined coded image and an other coded image is made when a reproduction of the document image is instructed; and a prohibiting unit configured to prohibit the combining unit from combining the document image including the previously combined coded image and the other coded image according to the setting when the result of the determination indicates that the setting is made.

Further features and aspects of the present invention will become apparent from the following description of exemplary embodiments with reference to the attached drawings.

BRIEF DESCRIPTION OF THE DRAWINGS

FIG. 12 is a GUI showing copy prohibition setting dialog 3101 displayed in response to pressing of a copy prohibition setting button 3002.

FIG. 13 is a GUI showing a tracking information setting dialog 3201 displayed in response to pressing of a tracking information setting button 3003.

FIG. 17 is a table showing characteristic differences between a first area and a second area.

FIGS. 35A and 35B are diagrams illustrating double-embedding of additional security information in a print job as in the case of a copy job.

FIG. 36 is a flowchart showing a procedure of an operation performed by a job control determining section 903.

FIG. 50 is a flowchart showing a procedure of an operation performed by a job control determining section 903 according to a result of comparison of contents of additional security information following a flowchart of FIG. 49.

DESCRIPTION OF THE EMBODIMENTS

An image forming apparatus according to exemplary embodiments of the present invention, a print controlling method for the same, an image forming system, a program, and a storage medium will be described with reference to the attached drawings. The image forming apparatus according to the exemplary embodiments can be applied to a network printing system.

First Exemplary Embodiment

Overall Arrangement of System

Figure 1:
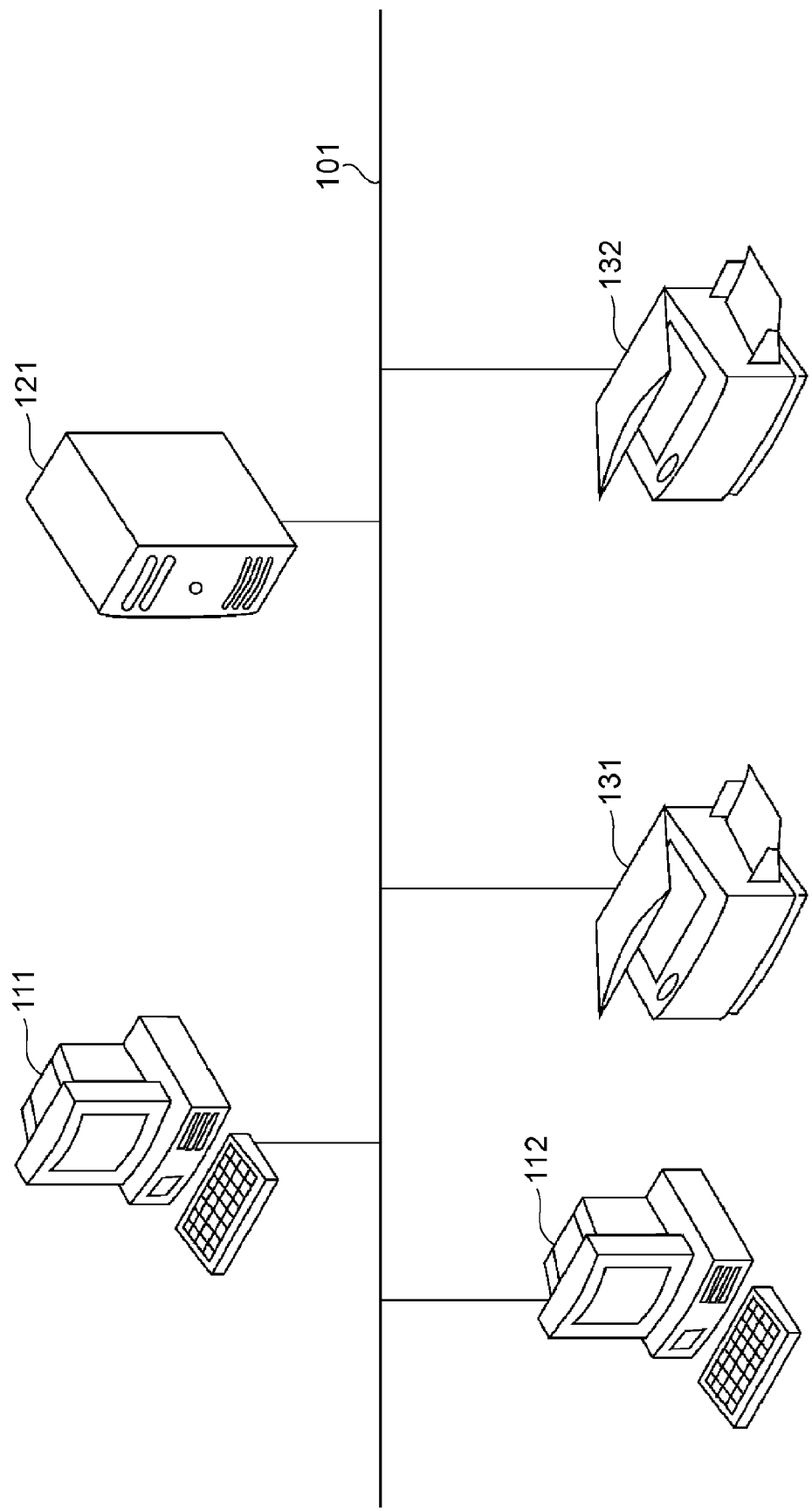
FIG. 1 is a diagram showing an overall arrangement of a network printing system in accordance with a first exemplary embodiment of the present invention.

FIG. 1 is a diagram showing an overall arrangement of a network printing system according to a first exemplary embodiment of the present invention. The network printing system includes client personal computers (PC) 111 and 112, a print server 121, and image forming apparatuses 131 and 132 having a copy function and a printer function. These apparatuses are connected to each other via a local area network (LAN) 101 and have a function to communicate with each other via the LAN 101.

In response to a user operation of the client PC 111 or 112 (corresponding to an image processing apparatus), the client PC 111 or 112 generates print data and sends the print data to the print server 121. The print server 121 further sends the received print data to the image forming apparatus 131 or 132. The image forming apparatus 131 or 132 interprets and converts the received print data into an image and prints the image on a piece of paper to create a printed material.

The above-described configuration is only an example and the print server 121 may be omitted. In that case, the client PC 111 or 112 directly sends the print data to the image forming apparatus 131 or 132. At this time, the apparatuses may be connected to each other using a known local interface, such as IEEE 1284 or a universal serial bus (USB), instead of the LAN 101.

[Instruction of Embedding Copy Restriction Information or Printed-Output Tracking Information and Copy Restriction Operation]

Figure 2:
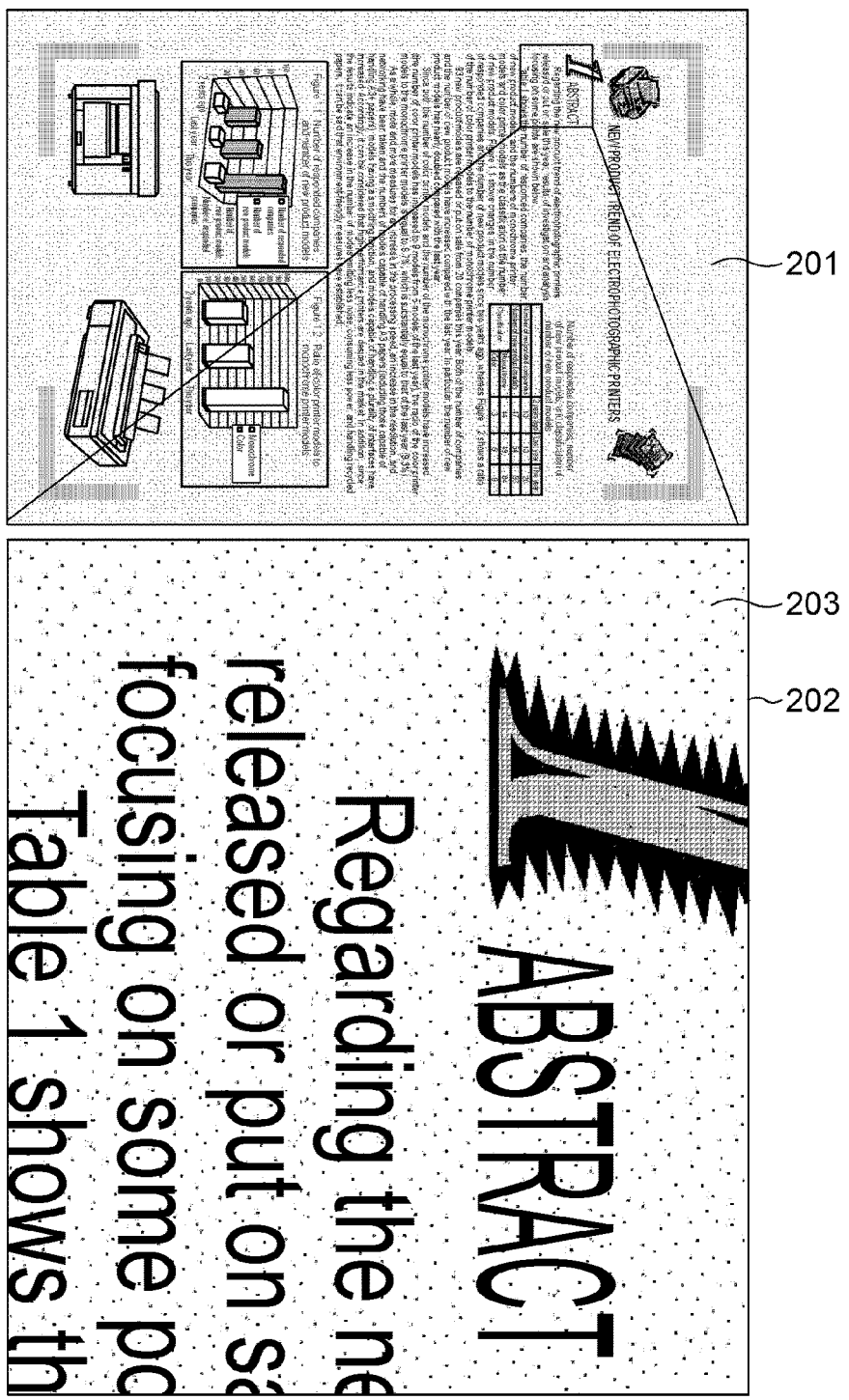
FIG. 2 is a diagram showing an example of a printed output including a background image containing copy prohibition information or printed-output tracking information embedded therein.
Figure 3:
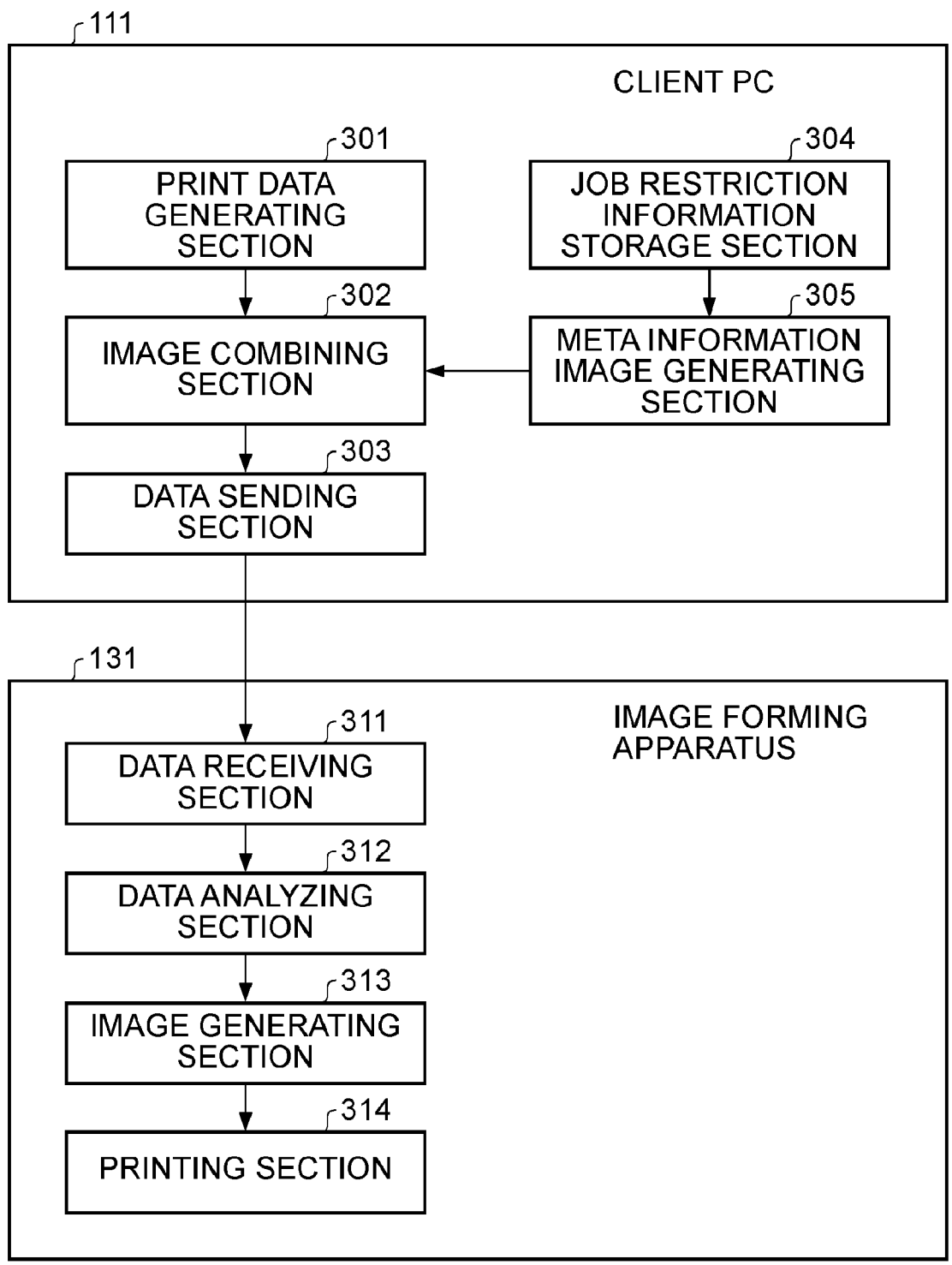
FIG. 3 is a diagram showing a functional configuration of a network printing system when an implementation method for allowing a client PC to generate a background image of a printed output is employed.
Figure 4:
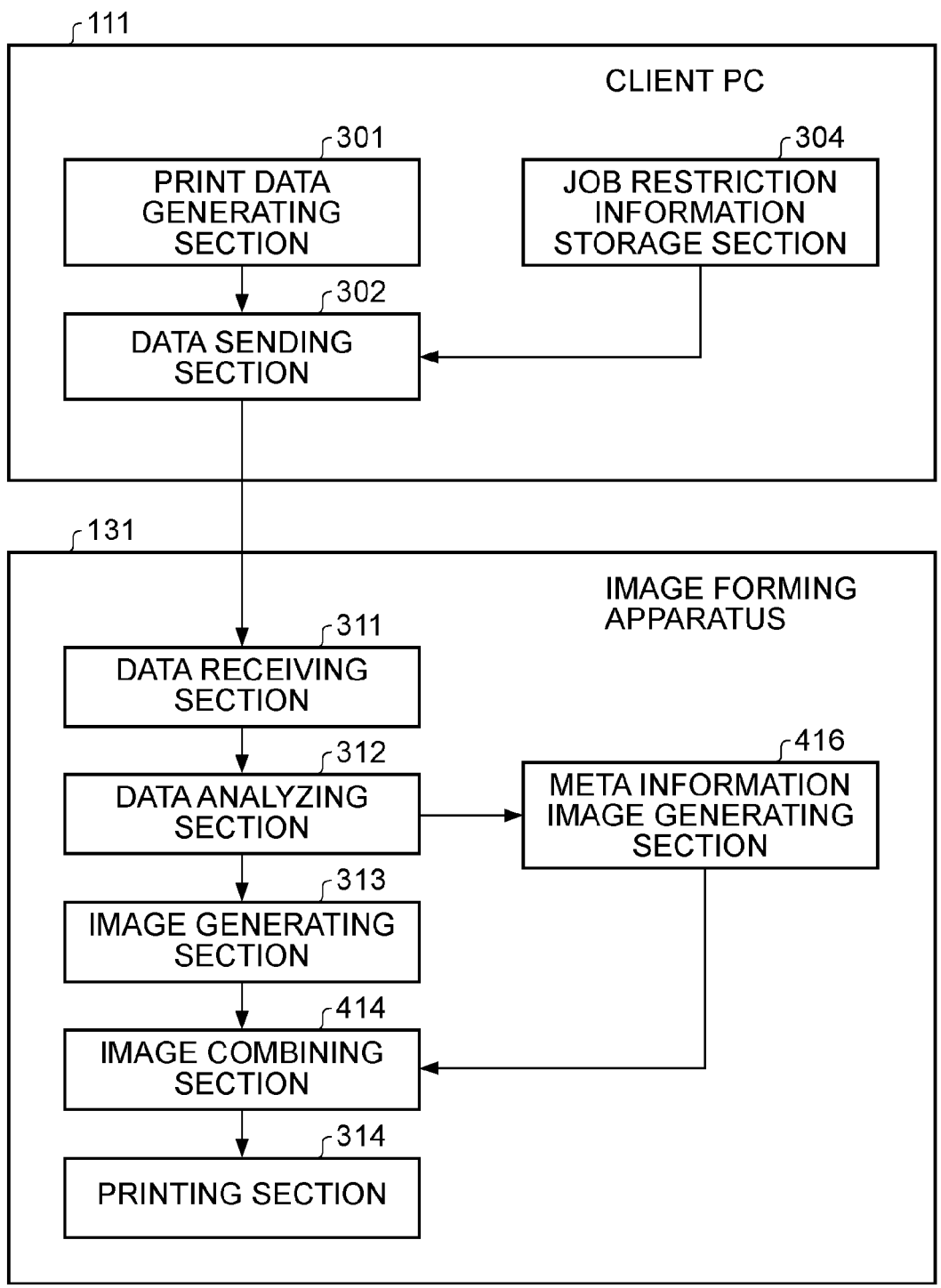
FIG. 4 is a diagram showing a functional configuration of a network printing system when an implementation method for allowing an image forming apparatus to generate a background image of a printed output is employed.

An operation of the entire system will be briefly described first. Referring to the configuration shown in FIG. 1, a user operates the client PC 111 or 112 to instruct embedding of copy prohibition information or printed-output tracking information in a printed output. In response to this instruction, the image forming apparatus 131 or 132 embeds the copy prohibition information or the printed-output tracking information in a created printed output as a background image. FIG. 2 is a diagram showing an example of a printed output including a background image having the copy prohibition information or the printed-output tracking information embedded therein. A detailed description regarding FIG. 2 will be given later. In addition, a specific operation from a user's operation to creation of a printed output will be described later with reference to FIGS. 3 and 4. FIG. 3 is a diagram showing a functional configuration of a network printing system when an implementation method for allowing a client PC to generate a background image of a printed output is employed. FIG. 4 is a diagram showing a functional configuration of a network printing system when an implementation method for allowing an image forming apparatus to generate a background image of a printed output is employed.

As shown in FIG. 2, when a user attempts to copy a document including copy restriction information using the image forming apparatus 131 or 132, the image forming apparatus 131 or 132 detects inclusion of the copy restriction information in the document and cancels the copy operation. This prevents important document from being copied.

Although the operation of the entire system has been briefly described in the above, a series of these operations will be described more specifically.

[Specification of Copy Control Information or Tracking Information in Client PC]

Figure 5:
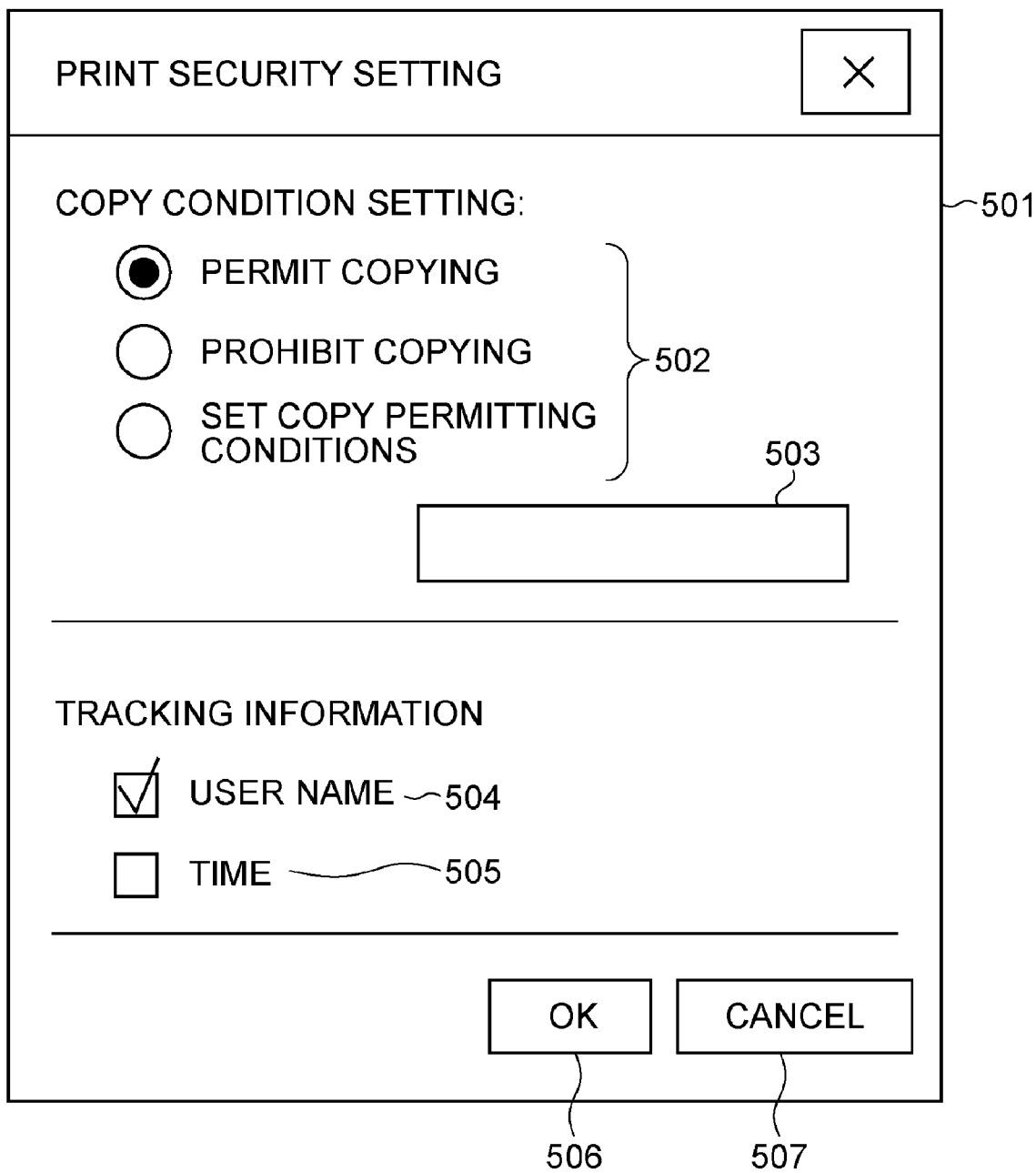
FIG. 5 is a diagram showing one of printer driver setting screens employed in a client personal computer (PC) 111 or 112.

FIG. 5 is a diagram showing one of printer driver setting screens employed in the client PC 111 or 112. A user performs operations on a print security setting dialog 501 to select security settings to be embedded in a printed output. The print security setting dialog 501 is mainly divided into two parts. The upper half is a part where a copy restriction setting is made, whereas the lower half is a part where a tracking information setting is made.

The upper half part where the copy restriction setting is made will be described first. In this exemplary embodiment, a user operates radio buttons 502 to select one of three setting options of "permit copying", "(always) prohibit copying", and "set copy permitting conditions (cancel copy prohibition in response to input of a password)". If the third option "cancel copy prohibition in response to input of a password" is selected, a password input field 503 is activated to receive the input and a user can input a password for canceling copy prohibition.

The lower half part of the print security setting dialog 501 where the tracking information setting is made will now be described. In this exemplary embodiment, two checkboxes 504 and 505 are provided. A user checks the checkboxes 504 and 505, thereby instructing embedding of a user name and time information, respectively.

Although these two kinds of tracking information have been shown in this exemplary embodiment, any give kinds of tracking information can be included as long as the information is held in the image forming apparatus. For example, an internet protocol (IP) address and a media access control (MAC) address of the image forming apparatus 131 and a division name of an installed place or an office may be attached as the tracking information.

The above-described various kinds of information are stored in a job restriction information storage section 304 (see FIG. 3) in response to a user's pressing of an OK button 506.

[Copy Restriction Operation in Image Forming Apparatus]

An example screen displayed upon the image forming apparatus 131 or 132 detecting inclusion of copy restriction information in a document will now be described. This screen is displayed on an operation unit 812 (see FIG. 8).

Figure 6:
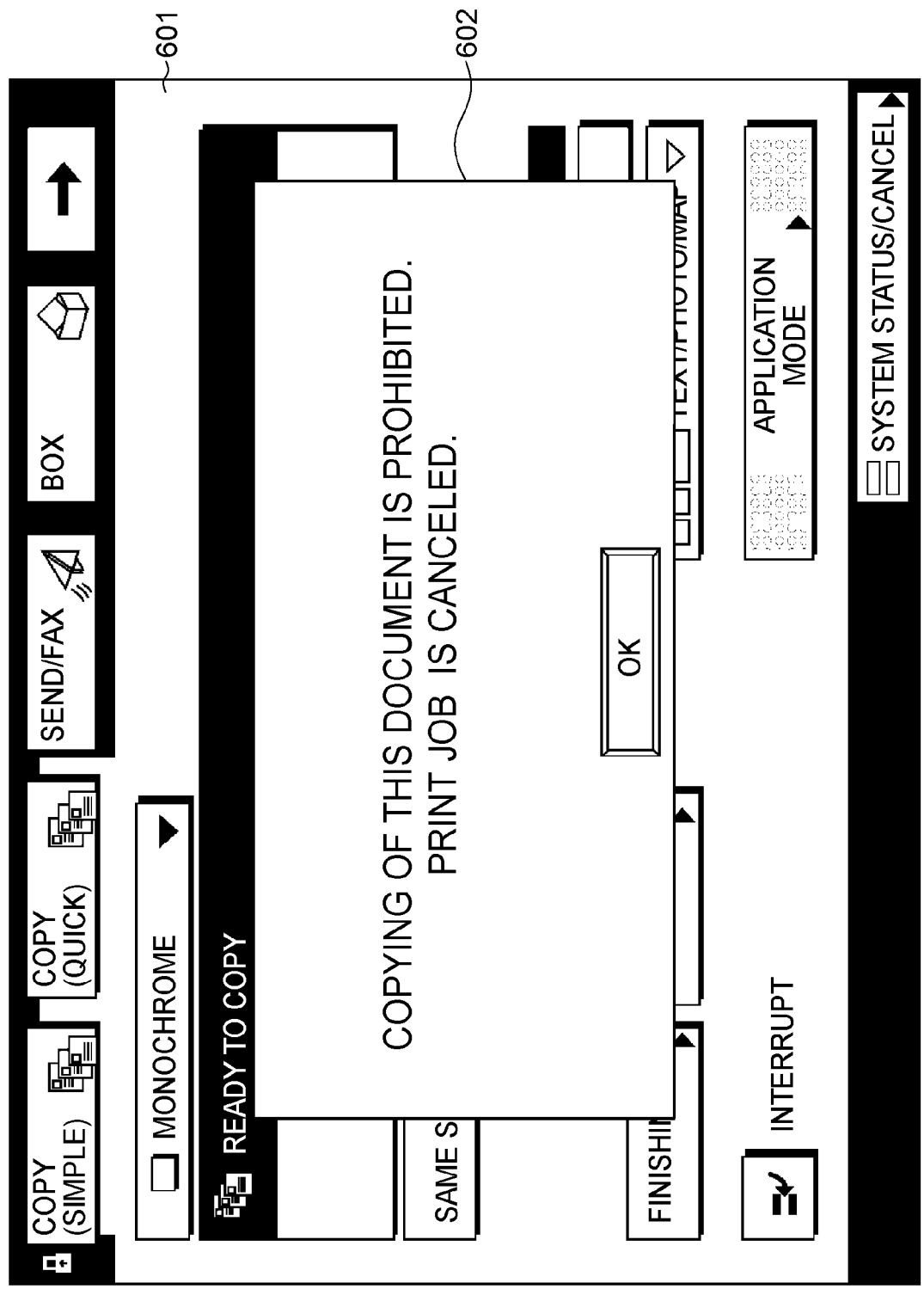
FIG. 6 is a diagram showing a screen displayed when an image forming apparatus cancels a copy operation upon detecting inclusion of copy prohibition information in a document.
Figure 7:
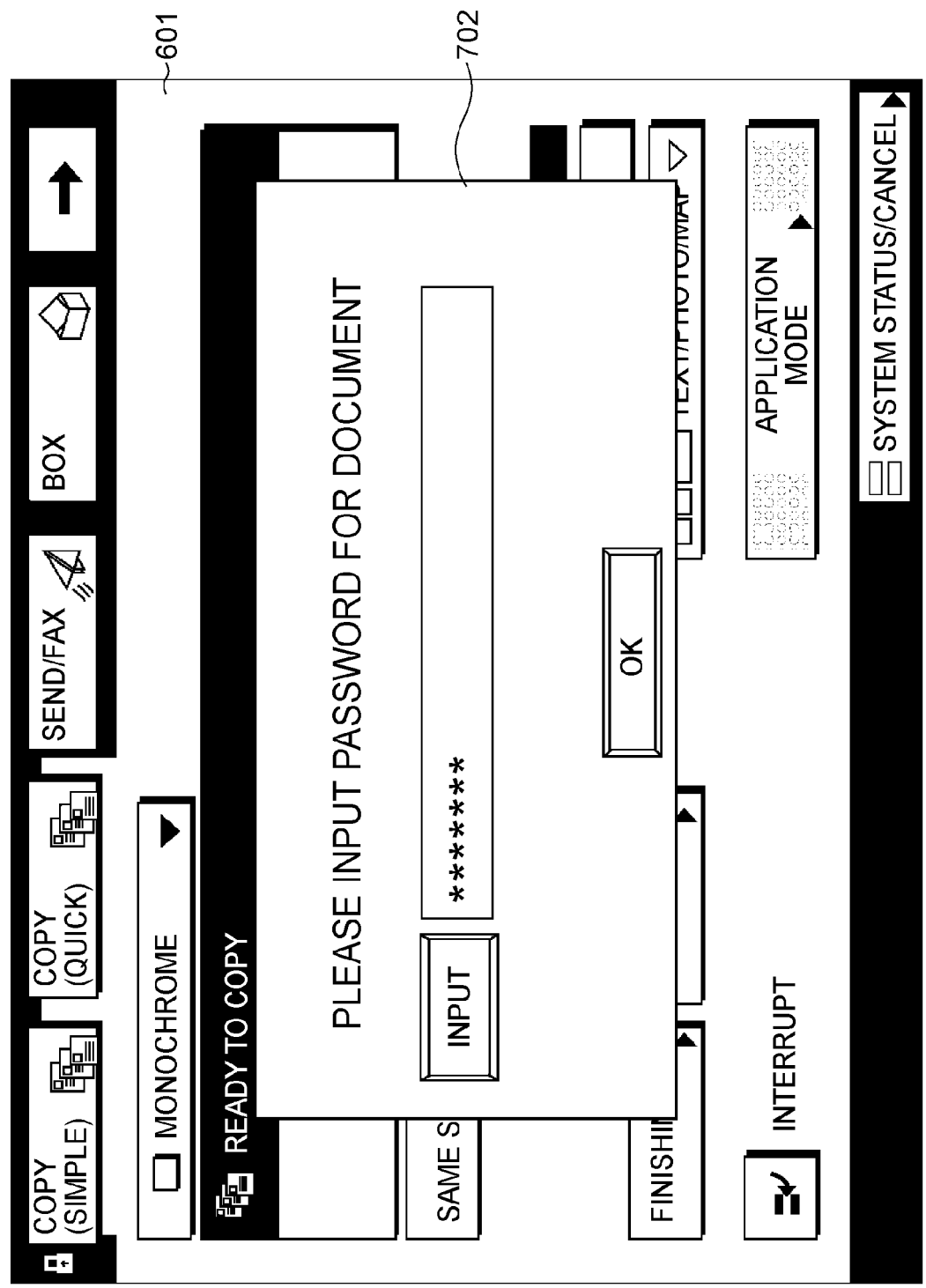
FIG. 7 is a diagram showing another screen displayed when an image forming apparatus suspends a copy operation upon detecting inclusion of copy prohibition information in a document.

FIG. 6 is a diagram showing a screen displayed when an image forming apparatus cancels a copy operation upon detecting inclusion of copy prohibition information in a document. FIG. 7 is a diagram showing another screen displayed when an image forming apparatus suspends a copy operation upon detecting inclusion of copy prohibition information.

FIG. 6 shows an example screen displayed when the image forming apparatus cancels the copy operation upon detecting the copy prohibition information of "always prohibit copying", among the three copy conditions shown in FIG. 5, embedded in a document. An operation screen 601 displays a message dialog 602 informing cancellation of a copy operation.

FIG. 7 shows a screen displayed when the image forming apparatus suspends the copy operation upon detecting the copy prohibition information of "cancel copy prohibition in response to input of a password", among the three copy conditions shown in FIG. 5, embedded in a document. An operation screen 601 displays an authorization dialog 702 for prompting a user to input the password. In response to a user's input of the password using a soft keyboard or an IC card (not shown), the image forming apparatus determines whether the input password matches a password included in the background image of the document. If the passwords match, the image forming apparatus closes the authorization dialog 702 and continues the copy operation. On the other hand, if the input of the password fails, the image forming apparatus cancels the copy operation.

[Appearance of Image Forming Apparatus]

Figure 8:
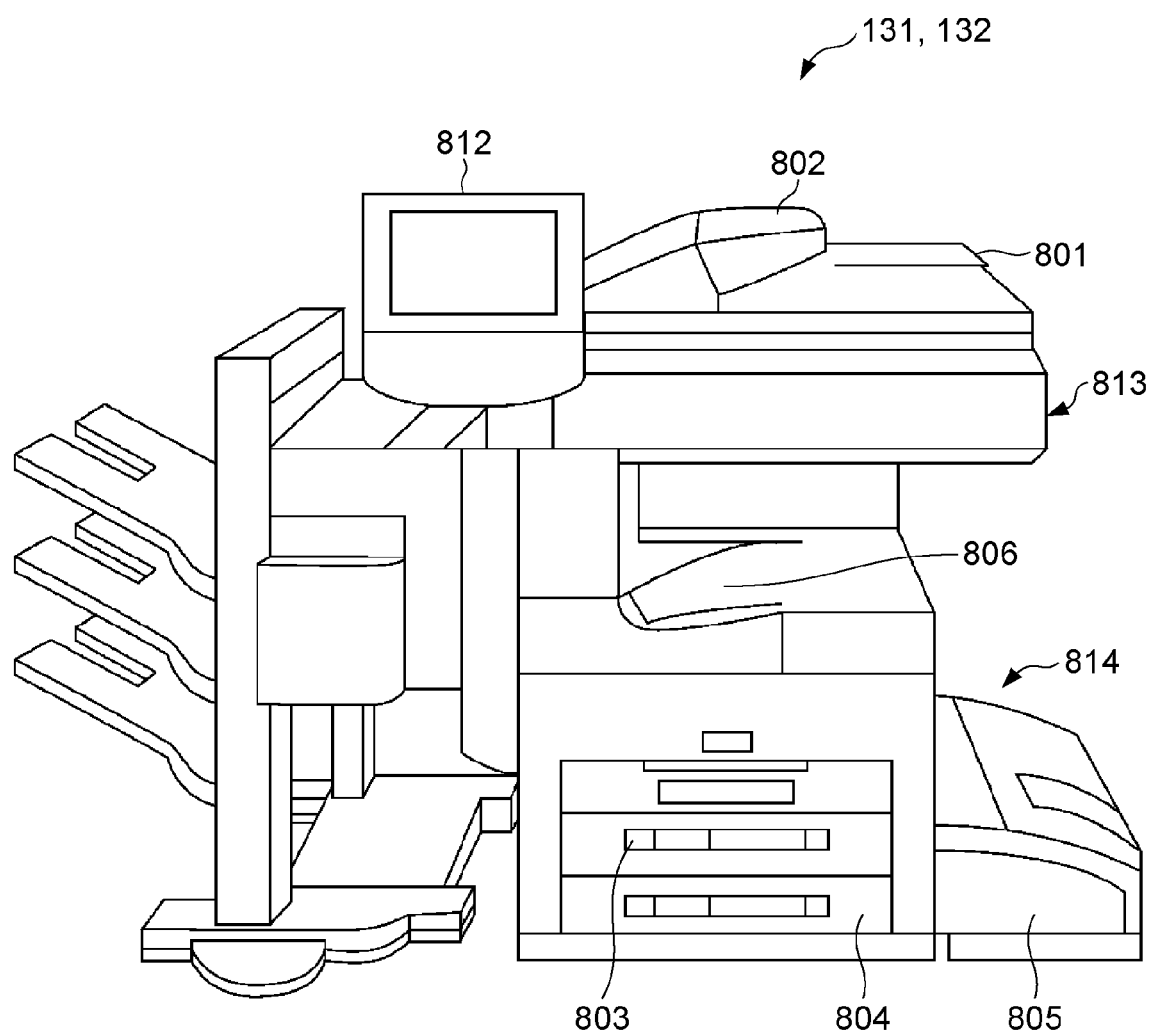
FIG. 8 is a diagram showing appearance of an image forming apparatus 131 or 132.

FIG. 8 is a diagram showing appearance of the image forming apparatus 131 or 132. A scanner unit 813 exposes/scans an image on a document and inputs the reflected light to a light-sensitive element, such as a charge coupled device (CCD) or a contact image sensor (CIS), thereby converting image information into an electric signal. Furthermore, the scanner unit 813 converts the electric signal into luminance signals of R, G, and B, and outputs these luminance signals as image data.

A document is set at a tray 802 of a document feeder 801. In response to a user's instruction of starting scanning entered using the operation unit 812, the scanner unit 813 receives a document scanning instruction. Upon receiving this instruction, the scanner unit 813 scans each document fed from the tray 802 of the document feeder 801. Meanwhile, as a document scanning method, a method of scanning the document mounted on a glass surface (not shown) by moving an exposure unit may be employed instead of an auto feeding method using the document feeder 801.

A printer unit 814 is an image forming device that forms an image of the image data on a piece of paper. Although an electrophotographic system using a photosensitive drum and a photosensitive belt is employed as an image forming method in this exemplary embodiment, the image forming method is obviously not limited to this method. For example, the image forming method may be an inkjet method for discharging ink from a small nozzle array and printing an image onto a sheet. In addition, the printer unit 814 is equipped with a plurality of sheet cassettes 803, 804, and 805 that allow different sheet sizes and different sheet directions to be selected. A printed sheet is discharged at a discharge tray 806.

[Operation for Creating Printed Output Including Additional Security Information]

An operation for creating a printed output including additional security information will now be described in detail with reference to FIGS. 3 and 4. As described above, there are two methods, a method for allowing a client PC to generate a background image of a printed output (see FIG. 3) and a method for allowing an image forming apparatus to generate the background image (see FIG. 4). FIGS. 3 and 4 show a flow of data processing performed in the client PC and the image forming apparatus. Accordingly, functional elements shown in each block of FIGS. 3 and 4 do not necessarily have one-to-one correspondence with physical elements of the client PC and the image forming apparatus.

As described above, FIG. 3 shows a functional configuration of a network printing system when an implementation method for allowing a client PC to generate a background image of a printed output is employed. The client PC 111 has a print data generating section 301, an image combining section 302, a data sending section 303, a job restriction information storage section 304, and a meta information image generating section 305. On the other hand, the image forming apparatus 131 has a data receiving section 311, a data analyzing section 312, an image generating section 313, and a printing section 314.

A user performs a print instructing operation in the client PC 111, whereby the print data generating section 301 is activated. The print data generating section 301 is realized by a print subsystem in which a printer driver operates in cooperation with an operating system (OS).

The print data generating section 301 converts a document that a user has instructed to print into a group of drawing instructions to be given to the image forming apparatus to generate print data. More specifically, this conversion is realized by generating, for example, the page description language (PDL). The print data generating section 301 sends the generated print data to the image combining section 302.

The job restriction information storage section 304 sends job restriction information, held therein as a result of a user operation performed on the security setting dialog shown in FIG. 5, to the meta information image generating section 305.

The meta information image generating section 305 generates a background image including copy restriction information and tracking information based on the job restriction information received from the job restriction information storage section 304. There is a method using, for example, low visibility barcode (LVBC) as a method for generating this background image. The LVBC will be described later. The meta information image generating section 305 sends the generated background image to the image combining section 302.

The image combining section 302 combines the print data received from the print data generating section 301 and the background image received from the meta information image generating section 305 to create an instruction to be given to the image forming apparatus so that the background image is included in each page of the print data. More specifically, there is a method for embedding the background image in the PDL as overlay form information. The image combining section 302 sends the combined print data to the data sending section 303.

The data sending section 303 sends the combined print data to the print server 121 or the image forming apparatus 131 or 132. Since FIG. 3 shows the logical data flow, the illustration of the print server 121 is omitted in FIG. 3 even if the print server 121 exists therebetween.

On the other hand, in the image forming apparatus, the data receiving section 311 waits for data sent via the LAN 101. Upon detecting transmission of data from another node in the LAN, the data receiving section 311 transfers the received data to an appropriate subsystem according to the type of the data. The type of data is generally identified by the port number when transmission control protocol/internet protocol (TCP/IP) is employed as the communication protocol, for example. The port number 515 used in the line printer daemon (lpr) and the port number 9100 used in the raw are known as a general port number. In this exemplary embodiment, the received data is print data including a print instruction given to the image forming apparatus. After confirming that the received data is the print data, the data receiving section 311 transfers the data to the data analyzing section 312.

The data analyzing section 312 extracts the drawing instruction (PDL) from the data received from the data receiving section 311. The data analyzing section 312 interprets the data and generates intermediate data used internally in the image forming apparatus. The data analyzing section 312 sequentially sends the generated intermediate data to the image generating section 313.

The data generating section 313 converts the intermediate data received from the data analyzing section 312 into a bitmap image. In addition, the image generating section 313 compresses the bitmap image and then sequentially sends the compressed image to the printing section 314. The printing section 314 prints the bitmap image received from the image generating section 313 onto a paper medium.

As described above, FIG. 4 shows a functional configuration of a network printing system when an implementation method for allowing an image forming apparatus to generate a background image of a printed output is employed. The client PC 111 includes a print data generating section 301, a data sending section 302, and a job restriction information storage section 304. On the other hand, the image forming apparatus 131 includes a data receiving section 311, a data analyzing section 312, an image generating section 313, an image combining section 414, a printing section 314, and a meta information image generating section 416.

A user performs a print instructing operation in the client PC 111, whereby the print data generating section 301 is activated. Since the operation of the print data generating section 301 is the same as that described with reference to FIG. 3, the description thereof is omitted. The print data generating section 301 sends the generated print data to the data sending section 302. In addition, the job restriction information storage section 304 sends job restriction information, held therein as a result of a user operation performed on the security setting dialog shown in FIG. 5, to the data sending section 302.

The data sending section 302 integrates the print data received from the print data generating section 301 and the job restriction information received from the job restriction information storage section 304 into print instruction data to be given to the image forming apparatus. Furthermore, the data sending section 302 sends the integrated print instruction data to the print server 121 or the image forming apparatus 131 or 132. Since FIG. 4 shows logical data flow, the illustration of the print server 121 is omitted even if the print server 121 exists therebetween.

On the other hand, in the image forming apparatus, since the operation of the data receiving section 311 is the same as that described with reference to FIG. 3, the description thereof is omitted. The data analyzing section 312 extracts the job restriction information and the drawing instruction (PDL) from the data received from the data receiving section 311. The data analyzing section 312 sends the extracted job restriction information to the meta information image generating section 416. Since the operation for processing the drawing instruction extracted by the data analyzing section 312 is the same as that described with reference to FIG. 3, the description thereof is omitted. In addition, since the operation of the image generating section 313 is the same as that described with reference to FIG. 3, the description thereof is omitted. The image generating section 313 sends the generated bitmap image to the image combining section 414.

The meta information image generating section 416 interprets the job restriction information received from the data analyzing section 312 and generates a background image according to the job restriction information using a technique for embedding information in an image, such as, for example, LVBC. The meta information image generating section 416 sends the generated background image to the image combining section 414.

The image combining section 414 combines the bitmap image received from the image generating section 313 and the background image received from the meta information image generating section 416 and sends a bitmap image of the combined result to the printing section 314. Since the operation of the printing section 314 is the same as that described with reference to FIG. 3, the description thereof is omitted.

[Embedding of Additional Security Information During Copy Operation of Image Forming Apparatus]

It is assumed in FIG. 4 that a user gives a print instruction of a file in a client PC before the image forming apparatus creates a printed output including additional security information. However, the instruction to include the additional security information in the background of the printed output is not limited to the print instruction given from the client PC. In the case of copying a paper document, the image forming apparatus can be configured to include the additional security information in the background of the printed output.

Figure 9:
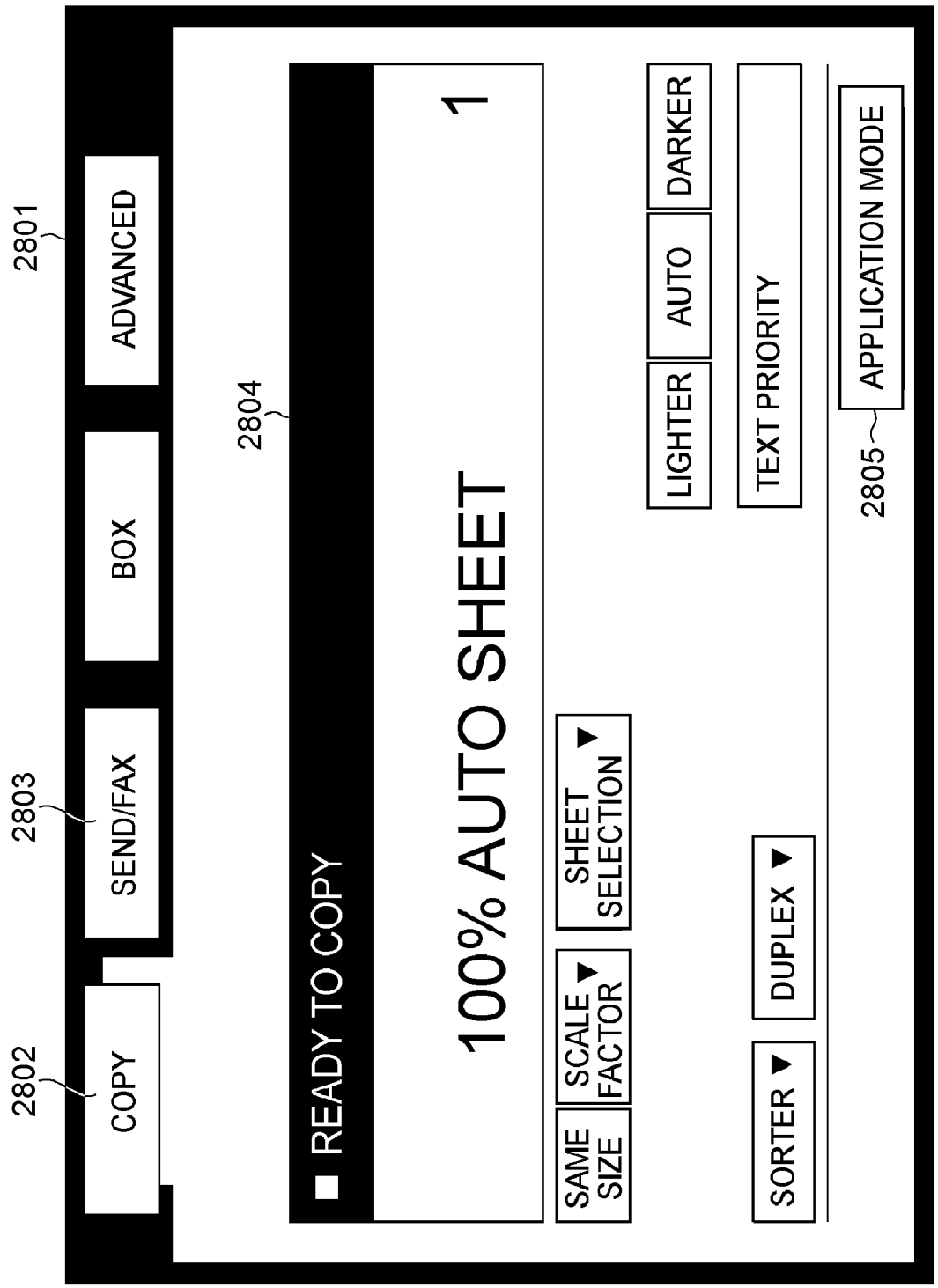
FIG. 9 is a graphical user interface (GUI) showing a general copy screen displayed in an image forming apparatus.

A setting operation for embedding additional security information performed in the image forming apparatus will be described using FIGS. 9 to 13. FIG. 9 is a GUI showing an ordinal copy screen displayed in the image forming apparatus. A GUI 2801 is a screen of a user interface (UI) and includes a copy tab 2802, a send tab 2803, and so on. The copy tab 2802 indicates that a copy function is selected. The send tab 2803 is for selecting a send or facsimile function. In this exemplary embodiment, only the copy tab 2802 will be described and the description regarding other tabs is omitted.

The GUI 2801 also includes a state displaying window 2804 for displaying copy settings and an application mode button 2805 for receiving detailed copy settings. A setting for embedding the additional security information is performed on a GUI displayed in response to pressing of this application mode button 2805.

Figure 10:
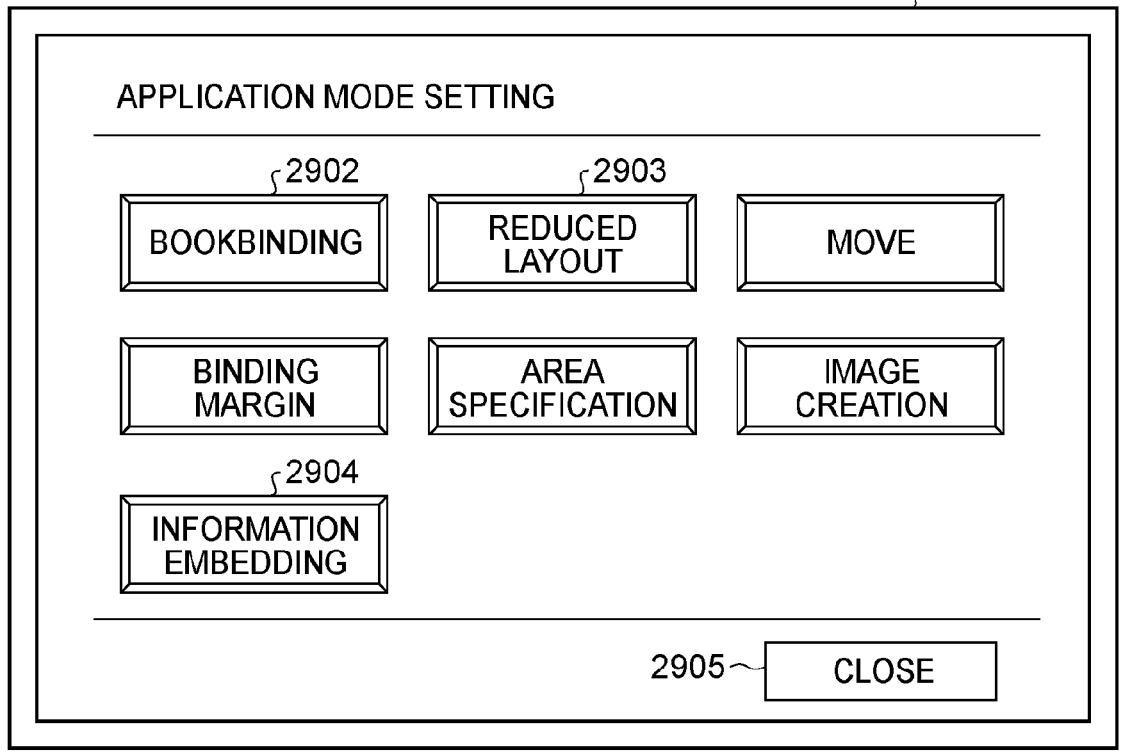
FIG. 10 is a GUI showing an application mode dialog 2901 displayed in response to pressing of an application mode button 2805.

FIG. 10 is a GUI showing an application mode dialog 2901 displayed in response to pressing of the application mode button 2805. Although many application mode settings (for example, a bookbinding setting 2902, a reduced layout setting 2903, or the like) are available in this image forming apparatus, only an information embedding button 2904 regarding embedding of the additional security information will be described.

Figure 11:
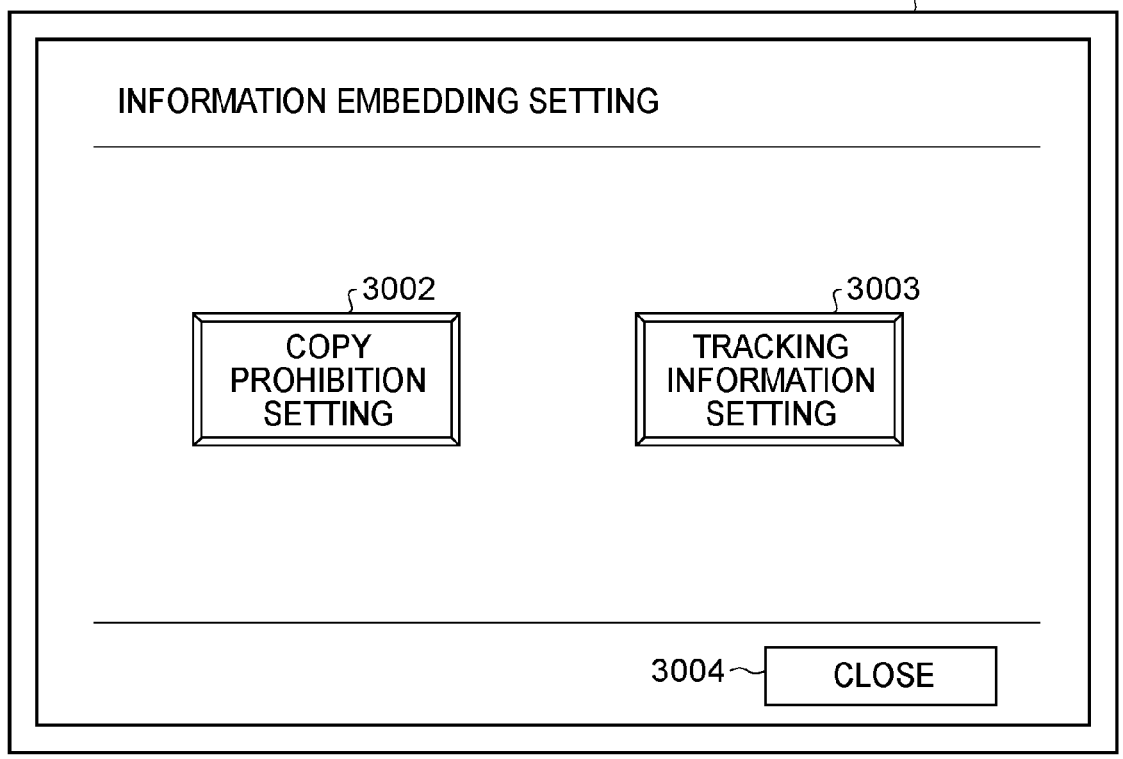
FIG. 11 is a GUI showing an information embedding setting dialog 3001 displayed in response to pressing of an information embedding button 2904.

To perform the setting operation for embedding of the additional information, a user presses the information embedding button 2904 to make detailed settings. FIG. 11 is a GUI showing an information embedding setting dialog 3001 displayed in response to pressing of the information embedding button 2904. The information embedding setting dialog 3001 includes a copy prohibition setting button 3002 for making settings regarding copy prohibition and a tracking information setting button 3003 for making settings regarding tracking information.

FIG. 12 is a GUI showing a copy prohibition setting dialog 3101 displayed in response to pressing of the copy prohibition setting button 3002. The same contents as those shown in the above-described printer driver setting (see FIG. 5) can be set here. A user operates radio buttons 3102 to select one of three setting options of "permit copying", "(always) prohibit copying", and "set copy permitting conditions (cancel copy prohibition in response to input of a password)".

When the third setting option "cancel copy prohibition in response to input of a password" is selected, a password input field 3103 becomes active and a user can input a password to cancel the copy prohibition.

FIG. 13 is a GUI showing a tracking information setting dialog 3201 displayed in response to pressing of the tracking information setting button 3003. In this exemplary embodiment, the tracking information setting dialog 3201 includes two checkboxes 3202. A user checks the checkbox, thereby being able to instruct embedding of a user name or time information. Although these two kinds of tracking information are shown as an example in this exemplary embodiment, other kinds of information can be included in the tracking information as long as the information is held in the image forming apparatus. For example, an IP address and a MAC address of the image forming apparatus and a division name of an installed place or an office can be attached as the tracking information. The above-described various kinds of setting information are stored in a job restriction information storage section 2704 shown in FIG. 14, which will be described later.

Figure 14:
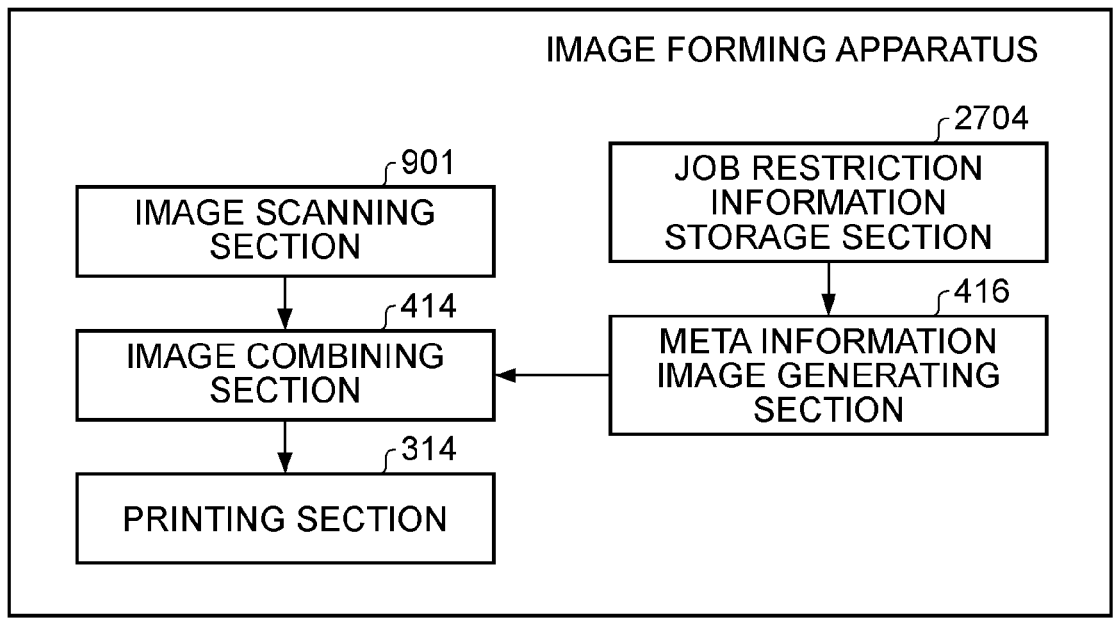
FIG. 14 is a diagram showing a functional configuration of an image forming apparatus when a background of a printed output includes copy prohibition information at the time of copying of a paper document.

FIG. 14 is a diagram showing a functional configuration of an image forming apparatus when a background of a printed output includes copy prohibition information at the time of copying of a paper document. The image forming apparatus includes an image scanning section 901, an image combining section 414, a printing section 314, a job restriction information storage section 2704, and a meta information image generating section 416.

A user places a document on the scanner unit 813 and operates the operation unit 812 to instruct the start of a copy operation. In response to the instruction, the image scanning section 901 (corresponding to a scanning unit) is activated and the copy operation is started. The image scanning section 901 scans the document and sends image data thereof to the image combining section 414.

The job restriction information storage section 2704 sends job restriction information, held therein as a result of a user operation performed on various setting dialogs (see FIGS. 9 to 13), to the meta information image generating section 416. The meta information image generating section 416 interprets the received job restriction information and generates a background image corresponding to the job restriction information using a technique for embedding the information in an image, such as, for example, LVBC. The meta information image generating section 416 then sends the generated background image to the image combining section 414.

The image combining section 414 combines the document image data received from the image scanning section 901 and the background image received from the meta information image generating section 416. The image combining section 414 sends the combined image data to the printing section 314. Since the operation of the printing section 314 is the same as that described with reference to FIG. 3, the description thereof is omitted. The setting for embedding the additional security information (see FIGS. 9 to 13) is performed in the image forming apparatus in response to a general user's pressing of the application mode button 2805 at the time of copying of a document.

Figure 15:
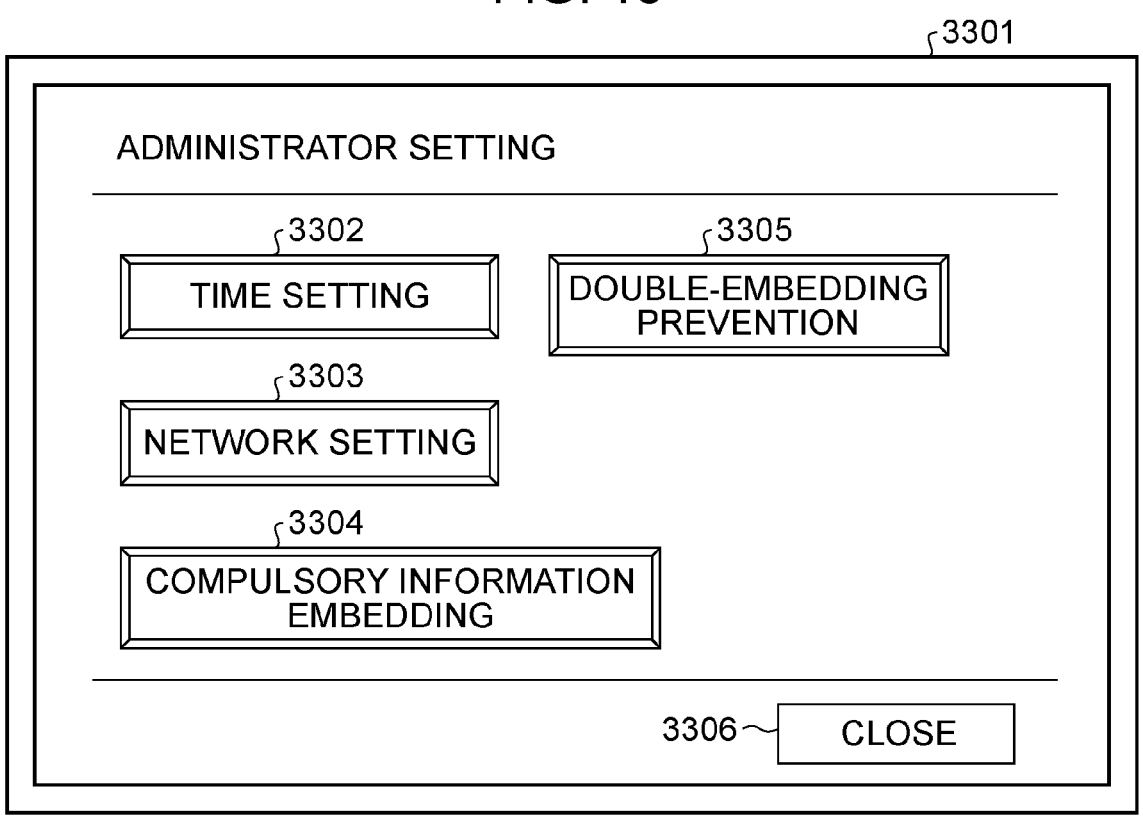
FIG. 15 is a GUI showing an administrator setting dialog 3301.

In addition, when an administrator of an image forming apparatus creates a printed output using the image forming apparatus, the administrator may set the image forming apparatus so that the additional security information is compulsorily embedded. FIG. 15 is a GUI showing an administrator setting dialog 3301. Only the administrator can operate this screen. The setting dialog 3301 includes a time setting button 3302, a network setting button 3303, a compulsory information embedding button 3304, and a double-embedding prevention button 3305.

In response to pressing of the compulsory information embedding button 3304, information to be embedded is set according to the same flow of screens as those displayed in response to pressing of the information embedding button 2904 (see FIG. 10). Differences between the setting in response to pressing of the compulsory information embedding setting button 3304 and the setting in response to pressing of the information embedding button 2904 are as follows.

In the former case, once the administrator makes the setting, the setting is valid until the administrator cancels the setting and a copy prohibition image is compulsorily embedded when the image forming apparatus creates a printed output. On the other hand, in the latter case, the setting is made for each job entered by a general user. In addition, when the compulsory information embedding setting is made, the information embedding button 2904 of the application mode is displayed in gray so that the compulsory information embedding setting and the information embedding setting of the application mode cannot be selected at the same time.

[Detailed Description of Copy Restriction Operation in Image Forming Apparatus]

Figure 16:
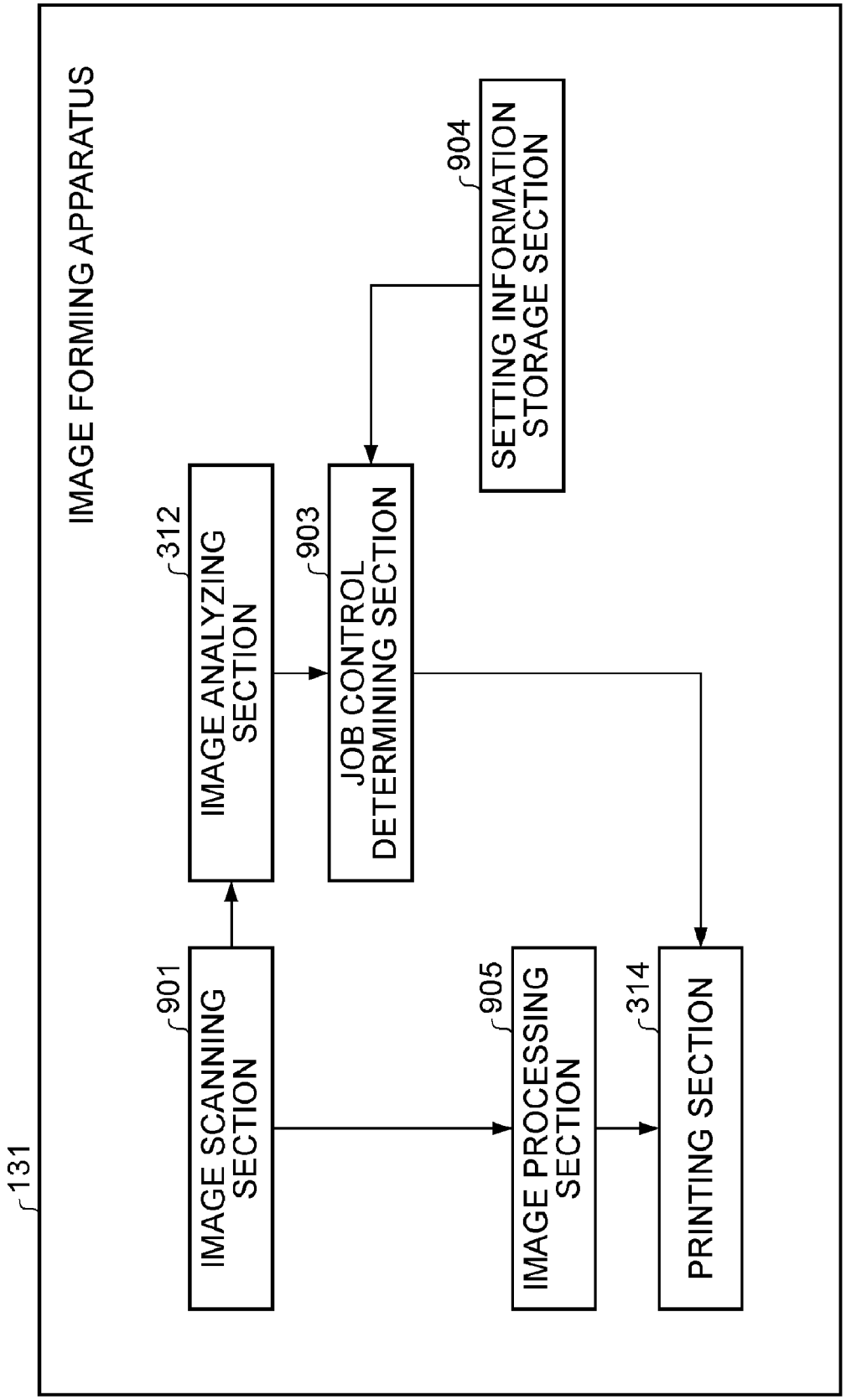
FIG. 16 is a diagram showing a functional configuration of an image forming apparatus when a copy restriction operation is performed.

FIG. 16 is a diagram showing a functional configuration of an image forming apparatus when a copy restriction operation is performed. The image forming apparatus 131 includes an image scanning section 901, an image analyzing section 312, a job control determining section 903, a setting information storage section 904, an image processing section 905, and a printing section 314. Conditions (date and user autho-rization information) for canceling a copy operation are set in advance and stored in the setting information storage section 904.

A user places a document including copy restriction information on the scanner unit 813 and operates the operation unit 812 to instruct the start of a copy operation. In response to the instruction, the image scanning section 901 is activated and the copy operation is started. The image scanning section 901 scans the document image and sends image data thereof to the image processing section 905 and the image analyzing section 312.

The image analyzing section 312 extracts the copy restriction information included in the image data received from the image scanning section 901. The image analyzing section 312 sends the extracted copy restriction information to the job control determining section 903.

The job control determining section 903 compares the copy restriction information received from the image analyzing section 312 with the copy restriction conditions stored in the setting information storage section 904 to determine whether to cancel the copy operation. For example, when the radio button 502 (see FIG. 5) for "permit copying" is checked, the image forming apparatus continues the printing operation. In addition, when a copy permitting condition is set and a character string of a password input at the textbox 503 matches a character string of a password input on the authorization dialog 702 shown in FIG. 7, the image forming apparatus continues the printing operation. In this case, the background image originally included in a document is copied onto a recording medium with being preserved as it is.

Here, if the job control determining section 903 determines that the copy operation should be canceled, the job control determining section 903 sends an instruction for canceling the operation to the printing section 314. The job control determining section 903 then displays a message dialog 602 (see FIG. 6) indicating cancellation of the copy operation on the operation unit 812.

The image processing section 905 converts the image data according to a function set using the application mode button 2805 (see FIG. 9) or the like. The processing content of the image processing section 905 varies depending on the settings made with the application mode button 2805. For example, when the information embedding button 2904 is set, the image processing section 905 generates a background image according to the setting and combines the background image and image data of a document scanned by the image scanning section 901. Through this operation, image data including copy restriction information shown in FIG. 2 can be generated.

This series of operations corresponds to generation of a background image according to the job restriction information held in the job restriction information storage section 2704 performed by the meta information image generating section 416 and combination of the background image and the image data of the document scanned by the image scanning section 901 performed by the image combining section 414. Accordingly, the image processing section 905 performs processing performed by the image combining section 414, the job restriction information storage section 2704, and the meta information image generating section 416.

Upon receiving the image data from the image processing section 905, the printing section 314 prints the above-described image data onto a sheet or cancels the printing operation according to the result of the determination fed from the job control determining section 903.

Processing performed by the image analyzing section 312 to the setting information storage section 904 is not described in an image forming apparatus (see FIG. 14) that functions at the time of copying of a paper document so that a background of a printed output includes additional security information, to simplify the description. In practice, analysis of copy restriction information on the paper document and the job control determination are performed as in the case of an image forming apparatus (see FIG. 16) that functions to perform the copy restriction operation.

[LVBC]

In this exemplary embodiment, low visibility barcodes (LVBC) will be described as an example of a technique for embedding additional security information. Here, an information embedding section indicates a unit included in an image forming apparatus that adds desired information to a print target image and prints the combined image onto an image forming medium (hereinafter, referred to as a sheet), such as a sheet of paper and a sheet used for an overhead projector (an OHP sheet).

The following are requirements for a general information embedding section.

To be able to realize embedding of an enough amount of data in a sheet since the section has to embed information.

To be able to accurately extract, as digital information, information embedded in a sheet using a color material (toner or ink).

To be resistant to factors preventing information from being extracted, such as rotation, enlargement, reduction, and partial deletion of a document caused at the time of copying of a document image on a sheet, a signal level decrease and a stain resulting from copying, to some extent.

To have a realtime processing ability that permits information to be extracted at the time of copying or a high processing speed equivalent thereto to prevent a copy restricted document from being copied.

The LVBC described in this exemplary embodiment satisfies the above-described requirements. FIG. 2 shows an example of a document including the LVBC embedded therein. Many dots 203 apparently embedded randomly are formed in an enlarged portion 202 of a sheet 201 in addition to an image originally included in the document. The information to be added is embedded in this dot.

[Two Areas]

A first area and a second area of an area including embedded additional security information will now be described. FIG. 17 is a table showing characteristic differences between the first area and the second area. The additional security information is separately embedded in two kinds of areas in an extractable manner. The two kinds of areas have different characteristics depending on the utilization manner. The first area includes information, such as copy restriction information, needed to be extracted at the high speed during a general scan and copy operation. Since this extraction processing is executed on any kind of document without exception, the delay in the extraction processing affects the entire copy speed. Accordingly, for example, a capability substantially equal to that of the scan processing is required regarding the analysis speed. In addition, since an extremely small amount of the copy restriction information is needed, the data size of the additional security information to be embedded can be small.

On the other hand, the tracking information is embedded in the second area. Since the tracking information is extracted when an administrator performs analysis operation at the time of exposure of information leakage, the extraction processing does not have to be performed during the normal copy operation. Accordingly, even if the realtime processing is not guaranteed, the processing speed does not affect the entire copy speed and a decrease in the processing speed is permitted to some extent.

Since the tracking information has to include a large amount of information, the data size has to be relatively large. A name of a user created the document, a name of an organization to which the user belongs, a serial number of an image forming apparatus, and an IP address or a MAC address can be considered as information to be embedded as the tracking information. Furthermore, information such as an installed place, a print date, and a print time may be used as the tracking information.

To satisfy these different requirements, the additional security information can be embedded in both of the first area and the second area in the LVBC according to this exemplary embodiment. It is possible to select extraction of only the first area, extraction of only the second area, or extraction of both areas according to the utilization state (use case). In addition, when extracting only the first area, the image forming apparatus according to this exemplary embodiment can improve the analysis speed and perform the extraction processing at a speed that does not affect the productivity of the copy operation.

Figure 18:
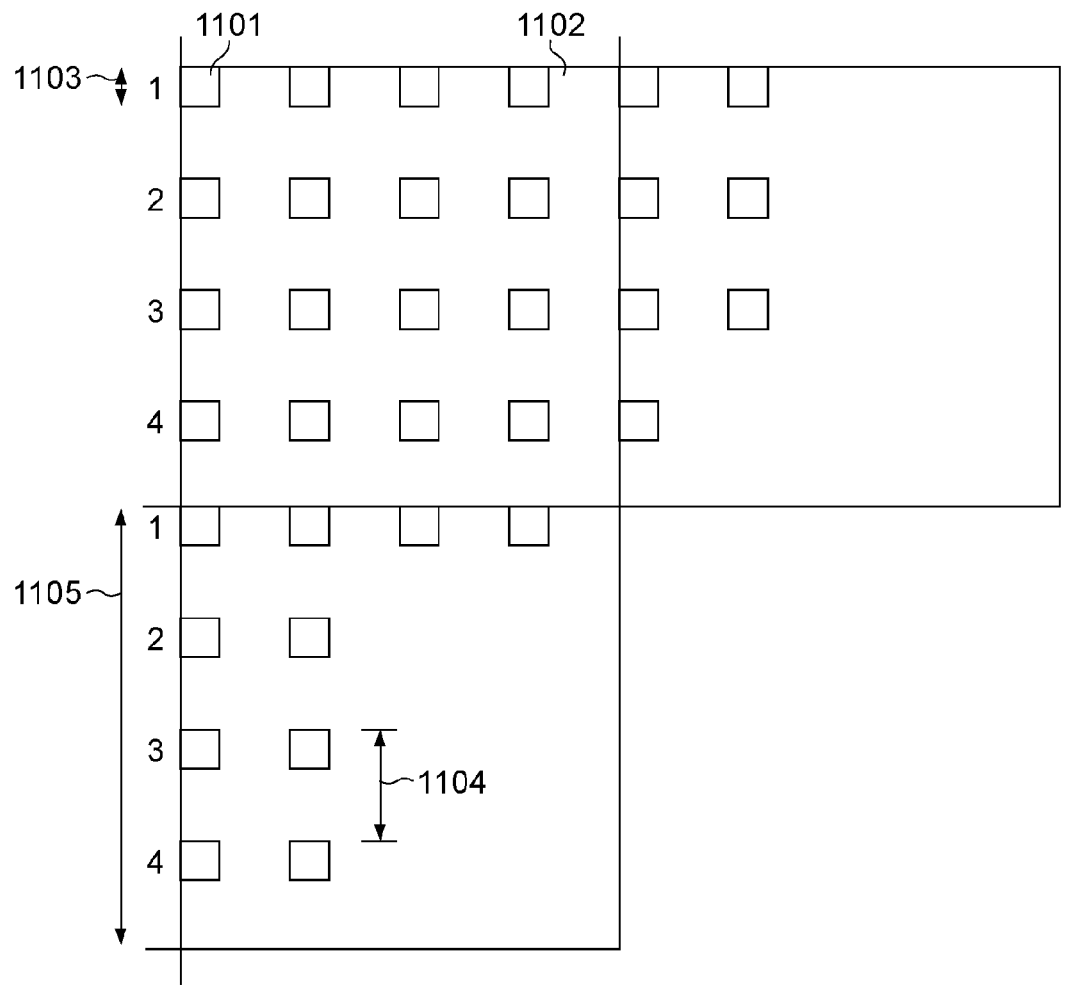
FIG. 18 is a schematic diagram showing a layout of first areas and second areas when information is embedded in a sheet.

FIG. 18 is a schematic diagram showing an arrangement of first areas and second areas when information is embedded in a sheet. In the drawing, a first area 1101 is represented by a rectangle. The same data is stored in the periodically arranged first areas 1101 similarly represented by rectangles. Repeated embedding of first areas 1101 increases the redundancy and improves the reliability to the noise and the error.

A second area 1102 is represented by a larger rectangle. As in the case of the first area 1101, the second areas 1102 represented by rectangles are arranged periodically. The information of the second area 1102 is not embedded in the first area 1101 and the information is exclusively written in the respective areas. In addition, in the drawing, a size 1103 of the first area, a repeated cycle 1104 of the first areas, and a size 1105 of the second area are shown.

[LVBC Embedding Method]

A method for embedding LVBC will now be described. In addition to an image printed onto a sheet, a dot pattern called grid is printed to embed additional security information in the LVBC. The dots 203 shown in FIG. 2 constitute the grid. The grid is an aggregate of dots arranged apart from one another at an even interval in vertical and horizontal directions. If the shortest distance between dots on the grid is connected with a virtual line (guide line), a virtual lattice pattern where lines are drawn at a constant interval in vertical and horizontal directions appears.

The additional security information is input as binary data having a size equal to or smaller than a predetermined value. Additional data is realized by displacement of dots (drifting from the center) in eight directions (up, down, left, and right) with respect to the dots constituting the grid and is embedded as the additional security information.

Figure 19:
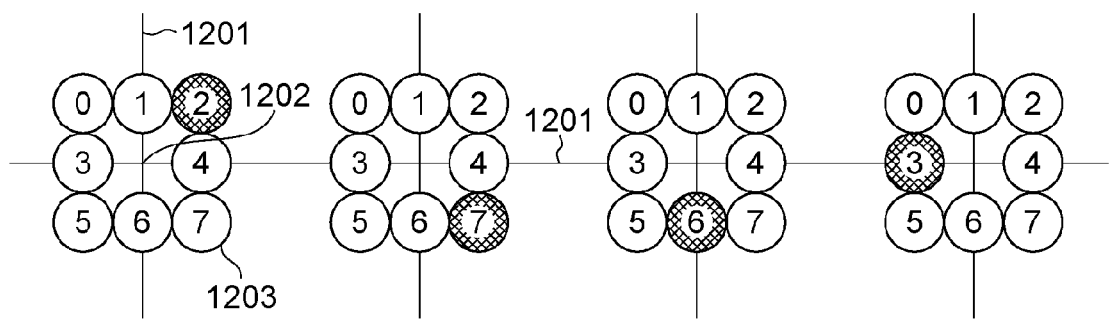
FIG. 19 is a diagram showing an example of embedding binary data "010111110011" as additional security information.

FIG. 19 is a diagram illustrating an example of embedding binary data "010111110011" as additional security information. In the drawing, lines 1201 extending in vertical and horizontal directions show virtual guide lines indicating the grid position. If the shortest distance of the grid is connected in this manner, a lattice pattern appears.

No dot is placed at a center 1202. In practice, for example, a dot is displaced and arranged at a position 1203 apart from the center 1202. "010111110011" is divided into three-bit values "010", "111", "110", and "011". Furthermore, decimal conversion is performed on each three-bit value and the three-bit values are converted into 2, 7, 6, and 3. Each dot constituting the grid is displaced in one of the eight directions corresponding to the value, thereby being able to represent the information. In this case, the values 2, 7, 6, and 3 can be embedded as the information by displacing the position of the dots in the upper right direction, the lower right direction, the downward direction, and the left direction, respectively.

By repeating such processing, the additional security information having a size of 2000 bytes at most can be embedded in a sheet as the LVBC. Furthermore, repeated embedding of dots representing the additional security information increases the redundancy and can improve the reliability to misconception of an image and a stain, creases, and partial destruction of a sheet. Details regarding the analysis will be described in a description for an LVBC analysis method, which will be given later.

Analysis of the LVBC requires an accurate examination of the grid position and it is desirable that the dots displace in the eight directions at an equal probability. However, there is a case where a specific data, such as a value 0, is desired to be embedded more often and the equal probability may not be achieved without any processing. Accordingly, in this exemplary embodiment, reversible scramble processing (e.g., common key encryption processing using a unique key) is performed on the information to be embedded and the information is embedded after the displacement of the dot is randomized. The meta information image generating section 416 generates the additional security information.

Embedding of the LVBC can be realized with a relatively simple mechanism since it is D/A conversion in which the additional security information, which is digital data, is recorded on a sheet as analog data. The information is embedded in the above-described two areas by applying the above-described embedding method.

The first areas 1101 and the second areas 1102 shown in FIG. 18 are combined when the data to be embedded is generated. Since the combined result is treated as one piece of embedded data, this embedded data is converted into each dot displacement (see FIG. 19) and is embedded. Accordingly, when the two areas shown in FIG. 18 are enlarged in a unit of dot, the information is embedded by the displacement of each dot as shown in FIG. 19. The pattern of the additional security information constituted by the two areas is combined by the image combining section 414 and is printed by the printing section 314.

[LVBC Analyzing Method]

Figure 20:
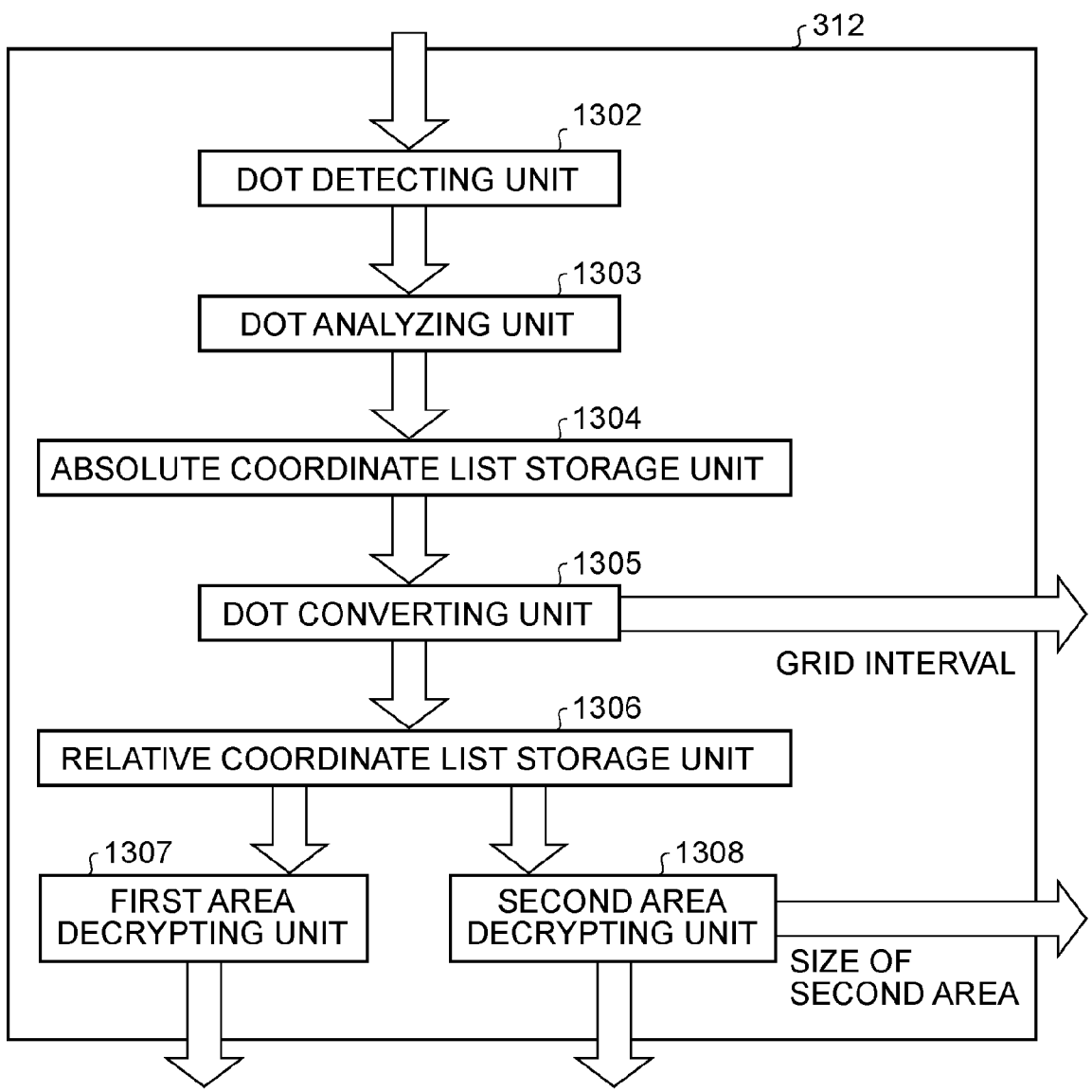
FIG. 20 is a block diagram showing a configuration of a data analyzing section 312 that analyzes LVBC.

An LVBC analyzing method will now be described. FIG. 20 is a block diagram showing an exemplary configuration of the data analyzing section 312 that analyzes the LVBC. The data analyzing section 312 is constituted by a sub module including a dot detecting unit 1302, a dot analyzing unit 1303, an absolute coordinate list storage unit 1304, a dot converting unit 1305, a relative coordinate list storage unit 1306, a first area decrypting unit 1307, and a second area decrypting unit 1308.

The dot detecting unit 1302 extracts a given dot from an additional-security-information-containing image (in which an original image and additional security information coexist) and determines coordinates. The dot analyzing unit 1303 eliminates unnecessary dots, such as dots constituting halftone, from the dots detected by the dot detecting unit 1302. The absolute coordinate list storage unit 1304 stores a list of absolute coordinates of a plurality of dots resulting from the analysis of the dot analyzing unit 1303.

The dot converting unit 1305 detects a rotation angle and a grid interval based on the list of the absolute coordinates of the plurality of dots stored in the absolute coordinate list storage unit 1304 and converts the absolute coordinates into relative coordinates from the grid position. Meanwhile, the grid interval detected here is used in determination of destruction of embedded security information at the time of enlargement/reduction.

The relative coordinate list storage unit 1306 stores relative coordinates, from the grid position, of the plurality of dots analyzed by the dot converting unit 1305. The first area decrypting unit 1307 extracts the first area of the embedded additional security information and outputs the extraction result to a subsequent stage. The second area decrypting unit 1308 extracts the second area of the embedded additional security information and outputs the extraction result to a subsequent stage. Meanwhile, the size of the second area detected at this time is used in determination of destruction of the embedded security information at the time of specification of an area or execution of movement.

"The subsequent stage" used here indicates a functional module that utilizes the additional security information. For example, the subsequent stage corresponds to a functional module that cancels a printing operation when copy restriction information is extracted as the additional security information and that displays sheet owner information on an operation display when tracking information is extracted.

[Dot Detection]

An operation of the dot detecting unit 1302 will now be described. The dot detecting unit 1302 receives image data of a document scanned by an optical scanner as a multilevel monochrome image. Although the information of LVBC is embedded as bilevel monochrome dots 203 (see FIG. 2), the image data is received in a state where the signal level is slightly dulled due to influences of a state of the toner adhered at the time of embedding, treatment of a sheet, and an optical system used at the time of scanning. Accordingly, the received dots are detected to remove these influences and the center of the received dots is recognized as coordinate positions, whereby the extraction accuracy is increased in the LVBC.

Figure 21:
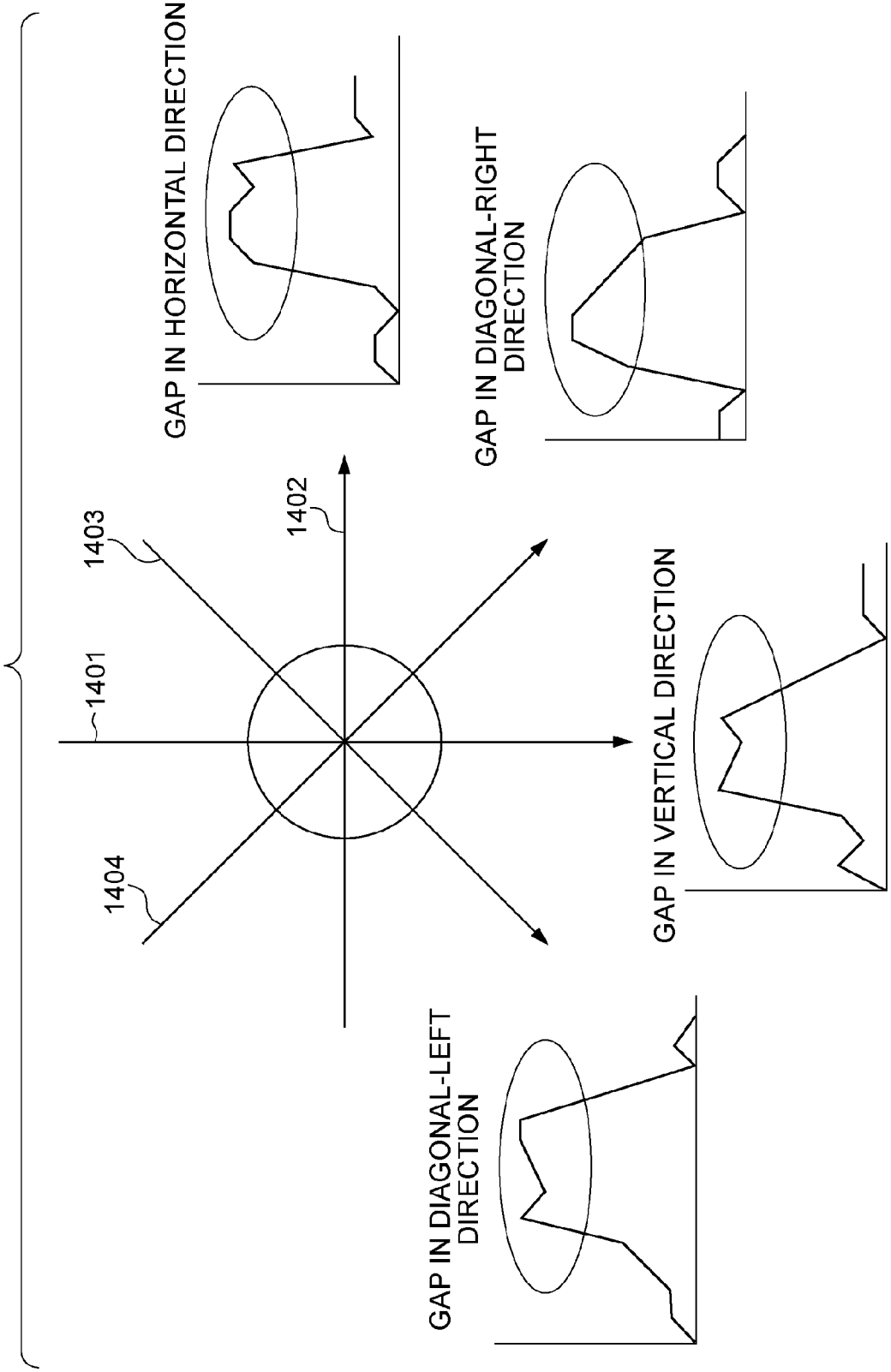
FIG. 21 is a diagram showing a dot detection operation performed by a dot detecting unit 1302.

FIG. 21 is a diagram illustrating detection of dots performed by the dot detecting unit 1302. A gap is examined on an image in four directions to determine that a dot is an isolated point on the image. In the drawings, directions 1401 to 1404 represented by arrows indicate directions in which existence or absence of an isolated point is examined. For example, when a result of an examination in the vertical direction 1401 is "white", "white", "black", "black", "white", and "white", the black portion may be an isolation point. However, with this result alone, it is undeniable that the black portion may be a line extending in the horizontal direction. Similarly, when a black portion is determined to be possibly an isolated point with an examination in the horizontal direction 1402 alone, the black portion may be actually a line extending in the vertical direction. In this exemplary embodiment, the dot detecting unit 1302 performs the examination of an isolated point in the four directions 1401 to 1404, thereby improving the examination accuracy. For example, when all results of the examinations in the directions 1401 to 1404 match at the same time in a given area, it is possible to identify that an isolation point is located at this position.

[Dot Analysis]

An operation of the dot analyzing unit 1303 will now be described. The dots detected by the dot detecting unit 1302 may be dots other than those constituting the LVBC. For example, a dot pattern for expressing halftone included in a document image and isolated points (e.g., a voice sound symbol of hiragana (one kind of Japanese character)) originally included in the document correspond to such dots. To remove the isolated points that are not dots constituting the LVBC, halftone elimination has to be performed.

Figure 22:
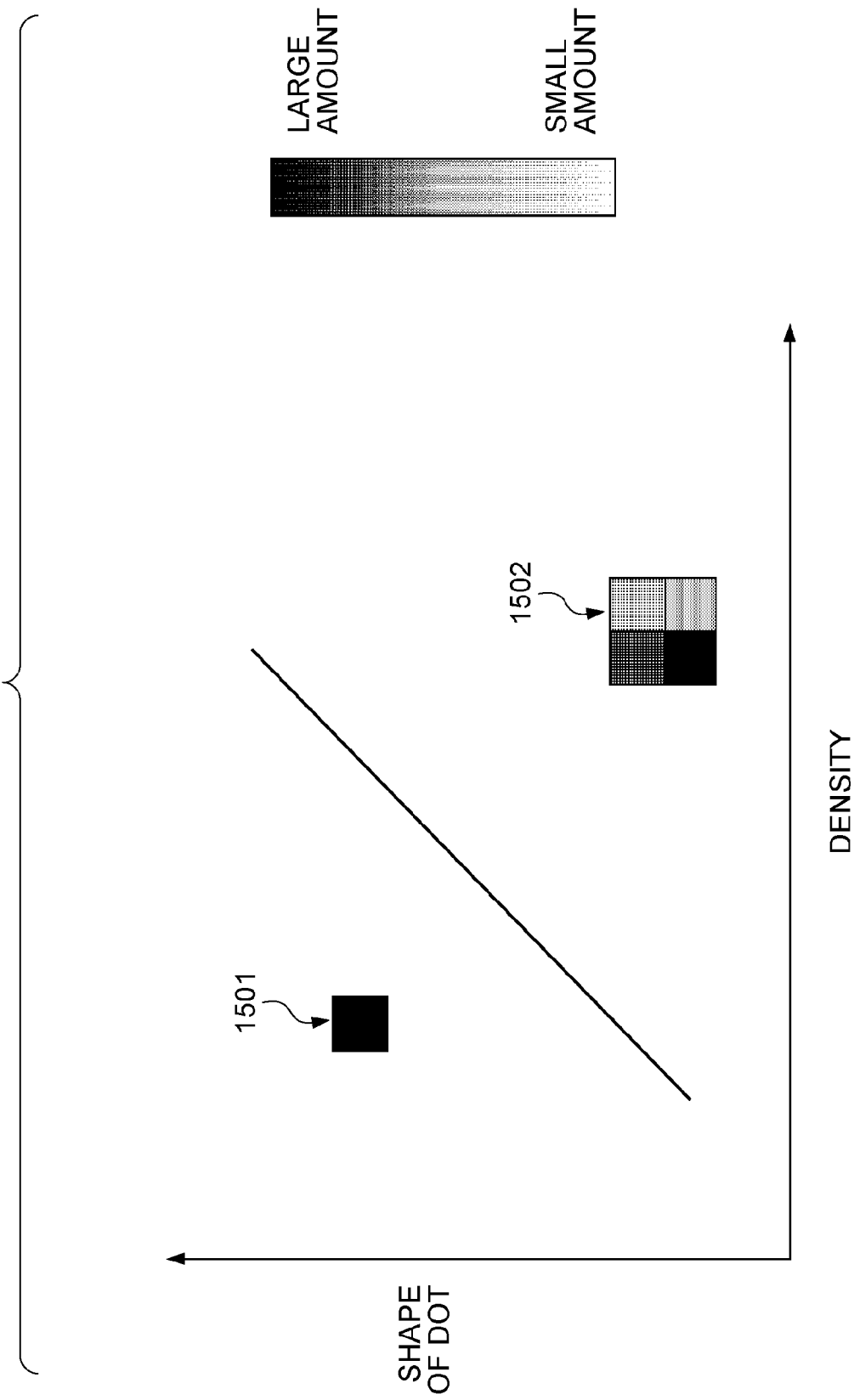
FIG. 22 is a graph for illustrating removal of halftone.

FIG. 22 is a graph for use in explanation of the halftone elimination. A histogram showing a shape of a dot at the vertical axis, density at the horizontal axis, and a dot appearance frequency at the density of a point is illustrated. Higher density (darker color) indicates higher dot appearance frequency. Here, since dots having a uniform shape are embedded at uniform density at the time of embedding, the appearance frequency of the dots of the LVBC shows a peak 1501 at a narrow range of the graph.

On the other hand, since the shape and density of the dots are not standardized in halftone, the dots sparsely appear at a broader range of the graph and the appearance frequency is relatively low. By utilizing this characteristic, a position at which the appearance frequency shows a narrower peak is identified as a dot of the LVBC and stored in the absolute coordinate list storage unit 1304. Other dots are eliminated. Through this operation, the LVBC dots are stored in the absolute coordinate list storage unit 1304.

[Dot Conversion]

An operation of the dot converting unit 1305 will now be described. An angle at which LVBC dots are embedded at the time of printing differs from an angle of dots in a scanned image because of a difference in a direction of a document placed on a scanner and a small difference in angles at an analog level. Accordingly, the rotation angle has to be detected and corrected. In addition, since information is embedded in displacement from a grid position to which the dot belongs in the LVBC, the grid has to be reproduced and a grid interval has to be accurately decided.

Figure 23:
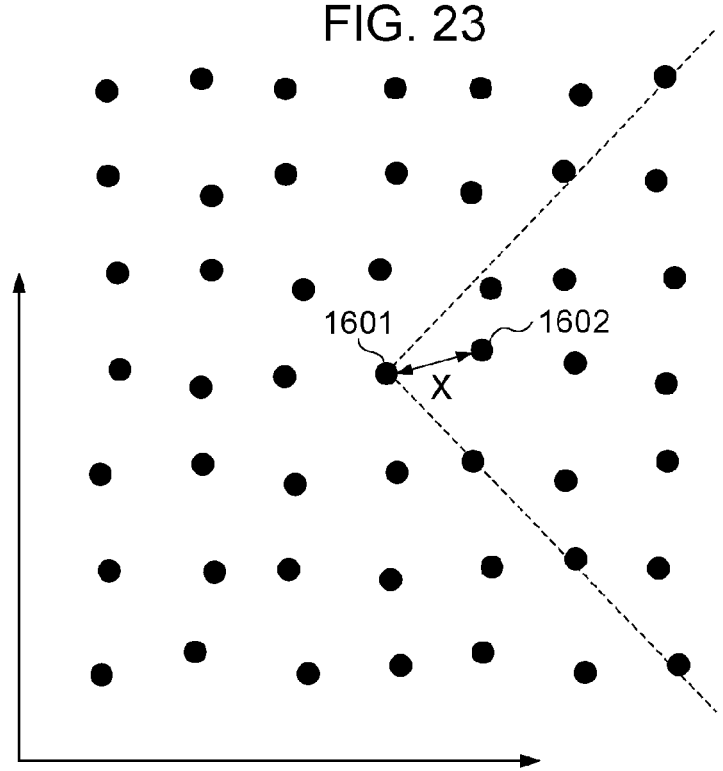
FIG. 23 is a schematic diagram showing a method of measuring a grid interval.

FIG. 23 is a schematic diagram showing a method of measuring a grid interval. A distance X between a focused dot 1601 and a nearest dot 1602 corresponds to a grid interval. Although there are four nearest dots from the focused point in upward, downward, left, and right directions, a range of 90 degrees on the right of the focused dot 1601 is treated as a target in which the nearest dot is searched, to simplify the calculation. More specifically, if a given dot (a, b) other than a focused dot (x, y) satisfies Equation (1), the dot (a, b) is not included in the calculation target.

$$a-x \leq 0 \text{ or } |a-x| \leq |b-y| \qquad (1)$$

The dot (a, b) that gives the smallest distance between the focused dot (x, y) and the dot (a, b) is recognized as a neighboring dot and the distance X between the two dots is treated as a candidate of the grid interval.

Here, since both the focused dot 1601 and the neighboring dot 1602 are displaced to embed the information, the distance therebetween may indicate a value different from the actual grid interval. In addition, the dot recognized as the LVBC dot may be a halftone pattern that the dot analyzing unit 1303 has failed to eliminate. Thus, the dot converting unit 1305 measures the inter-grid distance regarding all of focused dots (x, y) and creates a histogram showing a frequency for each inter-grid distance regarding all of the focused dots.

Figure 24:
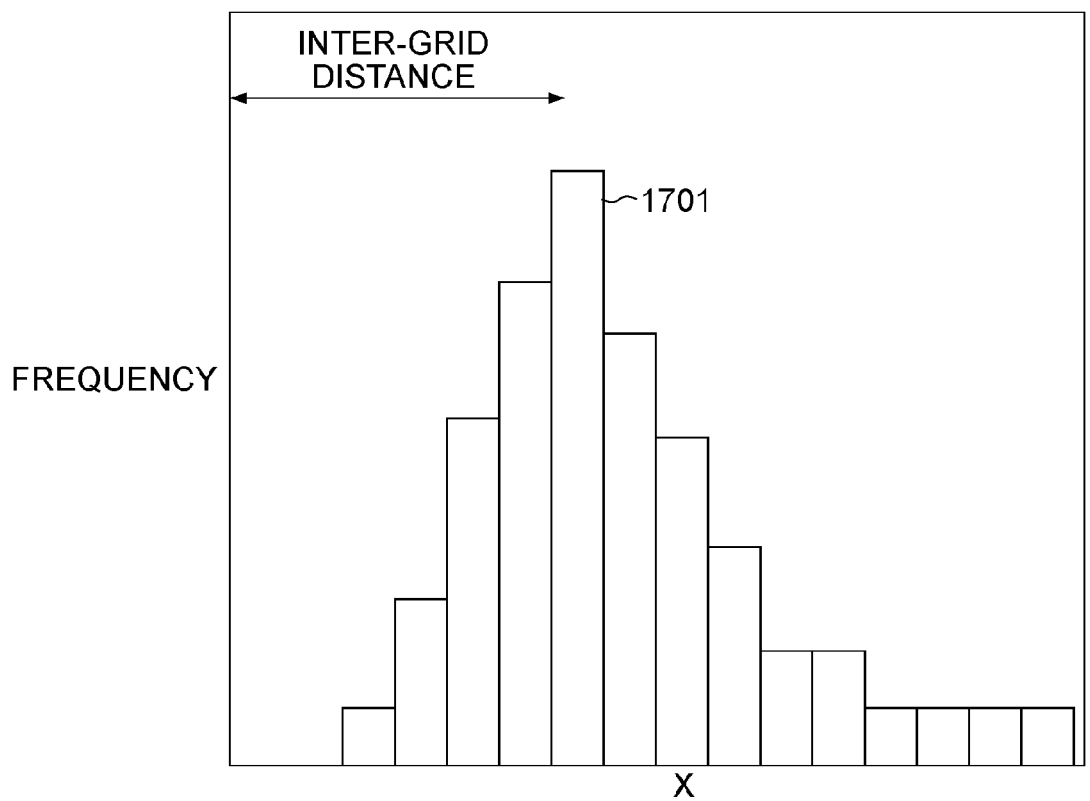
FIG. 24 is a histogram showing an example of frequencies of inter-grid distances.

FIG. 24 is a histogram showing a frequency of inter-grid distances as an example. The horizontal axis represents values of the distance X that is a candidate of the inter-grid distance, whereas the vertical axis represents the frequency at which the distance X is measured regarding the focused point (x, y). The distance X with the highest frequency 1701 is identified as the inter-grid interval.

If an appearance probability of displaced position of the focused dot 1601 and the neighboring dot 1602 from the respective grid is the same in the vertical and horizontal directions, the distance X at the mode position 1701 corresponds to the inter-grid interval based on the histogram of many focused dots. This inter-grid interval X is used in determination of destruction of additional security information.

Figure 25A:
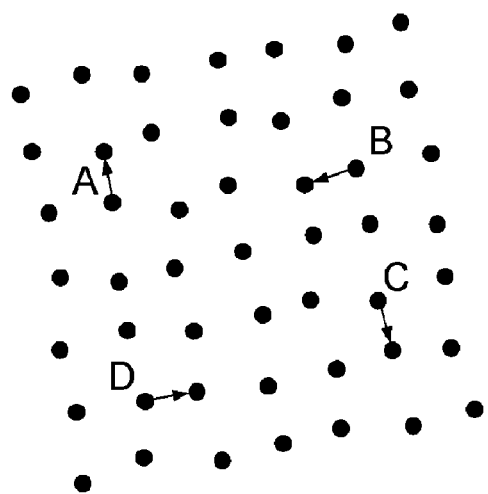
FIGS. 25A to 25D are diagrams showing correction of a grid rotation angle.

FIGS. 25A to 25D are diagrams illustrating correction of a grid rotation angle. Referring to FIG. 25A, an angle to the neighboring dot is measured regarding all dots. Since an angle between the focused dot and the neighboring dot is originally one of 0 degrees, 90 degrees, 180 degrees, and 270 degrees, the rotation angle can be decided by correcting a difference in the measured angle. In this case, an angle θ between each focused dot and the neighboring dot is represented by Equation (2) using a vector (dx, dy) from the focus point to the neighboring point.

$$\theta = a\tan 2(dy, dx) \qquad (2)$$

Figure 25B:
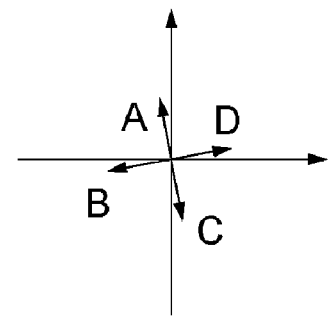

FIG. 25B shows vectors A, B, C, D from the focused dot to the respective neighboring dots. However, since both the focused dot and the neighboring dots are actually displaced slightly from the grid position to embed the information, the angle θ is measured regarding all of the focused point similarly.

If an appearance probability of displaced positions of the focused dots 1601 and the neighboring dot 1602 from the respective grid is the same in the vertical and horizontal directions, an average grid rotation angle can be measured by adding the angle differences for all of the focused dots.

Figure 25C:
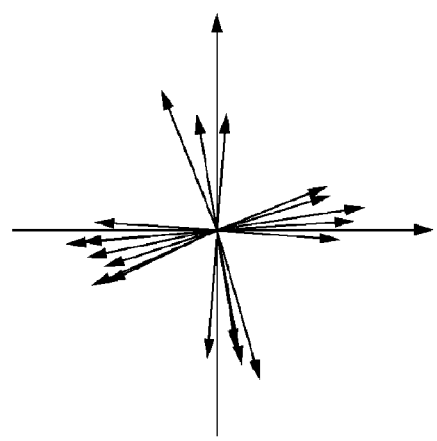
Figure 25D:
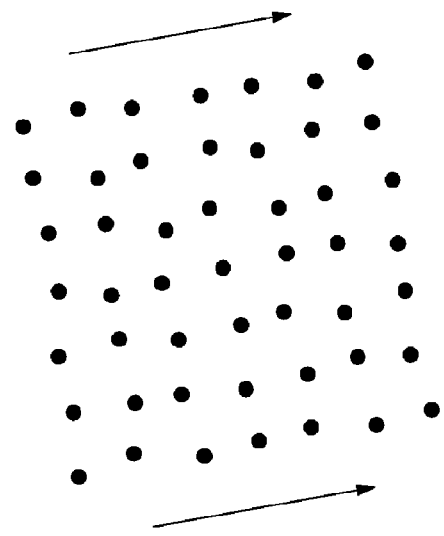

FIG. 25C shows vectors of some dots. By superimposing these angles, the value can be approximated to the grid rotation angle. More specifically, a reference vector is calculated again and again for the angle θ at each focused dot and a total angle φ is determined based on a sum of all of the reference vectors (see FIG. 25D). When the sum of the reference vectors is represented by (A, B), A and B are represented as Equation (3).

$$A = \sum_i \cos(4\theta_i) \qquad (3)$$

$$B = \sum_i \sin(4\theta_i)$$

The grid rotation angle φ can be approximated by Equation (4).

$$\phi = a\tan 2(B, A) \qquad (4)$$

Here, reversed rotation of the grid rotation angle is executed on the absolute coordinate list stored in the absolute coordinate list storage unit 1304 to correct the grid angle. This correction of the rotation angle is in a unit of 90 degrees. However, in fact, the correction is not limited to four angles, 0 degrees (proper), 90 degrees, 180 degrees, and 270 degrees. This limitation will be described later.

Figure 26B:
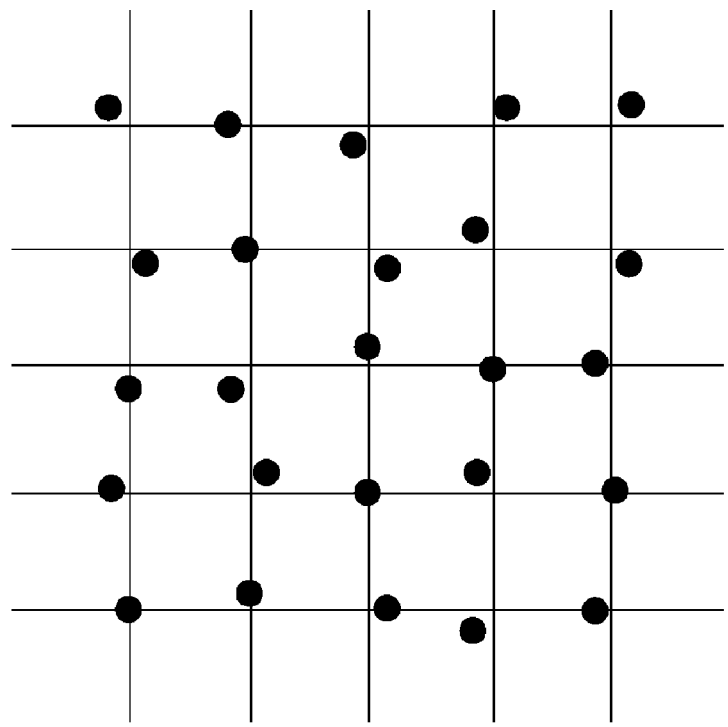
FIGS. 26A and 26B are diagrams showing a rotation correction result and a determined grid position.
Figure 26A:
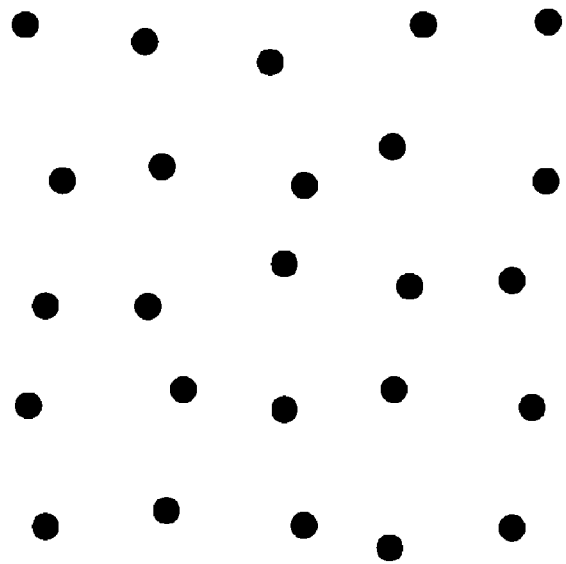

FIGS. 26A and 26B are diagrams showing a rotation correction result and a determined grid position. FIG. 26A shows an absolute coordinate list of rotation-corrected LVBC dots. Referring to FIG. 26B, virtual lines are drawn in X and Y directions at each grid interval determined by the dot converting unit 1305 and intersection points of these lines are treated as grids. Displacement of coordinates of the actually marked dot from this grid position is measured.

Figure 27:
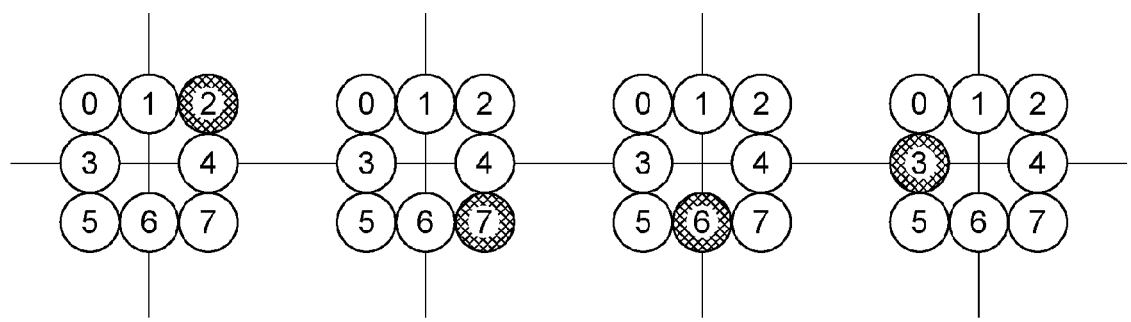
FIG. 27 is a diagram showing conversion of grid displacement into actual data.

FIG. 27 is a diagram showing conversion of grid displacement into actual data. Displacement from the grid is represented by information of 0 to 7 located in the vertical and horizontal directions. In FIG. 27, since values 2, 7, 6, and 3 can be extracted, these values are converted into three-bit binary values and integrated into one value, and embedded data "010111110011" is extracted from these dots. Similarly, by performing such an extraction operation on all of dots, extraction of embedded information of several tens to several thousands bytes can be executed.

[Decision of First Area]

Decision of first and second areas will now be described. Since the size 1103 of the first area, the repeated cycle 1104, and the position of the first area shown in FIG. 18 are unknown, the followings are decided. First, the repeated cycle 1104 of the first area 1101 is decided. The first area 1101 periodically includes the same data. When autocorrelation is determined in the vertical direction using a predetermined offset, the autocorrelation increases if the offset value matches the repeated cycle 1104. As a result, the repeated cycle 1104 can be decided.

Figure 28:
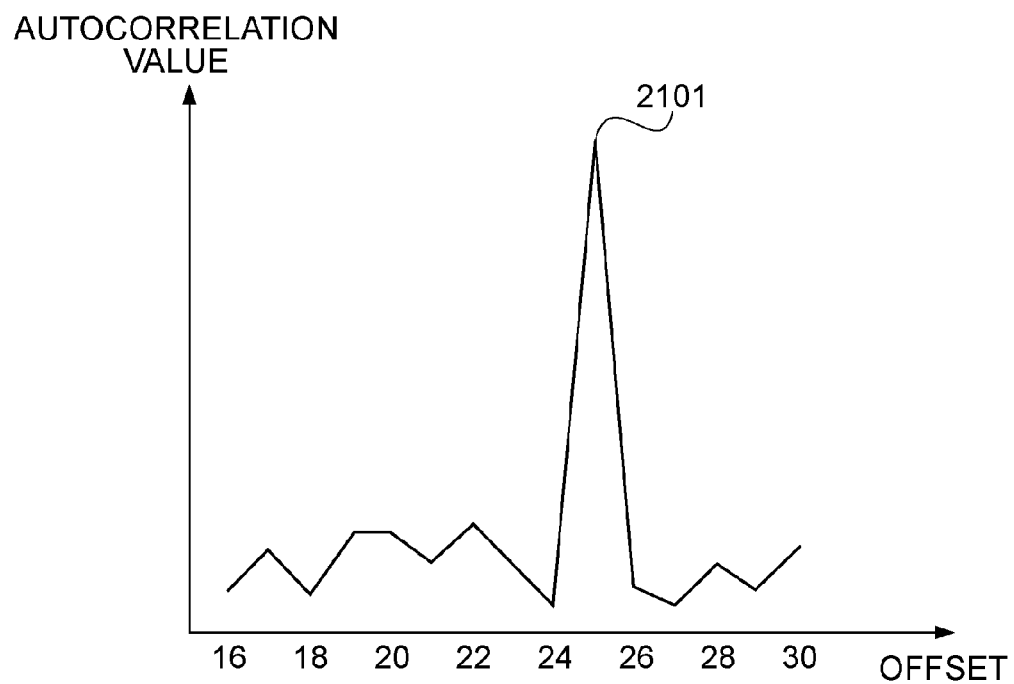
FIG. 28 is a graph showing an example of calculating an autocorrelation value for an offset value.

FIG. 28 is a graph showing a calculation example of an autocorrelation value for an offset value. The autocorrelation used herein is a method for evaluating a frequency at which specific embedded data appears periodically. In addition, the autocorrelation value is a value for evaluating the similarity of the embedded data at a specific offset value. An autocorrelation function COR(A, B) for calculating the autocorrelation value is represented by Equation (5).

$$COR(A,B) = \text{bitcount}(\text{not}(A \text{ xor } B)) \quad (5)$$

Here, "xor" represents exclusive OR of two terms. "Not" represents negation, whereas "bitcount" is a function for counting the number of a value 1 included in a bit string. For example, when A and B are equal to "010b" and "011b", respectively, not(A xor B)=not (001b)=110b, and a value of bitcount thereof is equal to 2.

Suppose that the first area is a matrix having predetermined width and height and a bit string for evaluating the first area is denoted by CELL (x, y), where x and y represent coordinates in the vertical and horizontal directions, respectively. For example, when the width and height of the first area are equal to 8 and 8, respectively, the length of the bit string CELL (x, y) is equal to 3 bits×8×8=192 bits in the first area whose upper left point is represented by x and y. The autocorrelation value of all of coordinates at a given offset is represented by Equation (6)

$$\text{Autocorrelation Value(Offset)} = \sum_x \sum_y COR\left(\begin{array}{c} \text{CELL}(x, y), \\ \text{CELL}(x, y\text{-offset}) \end{array}\right) \quad (6)$$

For example, when the size 1103 of the first area is equal to 8 and the repeated cycle 1104 is equal to 8×3=24, the autocorrelation value shows a peak 2101 at an offset equal to 24. The offset equal to 24 can be decided as the repeated cycle 1104.

The position and size of the first area 1101 will now be decided. The repeated cycle of the first area is decided by determining the autocorrelation. The position of the first area therein and the size of the first area have to be decided.

Figure 29:
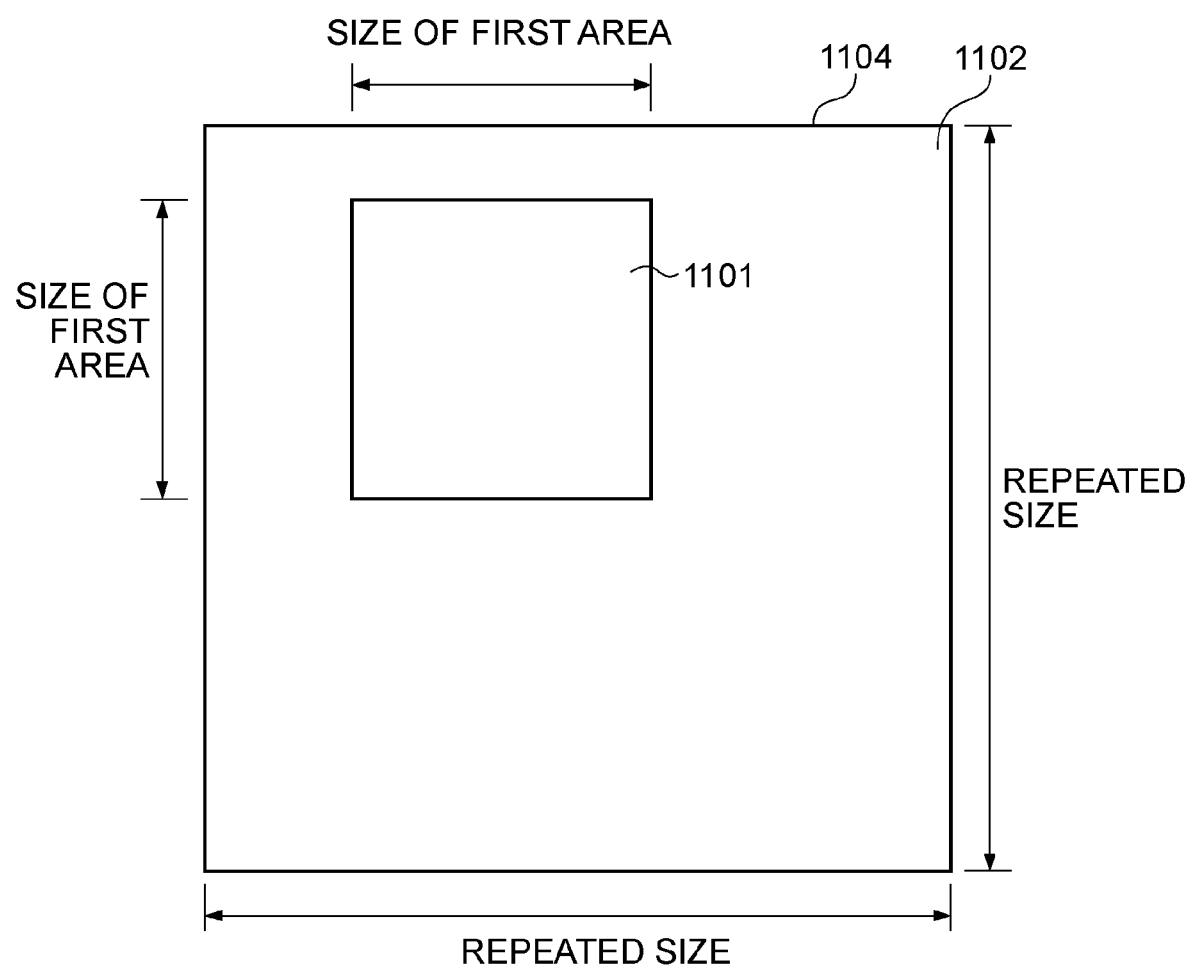
FIG. 29 is a schematic diagram showing a method of deciding a position of a first area.

FIG. 29 is a schematic diagram illustrating a method for deciding the position of the first area. Since the repeated cycle is decided in advance, a given area having the size equal to repeated cycle is extracted from the relative coordinate list storage unit 1306. Autocorrelation is determined sequentially and repeatedly at an area neighboring the area. If the same data appears at the repeated cycle in the first area 1101, the correlation is high. If the same data does not appear at the repeated cycle in the second area 1102, the correlation is low. By utilizing this characteristic, a start position of a part having high correlation is identified as a start position of the first area, and the size between the start and the end of this part having the high correlation can be decided as the size of the first area.

[Decryption of First Area]

Data of the first area is decrypted based on the position and size of the first area decided in the above-described procedure. Since a determination error due to a measurement error and a noise may occur using only a single area, positions of dots marked in all first areas are totalized, a mode value thereof is adopted, and an occurrence probability of the value is calculated.

Figure 30:
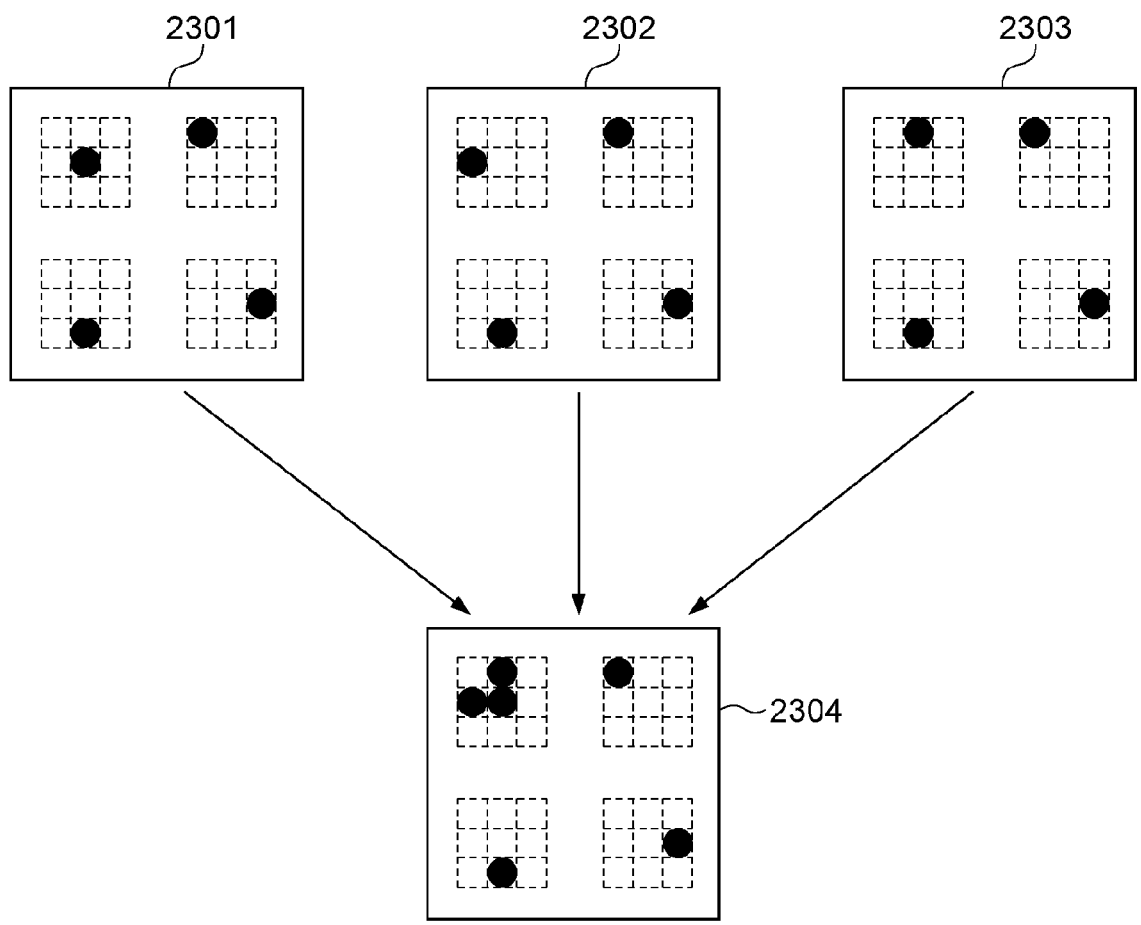
FIG. 30 is a schematic diagram showing totalization of first areas.

FIG. 30 is a schematic diagram showing totalization of the first areas. In the drawing, first areas 2301 to 2303 are shown at different positions. By superimposing these areas, a totalized result 2304 of all areas is obtained. Although a difference resulting from a noise and an error exists, this value can be adopted since the mode value is decided by the totalized result of all areas.

Actual decryption is then executed. At this phase, since an influence of a noise and an error can not be eliminated, an error correction operation is performed on a decrypted result. First, as shown in FIG. 27, the displacement from the grid is extracted and this displacement is converted into a data corresponding to the displaced position to extract a data string embedded in the first area. When not only actually used copy restriction data but also destruction of data can be detected, an error-correcting code is recorded in this data string at the time of embedding.

Although many kinds of error-correcting code are known as techniques in the related art, low density parity check (LDPC) is used here. The LDPC is known to have a significantly high error correcting capability and show a characteristic resembling the Shannon limit. A detailed description of the LDPC is omitted. In addition, any method other than the LDPC can be employable as long as the method has the characteristic of the error-correcting code. The use of the error-correcting code allows the embedded data to be extracted even if the extracted grid includes a certain level of error and noise.

Furthermore, as described in the correction of the rotation angle, since the rotation angle is corrected in a unit of 90 degrees, there are four types of extracted data, a proper data, data obtained by rotating the proper data by 90 degrees, data obtained by rotating the proper data by 180 degrees, and data obtained by rotating the proper data by 270 degrees.

Accordingly, the extracted data is rotated by 0 degrees, 90 degrees, 180 degrees, and 270 degrees, and decryption is executed on the results while performing error correction using the LDPC. The error-correcting code functions only for the proper rotation angle and the data can be extracted successfully.

Figure 31:
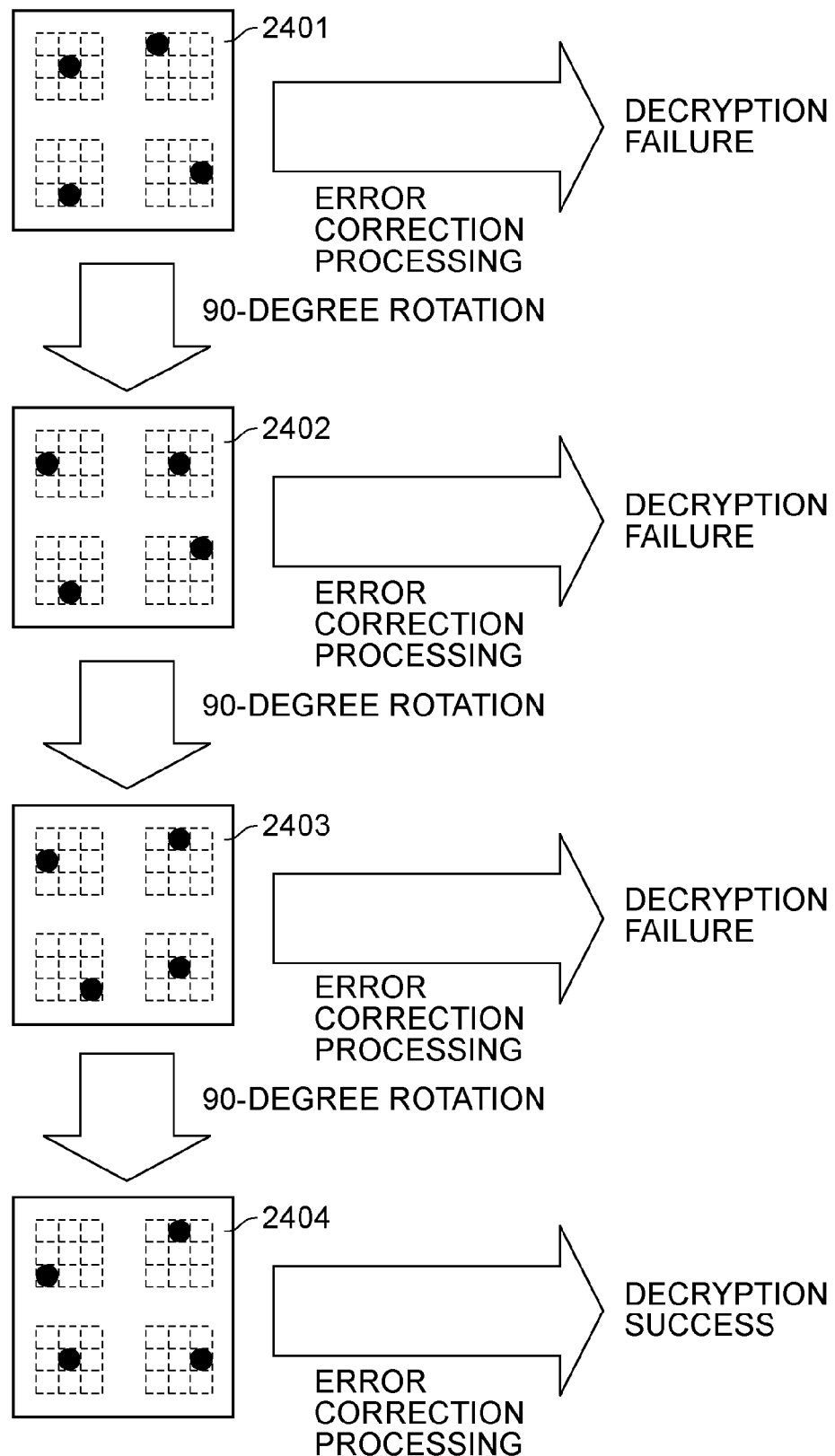
FIG. 31 is a diagram showing a decryption process including error correction performed in consideration with rotation.

FIG. 31 is a diagram showing a decryption operation for performing error correction in consideration with the rotation. This example shows a case where a result rotated by 270 degrees with respect to the proper data is extracted. First, the error-correcting operation is executed on an extracted data 2401. Even if the proper data includes the error-correcting code, the error cannot be corrected since the rotation makes the data meaningless.

The error-correcting operation is then executed on data (90-degree rotated data) 2402 resulting from 90-degree rotation performed on the extracted data 2401. Similarly, the error correction fails and the data cannot be extracted. Furthermore, the error-correcting operation is executed on data (180-degree rotated data) 2403 resulting from 90-degree rotation performed on the 90-degree rotated data 2402. In this case, the error correction also fails and the data cannot be extracted.

At last, the error-correcting operation is executed on data (270-degree rotated data) 2404 resulting from 90-degree rotation performed on the 180-degree rotated data 2403. Since this data is the proper data, the error correction operation succeeds. Accordingly, this data can be adopted as the extracted data. Even if the error-correcting operation fails regarding the 270-degree rotated data 2404, for example, a case where data extraction fails due to many errors and noises can be considered. In this manner, the embedded data contained in the first area can be extracted.

[Decision of Second Area]

The second area is used to register tracking information. Information registered in this area is not necessarily needed at the time of execution of a copy operation. Accordingly, if the information is not needed, a decrease in the entire processing speed can be suppressed by omitting decryption of the second area.

Figure 32:
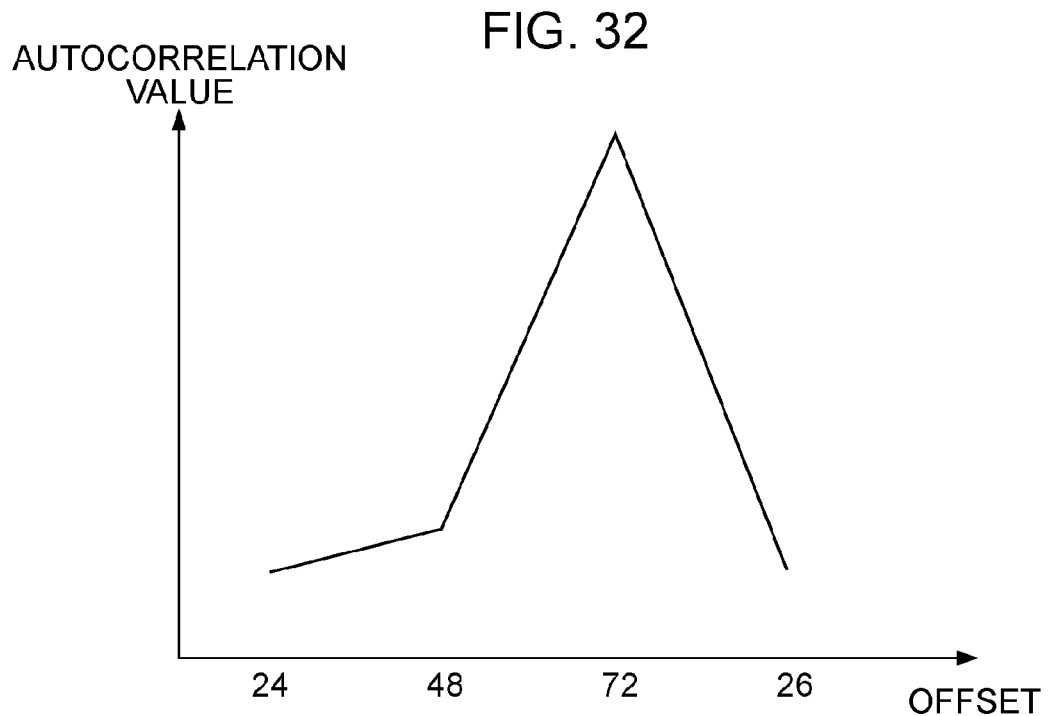
FIG. 32 is a graph showing an example of calculating an autocorrelation value for an offset value in a second area.

A method for deciding the second area will be described. First, as in the case of the first area, autocorrelation of the second area is determined. Since the second area is embedded at an interval integral multiple of the repeated cycle of the first area, an amount of the calculation can be reduced because the autocorrelation is determined at one of the integral multiples (e.g., 24, 48, 72, . . . ) of the repeated cycle of the first area. Furthermore, a repeated cycle of the second area is equal to the size of the second area. FIG. 32 is a graph showing a calculation example of an autocorrelation value for an offset value in the second area. In this case, since the autocorrelation value shows a peak at an offset value equal to "72", the size of the second area is equal to 72.

At last, a start position of the second area is identified. Since the start position of the second area is set to match the start position of the first area at the time of embedding, the start position can be narrowed down to one of the start positions of the first areas.

The error-correction code is utilized in decision of the start position of the second area. As in the case of the first area, the error-correcting code is included in the second area in addition to the embedded data. Since the size of the second area is already known, the error-correcting operation is sequentially executed from the top position of the first area.

Figure 33:
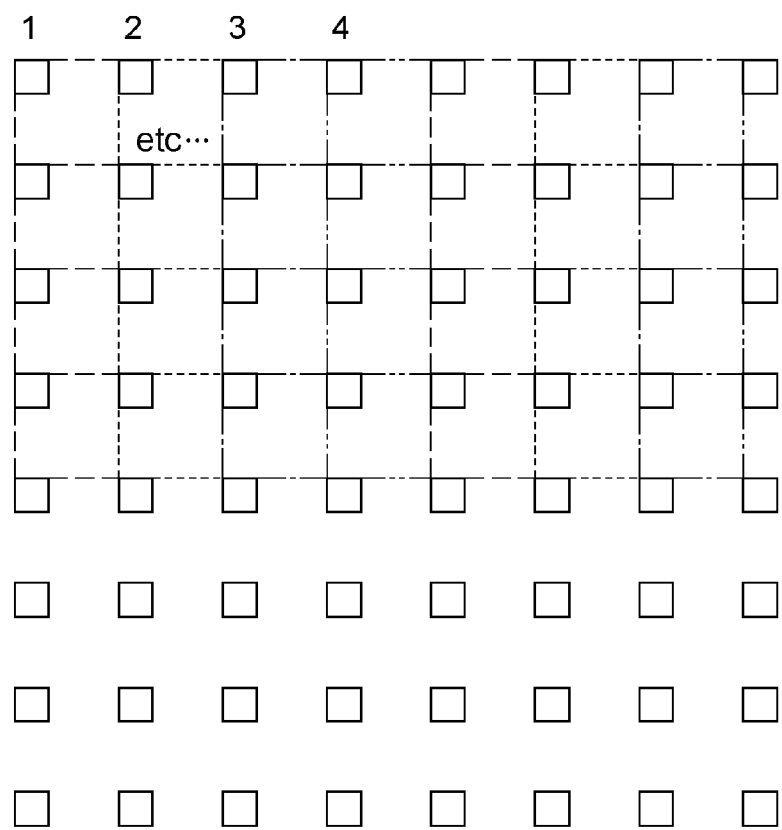
FIG. 33 is a schematic diagram showing a method of deciding a start position of a second area.

FIG. 33 is a schematic diagram showing a method for deciding the start position of the second area. FIG. 33 shows that the size of the second area is a quadruple of the repeated cycle of the first area based on the autocorrelation. Since one of 4×4=16 corresponds to the start position of the second area, the error-correction operation is executed while moving the start position to positions represented by values 1, 2, 3, 4, 5 and so on. If the error-correcting operation succeeds, the position can be adopted as the start position of the second area. Based on the repeated cycle decided here and the magnification, a dot size in vertical and horizontal directions of the second area can be calculated. This dot size in the vertical and horizontal directions of the second area is used in determination of destruction of additional security information. In this manner, embedded information contained in the second area can be extracted.

[Double-Embedding of Additional Security Information]

An operation regarding further embedding of additional security information in a document previously including additional security information (so-called double-embedding of additional security information) will now be described.

Figure 34A:
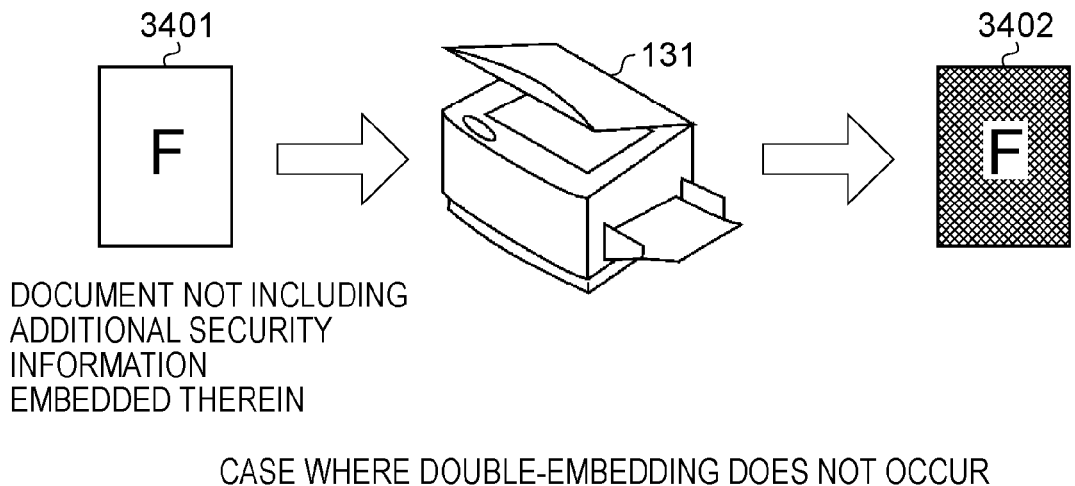
FIGS. 34A and 34B are diagrams illustrating double-embedding of additional security information in a copy job.
Figure 34B:
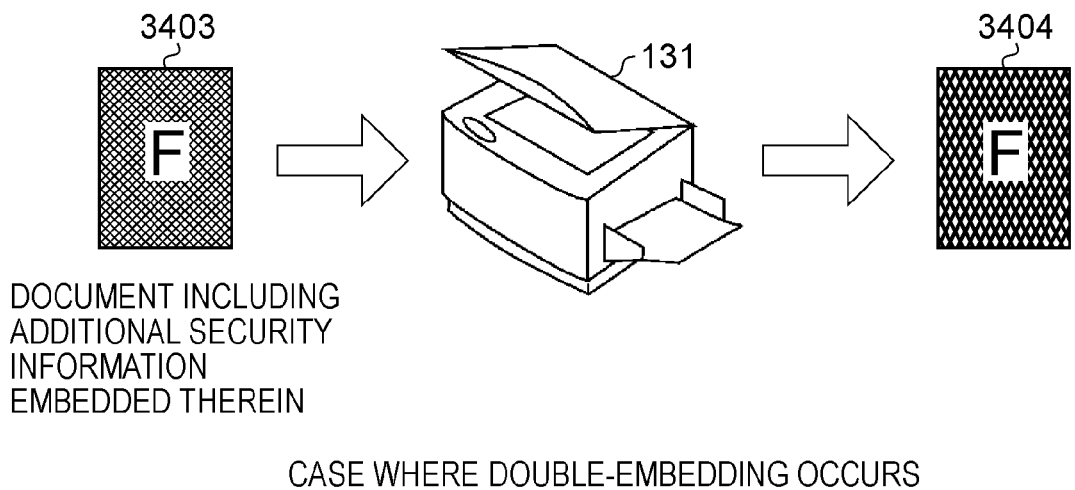

FIG. 34A shows a case where double-embedding of additional security information does not occur, whereas FIG. 34B shows a case where double-embedding of additional security information occurs. The above-described information embedding setting of the application mode or the compulsory information embedding setting of the administrator setting (a setting for compulsorily embedding and printing additional information in a scanned document) is selected in an image forming apparatus 131.

Referring to FIG. 34A, if the image forming apparatus 131 copies a document 3401 not including additional security information embedded therein, a printed output 3402 in which additional security information is embedded according to the information embedding setting of the application mode (or the compulsory information embedding setting) is obtained.

On the other hand, referring to FIG. 34B, if the image forming apparatus 131 copies a document 3403 previously including additional security information embedded therein, a printed output 3404 in which additional security information is further embedded according to the information embedding setting of the application mode is obtained. As in the case of FIG. 34A, the setting may be the compulsory embedding setting instead of the information embedding setting of the application mode.

In this case, two pieces of information, additional security information originally embedded in the document and additional security information newly embedded by the image forming apparatus 131, are embedded in the printed output (printed material) 3404. Accordingly, another coded image is combined at an area overlapping an area of a document image where a coded image has previously been combined. The image analyzing section 312 may be unable to successfully obtain these pieces of additional security information from a document having doubly embedded additional security information. Thus, further embedding of additional security information in a document previously having embedded additional security information destroys the original additional security information, which becomes a security hole.

FIGS. 35A and 35B are diagrams illustrating double-embedding of additional security information in a print job as in the case of a copy job. A difference from the copy job (see FIGS. 34A and 34B) is that a document input to an image forming apparatus 131 is not paper but is print data fed from a client PC 111.

FIG. 35A shows a print job in which double-embedding of additional security information does not occur, whereas FIG. 35B shows a print job in which double-embedding of additional security information occurs. Referring to FIG. 35B, a printed output 3504 in which additional security information is further embedded by the image forming apparatus 131 in print data 3503 including additional security information embedded by a printer driver is obtained.

[Operation of Job Control Determining Section (Pattern 1)]

As described with reference to FIGS. 34A and 34B and FIGS. 35A and 35B, the original additional security information is destroyed in the printed output 3404 (or 3504) including doubly embedded additional security information, which undesirably becomes a security hole.

Figure 37:
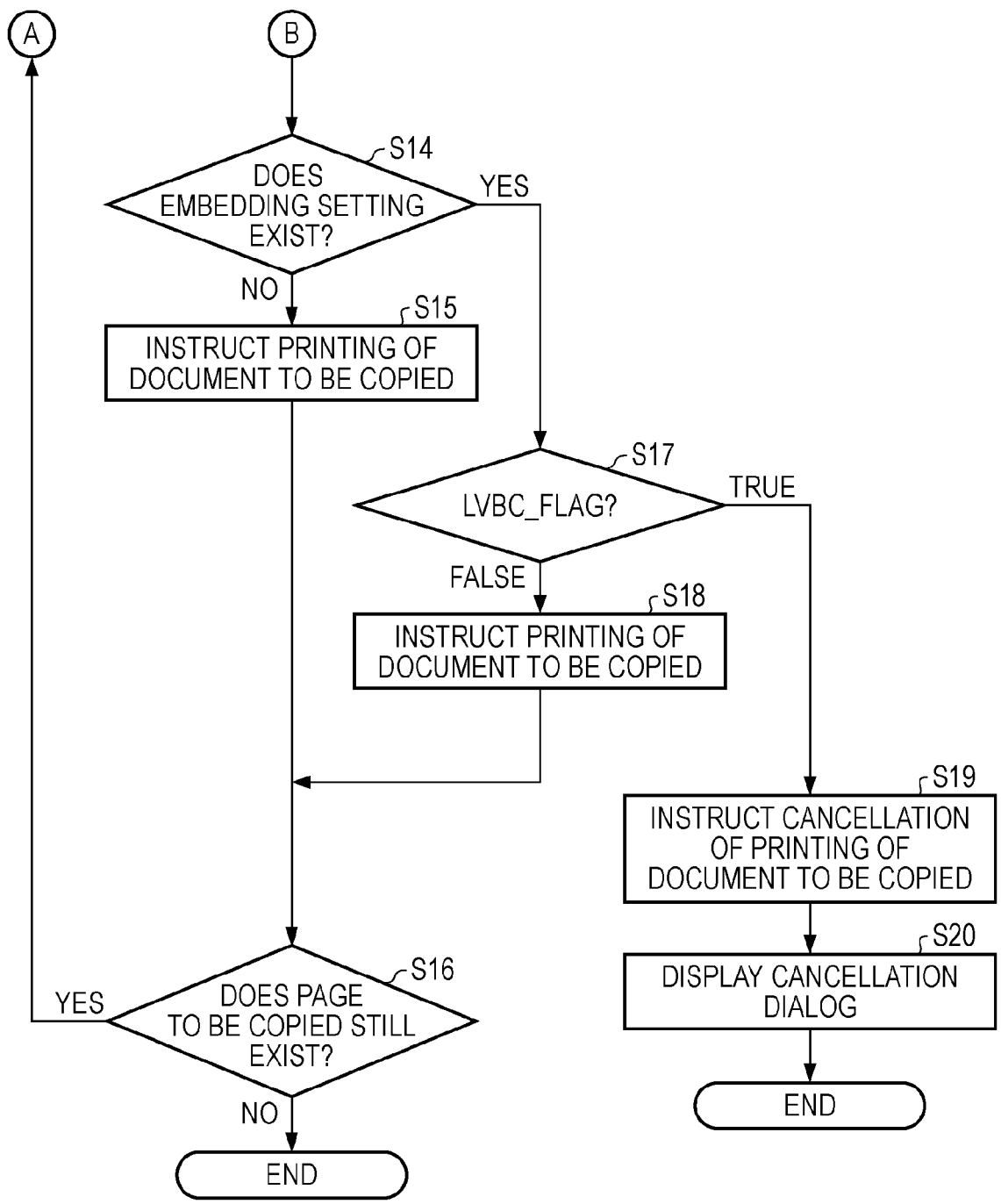
FIG. 37 is a flowchart showing a procedure of an operation performed by a job control determining section 903 following the flowchart of FIG. 36.

An operation performed by the job control determining section 903 to prevent further additional security information from being embedded in the document 3403 (or 3503) previously including the embedded additional information will now be described. FIGS. 36 and 37 are flowcharts illustrating a procedure of an operation of the job control determining section 903.

At the time of a start of a copy operation, the job control determining section 903 determines whether to instruct the printing section 314 to print or to cancel printing of image data obtained by performing necessary image processing on an image scanned by the image scanning section 901.

First, the job control determining section 903 waits for the image scanning section 901 to complete scanning an image (STEP S1). After the completion of scanning of the image, the job control determining section 903 extracts first information (information embedded in the first area) of the additional security information from the scanned image at the image analyzing section 312 (STEP S2). The job control determining section 903 determines whether the extraction of the first information has succeeded (STEP S3).

If the extraction of the first information has not succeeded (NO of STEP S3), the job control determining section 903 sets a flag LVBC_FLAG to FALSE and determines that additional security information is not originally embedded in the scanned image (STEP S4). This flag LVBC_FLAG is registered in a storage medium that the job control determining section 903 can access. The job control determining unit 903 then advances the process to STEP S14.

On the other hand, if the extraction of the first information has succeeded at STEP S3 (YES of STEP S3), the job control determining section 903 sets the flag LVBC_FLAG to TRUE and determines that additional security information is embedded in the scanned image (STEP S5). The job control determining section 903 detects existence or absence of a conditioned copy restriction code embedded (included) in the first information (STEP S6).

If the conditioned copy restriction code exists (is included) (YES of STEP S6), the job control determining section 903 extracts second information (information embedded in the second area of the additional security information) (STEP S10). The job control determining section 903 compares an authorization code extracted from the second area with a password input on the authorization dialog 702 (see FIG. 7) (STEP S11). If it is determined that the authorization has failed (the passwords do not match) at STEP S11 (NO of STEP S11), the job control determining section 903 instructs the printing section 314 to cancel the printing operation (STEP S12). Meanwhile, character strings can be compared or results of the one-way hush function applied to the character strings can be evaluated to compare the passwords. The job control determining section 903 displays a message indicating cancellation of the job on an operation panel (STEP S13). The job control determining section 903 then terminates this operation.

On the other hand, if it is determined that the authorization has succeeded (the passwords match) at STEP S11 (YES of STEP S11), the job control determining section 903 advances the process to STEP S14.

In addition, if the conditioned copy restriction code is not detected at STEP S6 (NO of STEP S6), the job control determining section 903 determines whether copying is permitted (STEP S7). If copying is permitted (YES of STEP S7), the job control determining section 903 advances the process to STEP S14. Here, a case where copying is permitted corresponds to a case where a document is printed under a setting of "permit copying" selected with the radio button 502 (see FIG. 5) and a case where a document is printed under a setting of "permit copying" selected with the radio button 3102 (see FIG. 12).

On the other hand, if copying is not permitted at STEP S7 (NO of STEP S7), the job control determining section 903 instructs the printing section 314 to cancel the printing operation (STEP S8). Here, a case where copying is not permitted corresponds to a case where a document is printed under a setting of "prohibit copying" selected with the radio button 502 (see FIG. 5) and a case where a document is printed under a setting of "prohibit copying" selected with the radio button 3102 (see FIG. 12). The job control determining section 903 displays a message indicating cancellation of a job on an operation panel (STEP S9). The job control determining section 903 then terminates this operation.

After the processing of STEP S4 or in the case of YES at STEPs S7 and S11, the job control determining section 903 determines whether a user has selected the additional-security-information embedding setting or whether an administrator has selected the compulsory information embedding setting (STEP S14). The user selects the additional-security-information embedding setting by pressing the information embedding button 2904 (see FIG. 10) on the application mode setting dialog. The administrator selects the compulsory information embedding setting by pressing the compulsory information embedding setting button 3304 (see FIG. 15) on the administrator setting dialog. In the case of YES at STEPs S7 and S11, the processing performed by the job control determining section 903 at STEP S14 corresponds to an operation of a setting determining unit.

If the embedded setting is not selected (NO of STEP S14), the job control determining section 903 instructs the printing section 314 to print the document to be copied (hereinafter, referred to as a copy target document) (STEP S15). In the processing performed at STEP S15, the print instruction can be issued since the additional-security-information embedding setting does not exist at STEP S14 regardless of whether the additional security information has previously been embedded in the copy target document. Meanwhile, the operation performed by the job control determining section 903 corresponds to an operation of a print permitting unit.

On the other hand, if it is determined that additional-security-information embedding setting is selected at STEP S14 (YES of STEP S14), the job control determining section 903 determines whether additional security information has previously been embedded in the copy target document based on the value of the flag LVBC_FLAG (STEP S17).

If the flag LVBC_FLAG indicates FALSE, i.e., if the additional security information is not embedded, the job control determining section 903 instructs the printing section 314 to print image data including additional security information embedded by the image processing section 905 (STEP S18). In the processing performed at STEP S18, the instruction for printing the image data including the additional security information embedded by the image processing section 905 can be issued since the additional security information is not originally embedded in the copy target document.

After the processing of STEP S15 or S18, the job control determining section 903 determines whether a following copy target document exists (STEP S16). If the following copy target document exists (YES of STEP S16), the job control determining section 903 returns the process to STEP S1 and waits for the next document to be scanned. On the other hand, if the following copy target document does not exist (NO of STEP S16), the job control determining section 903 terminates this operation.

In addition, if it is determined that the flag LVBC_FLAG indicates TRUE at STEP S17, the job control determining section 903 instructs the printing section 314 to cancel printing of image data including additional security information embedded by the image processing section 905 (STEP S19) because embedding of further additional security information means double embedding and this has to be prohibited. Here, a case where the flag LVBC_FLAG is determined to be TRUE corresponds to a case where additional security information has previously been embedded in the copy target document. An operation performed by the job control determining section 903 at STEP S19 to cause the printing section 314 to suspend the printing corresponds to an operation of a print suspending unit. As shown in FIG. 16, the image forming apparatus according to this exemplary embodiment does not have a configuration for allowing the job control determining section 903 to prohibit the image processing section 905 from combining images (which is indicated since an arrow is not extending therebetween). Accordingly, the job control determining section 903 prohibits double-embedding of additional security information by canceling this printing operation.

Alternatively, the image forming apparatus may be configured so that the job control determining unit 903 can prohibit the image processing section 905 from combining the image, for example, and the job control determining section 903 may prohibit the embedding of new additional security information (i.e., combination of a new coded image) if the additional security information is possibly embedded doubly (if the flag indicates TRUE at STEP S17).

The job control determining section 903 displays a message indicating cancellation of the job on an operation panel (STEP S20). The job control determining section 903 then terminates this operation.

The image forming apparatus according to the first exemplary embodiment can prevent new additional security information from being combined and printed on a document previously including embedded additional security information. More specifically, when digital data is doubly embedded in a copy job, the image forming apparatus can prevent the double-embedding operation by canceling the job. Through this operation, a copy operation can be performed without destroying the additional security information and convenience of a user improves.

Second Exemplary Embodiment

Since configurations of an image forming apparatus and a network printing system according to a second exemplary embodiment of the present invention are the same as those of the first exemplary embodiment, a description thereof is omitted by using the same numerals.

[Operation of Job Control Determining Section (Pattern 2)]

In the first exemplary embodiment, when additional security information is possibly embedded doubly, a print operation is cancelled. In the second exemplary embodiment, the printing operation is not cancelled unconditionally but whether to permit printing is decided according to a setting of an administrator even if the additional security information is possibly embedded doubly.

Figure 38:
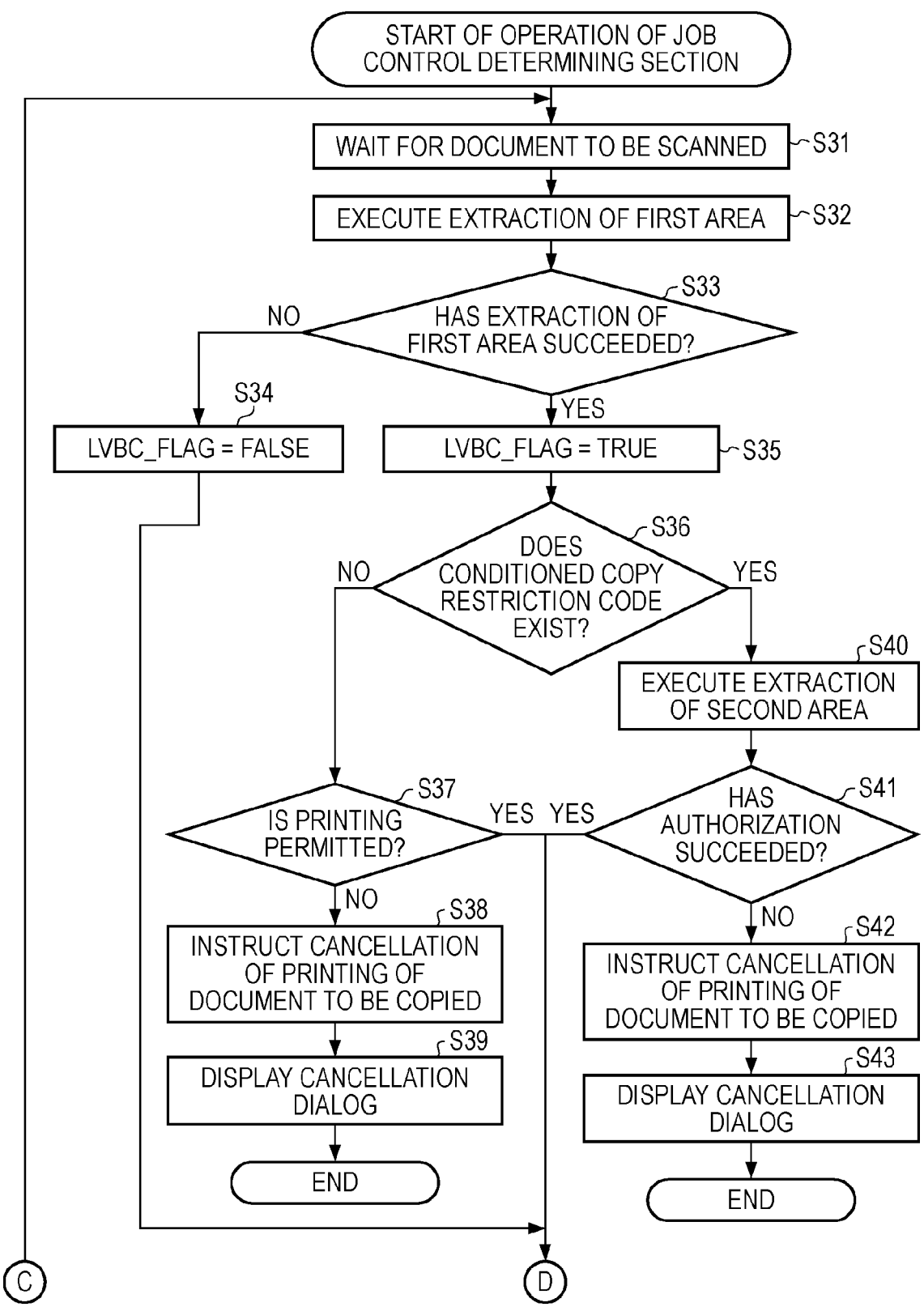
FIG. 38 is a flowchart showing a procedure of an operation performed by a job control determining section 903 when whether printing is permitted is decided according to an administrator setting in accordance with a second exemplary embodiment of the present invention.
Figure 39:
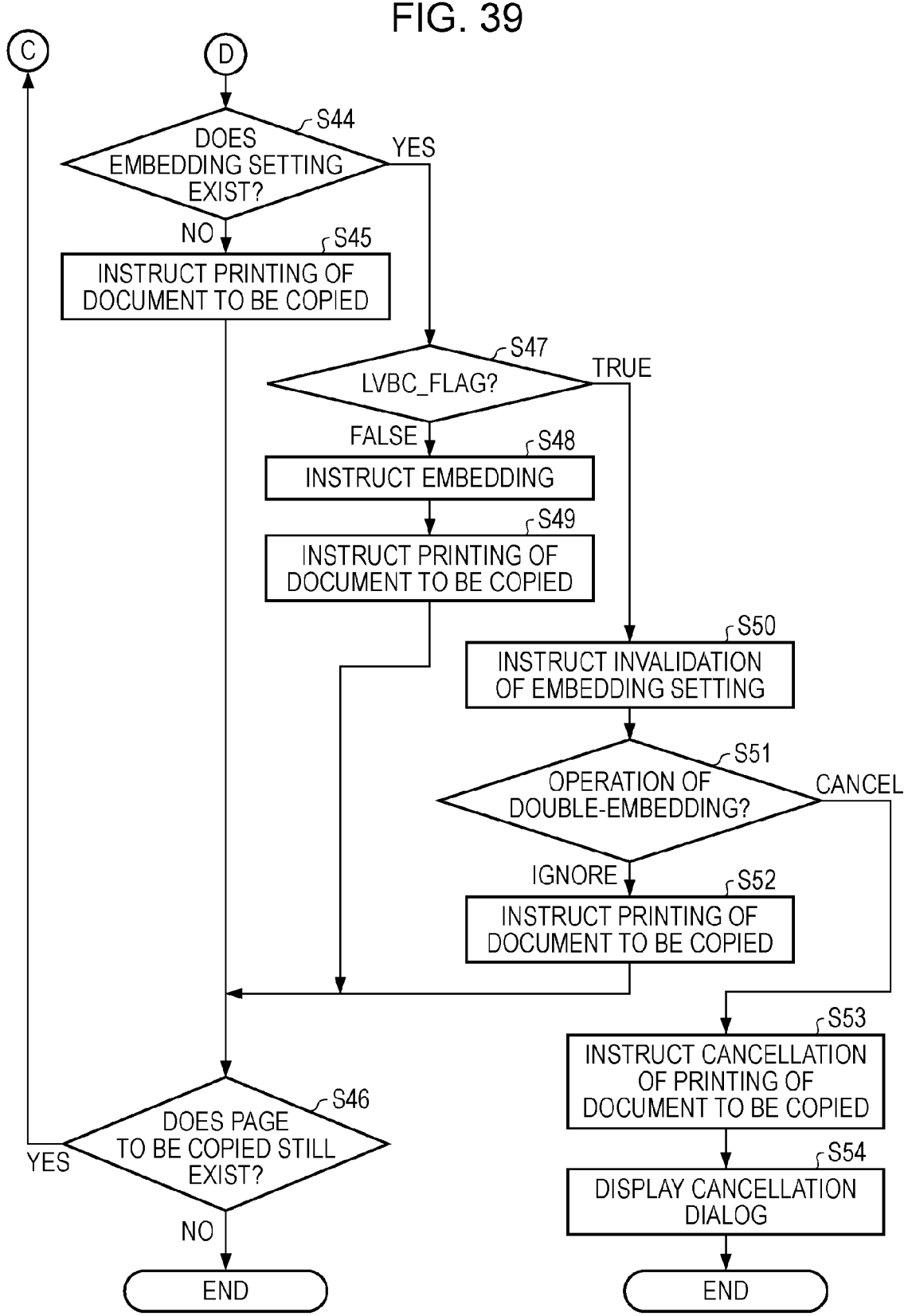
FIG. 39 is a flowchart showing a procedure of an operation performed by a job control determining section 903 when whether printing is permitted is decided according to an administrator setting following a flowchart of FIG. 38.

FIGS. 38 and 39 are flowcharts illustrating a procedure of an operation performed by a job control determining section 903 when permission or prohibition of a printing operation is decided according to an administrator setting in accordance with the second exemplary embodiment.

Figure 40:
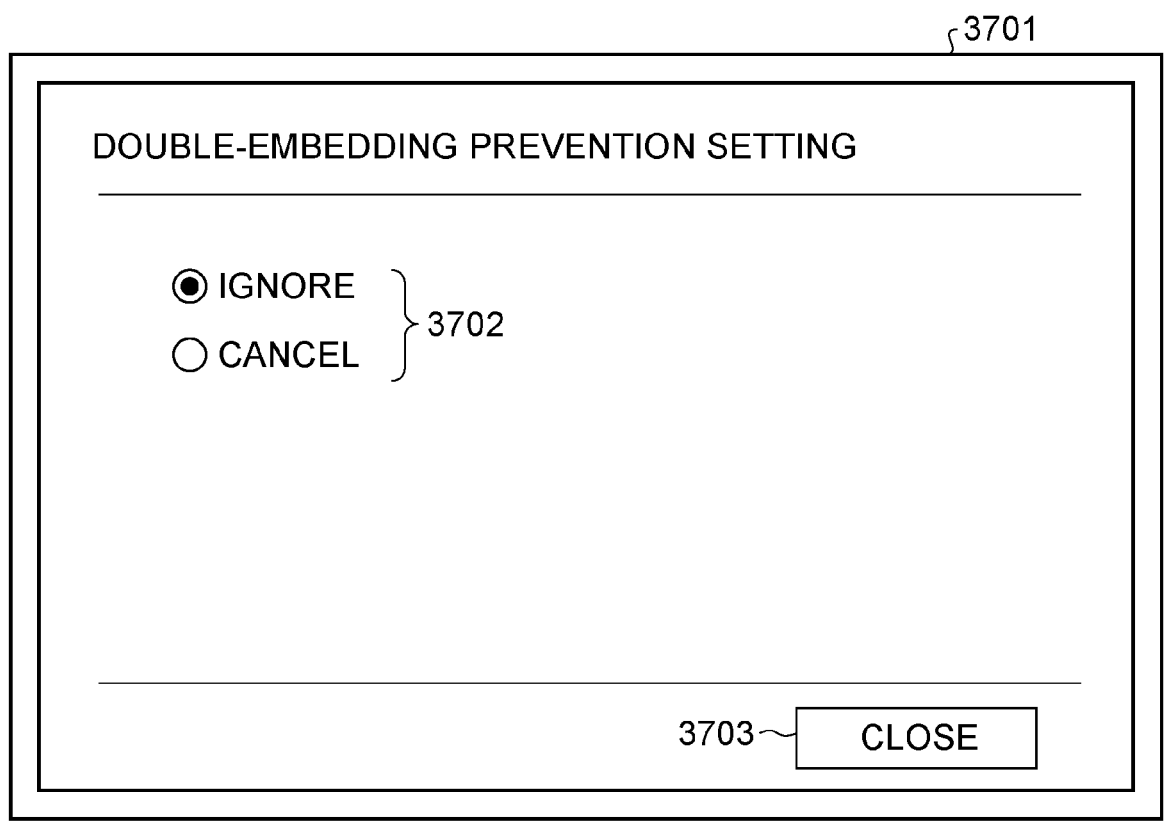
FIG. 40 is a GUI showing a double-embedding prevention setting dialog 3701 displayed in response to pressing of a double-embedding prevention button 3305 on an administrator setting dialog (see FIG. 15).

First, an administrator setting for permitting or prohibiting the printing operation when additional security information is embedded doubly will be described. FIG. 40 is a GUI showing a double-embedding prevention setting dialog 3701 displayed in response to pressing of a double-embedding prevention button 3305 on an administrator setting dialog (see FIG. 15).

Radio buttons 3702 allow one of an option "IGNORE" for invalidating additional-security-information embedding setting and an option "CANCEL" for canceling a printing operation as in the case of FIG. 36 to be selected when double-embedding possibly occurs. In this embodiment, copying is permitted if "permit copying" is embedded in a document. The document is dealt in the same way with a document in which no information is embedded or no coded image exists. Therefore, it means nothing at a glance that "permit copying" is embedded. However, "permit copying" means a lot. Suppose that the "IGNORE" option should be selected, then a coded image is not combined with the document in which "permit copying" is embedded. On the other hand, a coded image is combined with the document in which no information is embedded or no coded image exists. Thus, "permit copying" means a lot because it makes copier not combine a coded image with a document.

Figure 41:
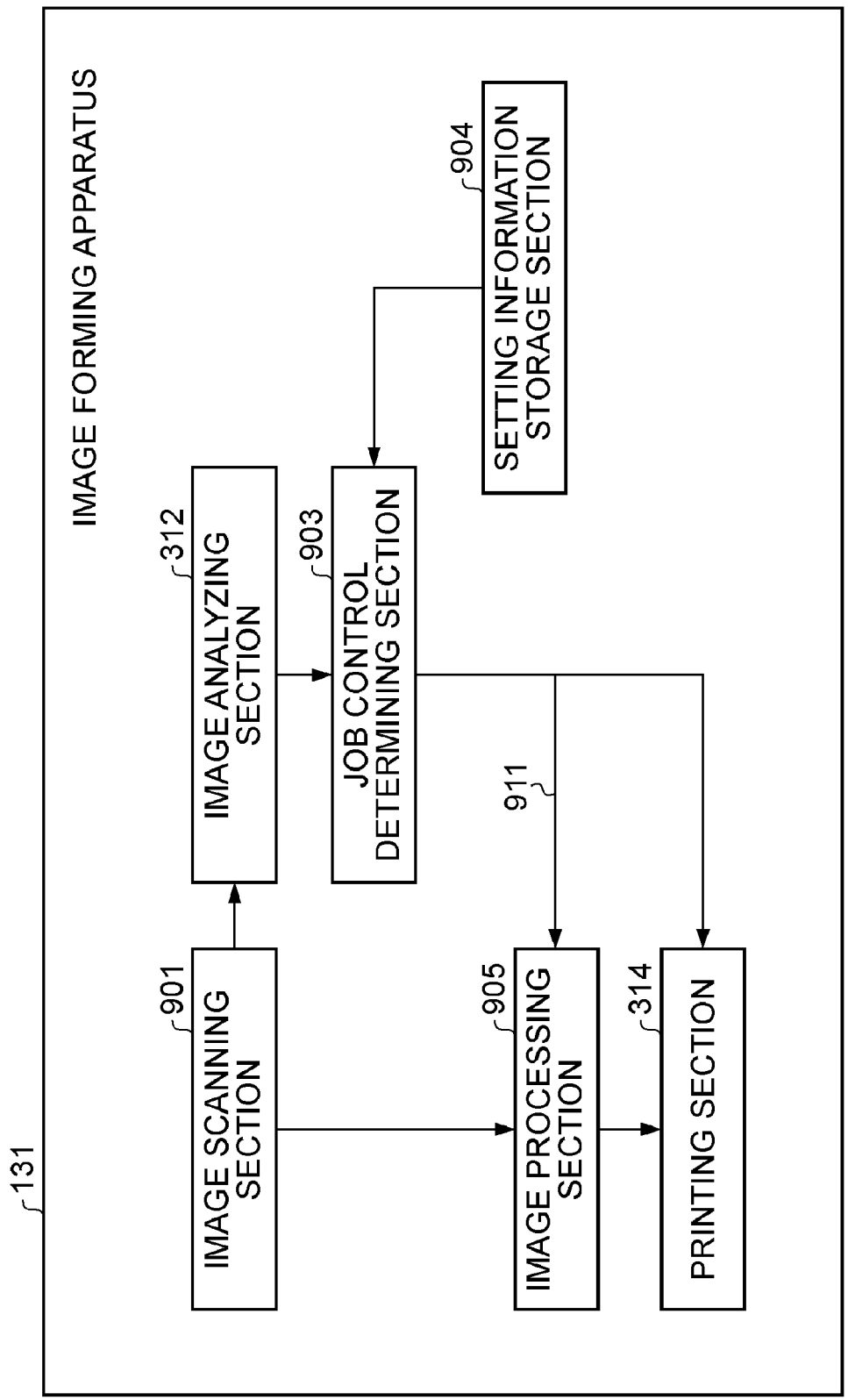
FIG. 41 is a diagram showing a functional configuration of an image forming apparatus for realizing operations of "ignore" and "cancel".

FIG. 41 is a diagram showing a functional configuration of an image forming apparatus for realizing operations of "IGNORE" and "CANCEL". Comparison of the functional configuration of the image forming apparatus shown in this drawing and that of the image forming apparatus shown in FIG. 16 reveals that a line 911 indicating exchange of data from the job control determining section 903 to an image processing section 905 is added. This addition allows the job control determination section 903 to control the image processing section 905 to or not to embed the information according to a determination result of the job control determining section 903. The same numerals are attached to elements that are common to those shown in FIG. 16.

If the job control determining section 903 determines that the information embedding is not performed at the image processing section 905, embedding setting is treated as invalid even if the additional-security-information embedding setting is selected. The image processing section 905 operates to transfer an image received from an image scanning section 901 to a printing section 314 without processing the image. To realize this operation, the image processing section 905 starts the operation after receiving the determination result of the job control determining section 903 when the additional-security-information embedding setting is selected. This is indicated by an existence of the arrow 911 between the job control determining section 903 and the image processing section 905.

An operation for invalidating the additional-security-information embedding setting or for canceling a job regarding a document 3403 previously including embedded additional security information according to the administrator's setting of the double-embedding prevention button 3305 will be described.

Referring to FIGS. 38 and 39, since processing of STEPs S31 to S47 is the same as that of STEPs S1 to S17 shown in FIGS. 36 and 37, a description thereof is omitted.

If a flag LVBC_FLAG indicates FALSE at STEP S47, the job control determining section 903 instructs the image processing section 905 to embed additional security information since additional security information has not been embedded (STEP S48). Furthermore, the job control determining section 903 instructs the printing section 314 to print a copy target document (STEP S49). The job control determining section 903 then terminates this operation.

On the other hand, if the flag LVBC_FLAG indicates TRUE at STEP S47, the job control determining section 903 instructs the image processing section 905 to invalidate the additional-security-information embedding setting (STEP S50). The job control determining section 903 determines the administrator's setting of the double-embedding prevention button 3305 (STEP S51).

If the double-embedding prevention button 3305 is set to "IGNORE", the job control determining section 903 instructs the printing section 314 to print the copy target document (STEP S52). The print instruction given at STEP S52 is an instruction for performing a printing operation without embedding the additional security information according to the administrator's setting when the additional security information is possibly embedded doubly. Meanwhile, reception of this instruction corresponds to an operation of a receiving unit.

On the other hand, if the double-embedding prevention button 3305 is set to "CANCEL" at STEP S51, the job control determining section 903 instructs the printing section 314 to cancel the printing operation (STEP S53). The job control determining section 903 displays a message indicating cancellation of the job on an operation panel (STEP S54). The job control determining section 903 then terminates this operation.

The image forming apparatus according to the second exemplary embodiment can determine whether to permit a printing operation according to an administrator's setting without canceling the printing operation unconditionally even if the double-embedding possibly occurs. More specifically, when digital data is embedded doubly in a copy job, a double-embedding operation can be suppressed while adjusting tradeoff between trackability and job output by switching contents of the printing operation according to the setting "IGNORE" or "CANCEL".

Third Exemplary Embodiment

Since configurations of an image forming apparatus and a network printing system according to a third exemplary embodiment of the present invention are the same as those of the first exemplary embodiment, a description thereof is omitted by using the same numerals.

[Operation of Job Control Determining Section (Pattern 3)]

In the second exemplary embodiment, "IGNORE" for invalidating an embedding setting and "CANCEL" for canceling a job can be set according to an administrator's setting when double-embedding of additional security information possibly occurs. In the third exemplary embodiment, a description will be given for a case where a content of additional security information previously embedded in a copy target document is compared with that of additional security information to be embedded and permission or prohibition of a printing operation is decided according to the comparison result.

Figure 42:
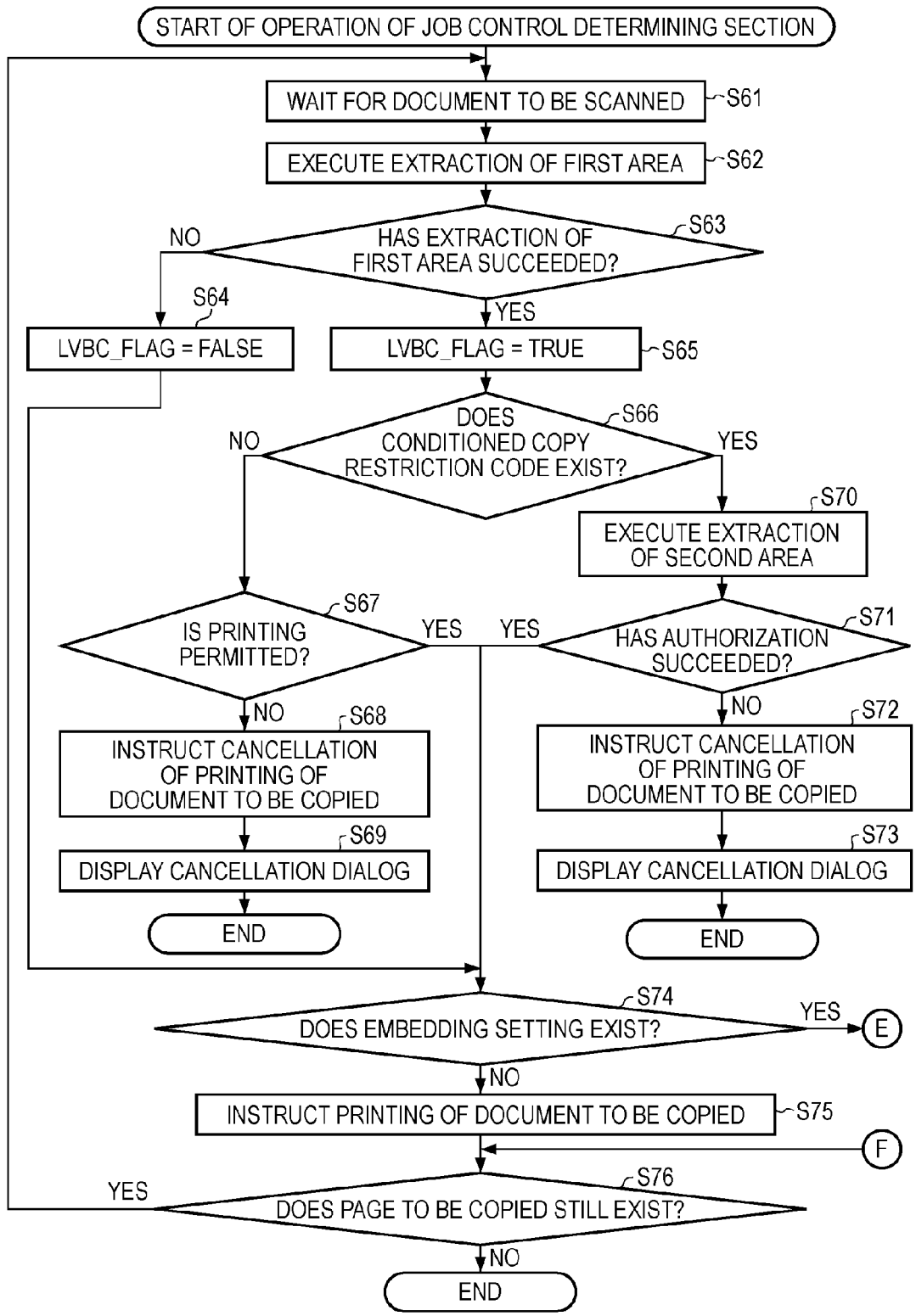
FIG. 42 is a flowchart showing a procedure of an operation performed by a job control determining section 903 when whether printing is permitted is decided according to a result of comparison of contents of additional security information in accordance with a third exemplary embodiment of the present invention.
Figure 43:
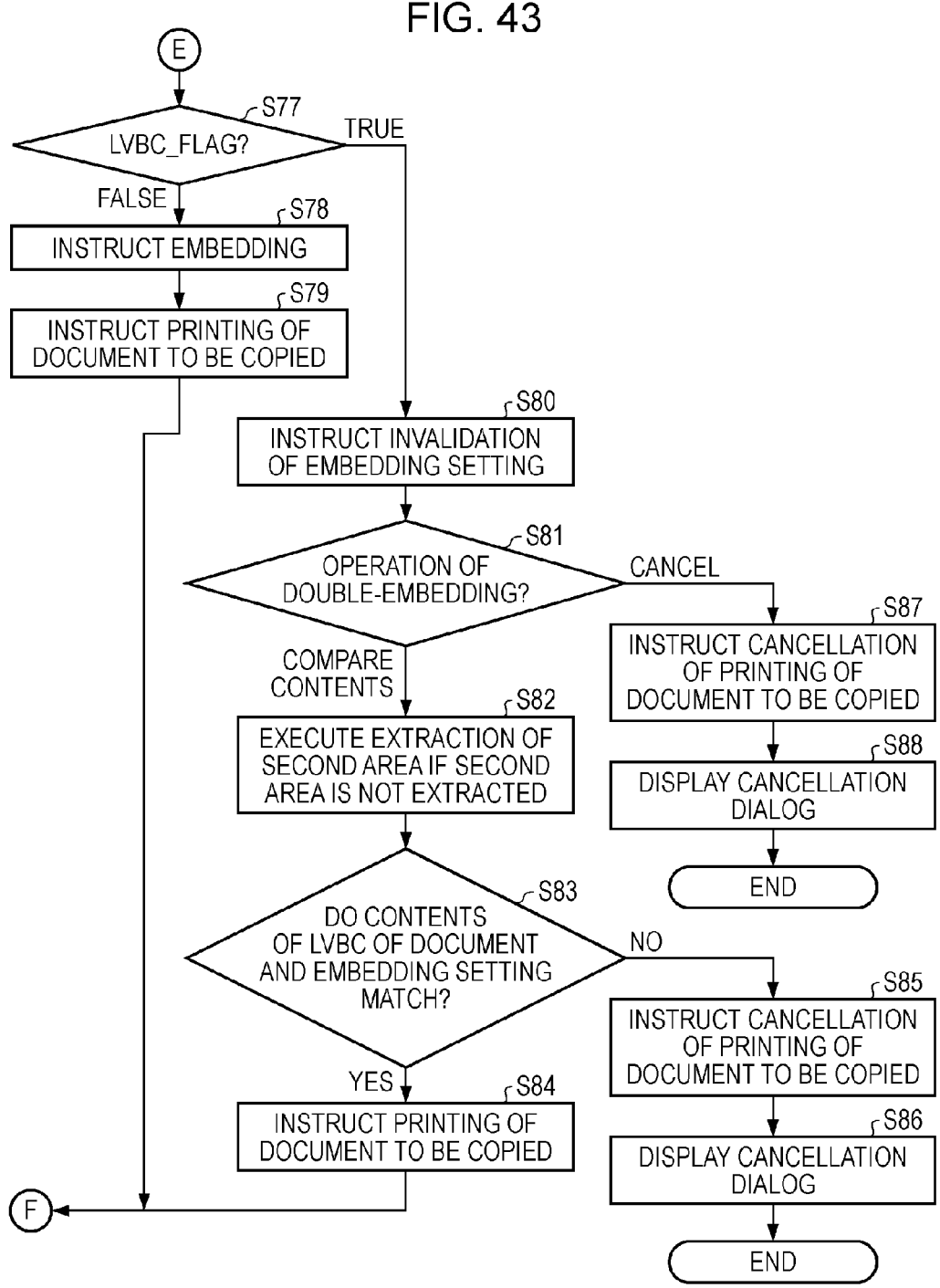
FIG. 43 is a flowchart showing a procedure of an operation performed by a job control determining section 903 when whether printing is permitted is decided according to a result of comparison of contents of additional security information following a flowchart of FIG. 42.

FIGS. 42 and 43 are flowcharts showing a procedure of an operation performed by a job control determining section 903 when permission or prohibition of a printing operation is decided according to a result of comparison of contents of additional security information according to the third exemplary embodiment.

Figure 44:
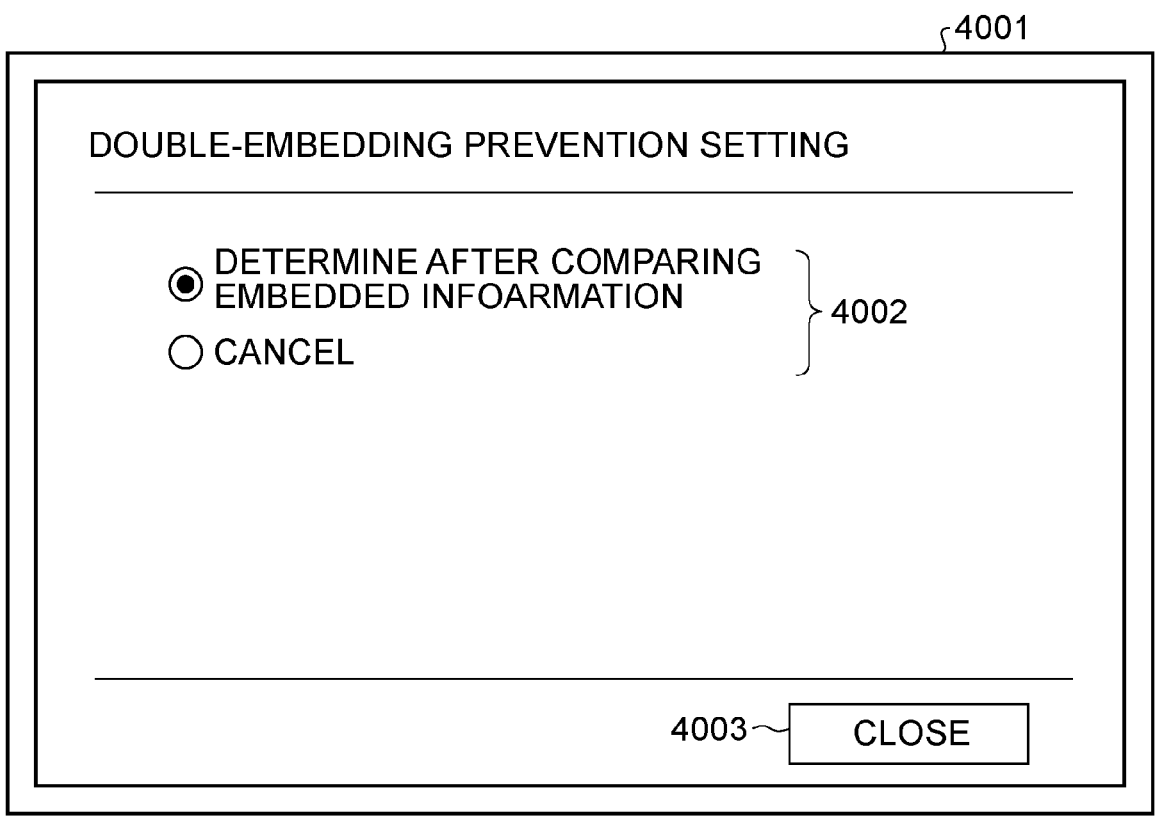
FIG. 44 is a GUI showing a double-embedding prevention setting dialog 4001 displayed in response to pressing of a double-embedding prevention button 3305 on an administrator setting dialog (see FIG. 15).

First, an administrator's setting regarding permission or prohibition of a printing operation when additional security information is doubly embedded will be described. FIG. 44 is a GUI showing a double-embedding prevention setting dialog 4001 displayed in response to pressing of a double-embedding prevention button 3305 on an administrator setting dialog (see FIG. 15). Radio buttons 4002 allow one of an option "DETERMINE AFTER COMPARING EMBEDDED INFORMATION" and an option "CANCEL" for canceling the printing operation as in the case of FIG. 36 to be selected when double-embedding occurs. Regarding "DETERMINE AFTER COMPARING EMBEDDED INFORMATION", a content of additional security information previously embedded in a copy target document is compared with that of additional security information to be embedded. If the contents match completely or partially as a result of comparison, the printing operation is performed after invalidating the additional-security-information embedding setting.

In the comparison of the embedded information, additional security information previously embedded in a copy target document is compared with copy prohibition information set in FIG. 12 and tracking information set in FIG. 13 to be embedded. In the case of double-embedding, the printing operation can be performed after invalidating the additional-security-information embedding setting only when the contents of the copy prohibition information completely match and user names of the tracking information match.

According to the administrator's setting of the double-embedding prevention button 3305 (see FIG. 44), contents of the additional security information are compared at the time of embedding of further additional security information in a document 3403 previously including embedded additional security information. An operation performed by the job control determining section 903 to invalidate the embedding setting or to cancel the job according to the comparison result will be described.

Referring to FIGS. 42 and 43, since processing of STEPs S61 to S79 is the same as that of STEPs S31 to S49 shown in FIGS. 38 and 39, a description thereof is omitted.

If a flag LVBC_FLAG indicates TRUE at STEP S77, the job control determining section 903 instructs an image processing section 905 to invalidate an additional-security-information embedding setting (STEP S80). The job control determining section 903 determines the administrator's setting of the double-embedding prevention button 3305 (STEP S81). If the double-embedding prevention button 3305 is set to "DETERMINE AFTER COMPARING EMBEDDED INFORMATION", the job control determining section 903 extracts a second area when the second area has not been extracted (STEP S82). The job control determining section 903 compares a content of additional security information previously embedded in a copy target document with a content of additional security information to be embedded (STEP S83). The operation performed by the job control determining section 903 corresponds to an operation of a matching determining unit. If the contents match, the job control determining section 903 instructs a printing section 314 to print a copy target document (STEP S84). The job control determining section 903 returns the process to STEP S76.

On the other hand, if the contents of the additional security information do not match at STEP S83, the job control determining section 903 instructs the printing section 314 to cancel the printing operation (STEP S85). Furthermore, the job control determining section 903 displays a message indicating cancellation of the job on an operation panel (STEP S86). The job control determining section 903 then terminates this operation.

In addition, if the double-embedding prevention button 3305 is set to "CANCEL" at STEP S81, the job control determining section 903 instructs the printing section 314 to cancel the printing operation as in the case of the double-embedding operation shown in FIG. 36 (STEP S87). Furthermore, the job control determining section 903 displays a message indicating cancellation of a job on an operation panel (STEP S88). The job control determining section 903 then terminates this operation.

The image forming apparatus according to the third exemplary embodiment compares a content of additional security information previously embedded in a copy target document and a content of additional security information to be embedded and can determine whether to permit or prohibit a printing operation according to the comparison result. More specifically, an operation of doubly embedding digital data can be suppressed by switching kinds of the printing operation according to a result of comparison of embedded digital data with digital data to be embedded in a copy job.

In the above-described first, second, and third exemplary embodiments, a copy job using an image scanned by the image scanning section 901 as a copy target image has been described. In fourth, fifth, and sixth exemplary embodiments to be described below, a print job will be described. In the print job, an image forming apparatus further embeds additional security information in an image including additional security information embedded by a client PC, whereby double-embedding is caused (see FIG. 35B).

Fourth Exemplary Embodiment

Figure 45:
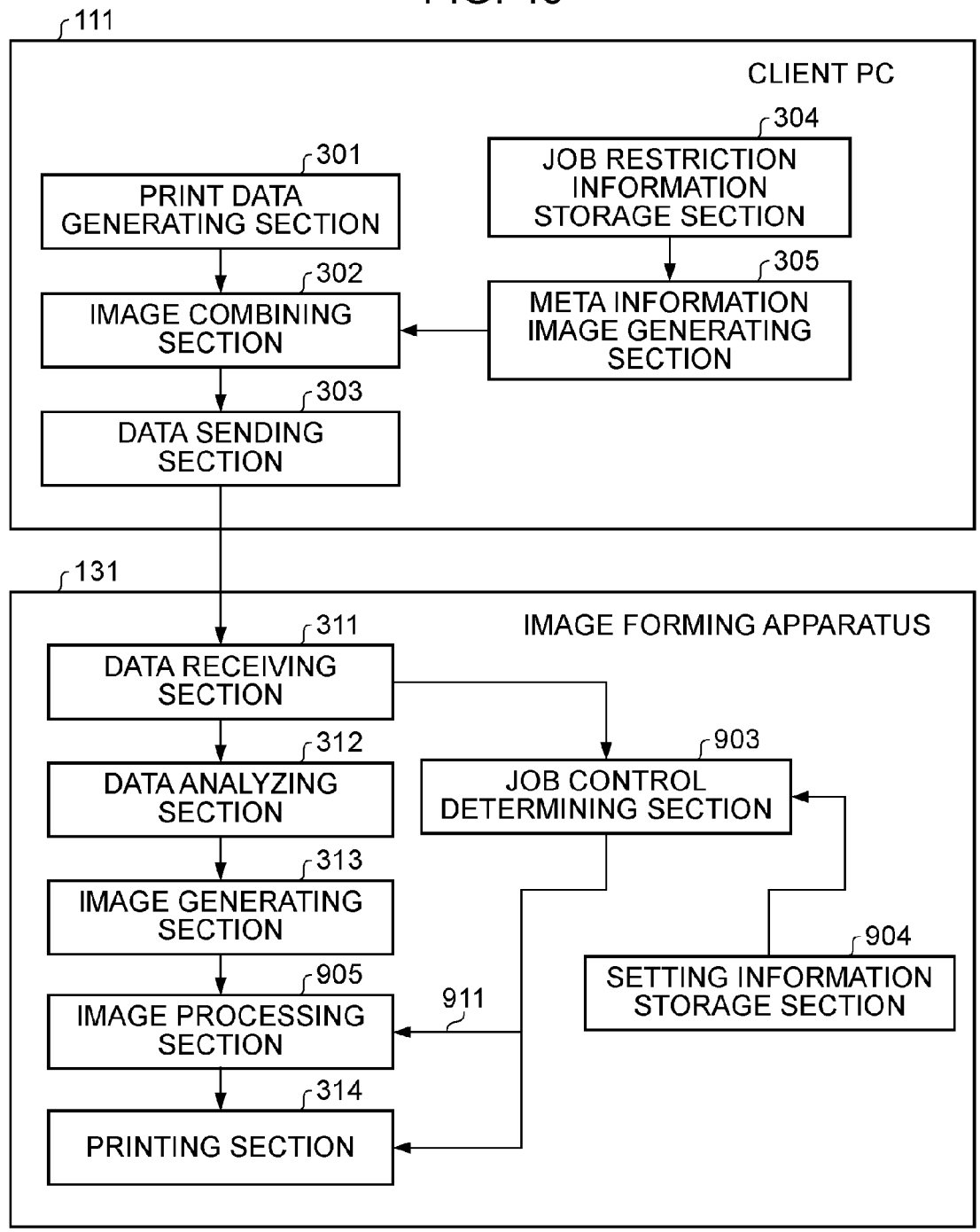
FIG. 45 is a diagram showing a functional configuration of an client PC and an image forming apparatus when a copy restriction operation is performed in accordance with a fourth exemplary embodiment of the present invention.

An operation performed when both of a client PC and an image forming apparatus embed additional security information will now be described. Since configurations of an image forming apparatus and a network printing system according to a fourth exemplary embodiment of the present invention are the same as those of the first exemplary embodiment, a description thereof is omitted by using the same numerals.
[Double-Embedding of Additional Security Information in Print Job]
FIG. 45 is a diagram showing a functional configuration of a client PC 111 and an image forming apparatus 131 when a copy restriction operation according to the fourth exemplary embodiment is performed. In this network printing system, the image forming apparatus 131 can further embed additional security information in an image including additional security information embedded by the client PC 111. A configuration of each section of the client PC 111 is the same as that shown in FIG. 3.

The client PC 111 combines print data and additional security information according to a result of a user operation on a security setting dialog (see FIG. 5) and sends the print data to the image forming apparatus 131. At this time, the client PC 111 sends information regarding a kind of the combined additional security information to the image forming apparatus 131 in addition to the print data.

On the other hand, a configuration of the image forming apparatus 131 that receives the print data is substantially the same as those shown in FIGS. 16 and 41. Referring to FIG. 45, a data receiving section 311, a data analyzing section 312, and an image generating section 313 are provided instead of an image scanning section 901. This configuration allows the image forming apparatus to further embed additional security information in the additional-security-information containing print data.

Figure 46:
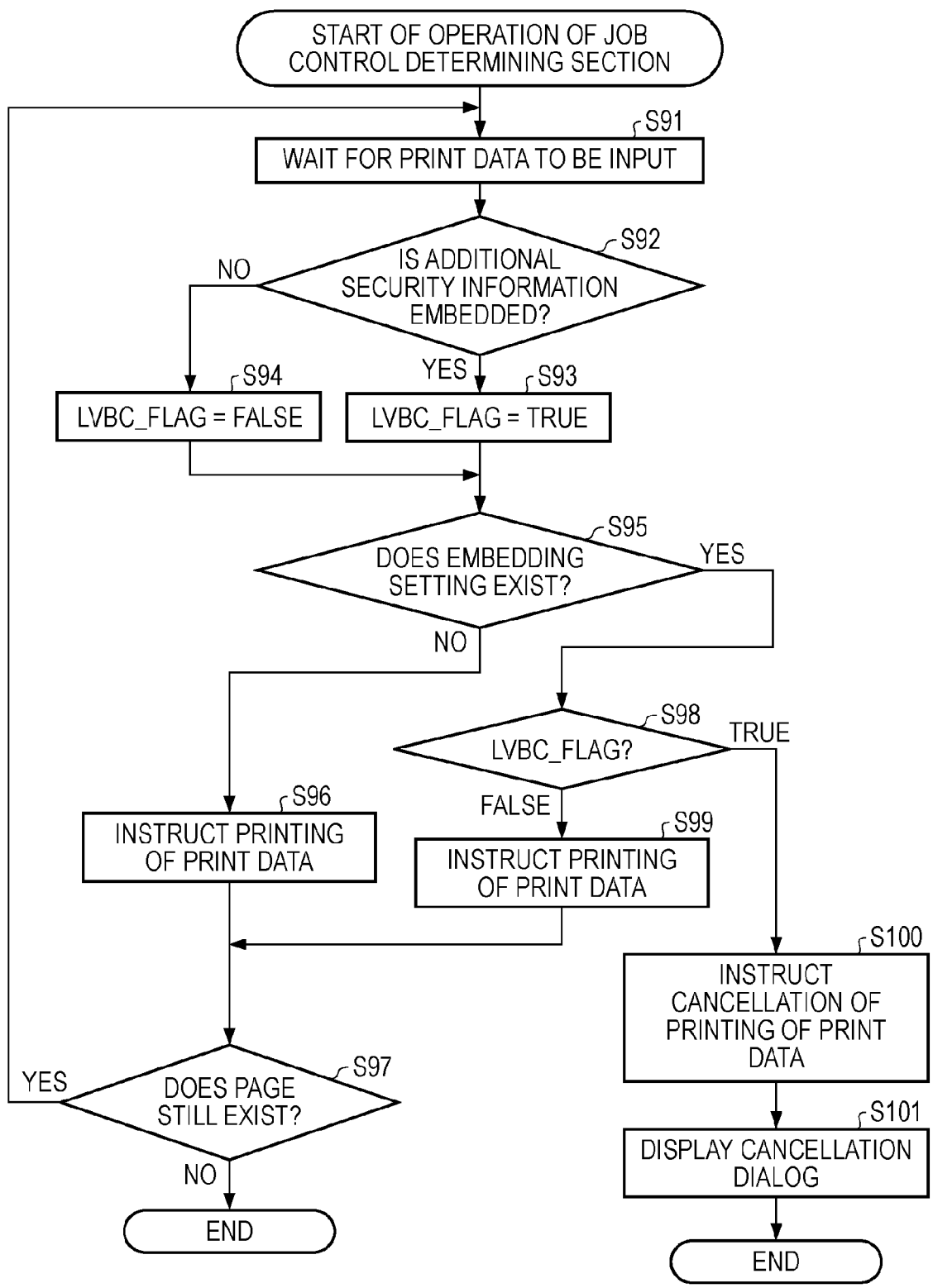
FIG. 46 is a flowchart showing a procedure of an operation performed by a job control determining section 903 during a print job.

In addition, a line 911 extending from a job control determining section 903 to an image processing section 905 is only used in "an operation of the job control determining section in a print job (pattern 2)" and "an operation of the job control determining section in a print job (pattern 3)" to be described later. As in the case of FIG. 41, the image processing section 905 controls the image processing section 905 to or not to perform an information embedding operation according to a determination result of the job control determining section 903. In other case (an operation of the job control determining section in a print job (pattern 1)), the image processing section 905 embeds information in print data according to an additional-security-information embedding setting regardless of the determination result of the job control determining section 903.
[Operation of Job Control Determining Section in Print Job (Pattern 1)]
FIG. 46 is a flowchart showing a procedure of an operation of the job control determining section 903 in a print job. The job control determining section 903 waits for a data receiving section 311 to complete reception of print data (STEP S91).

After the completion of the reception of the print data, the job control determining section 903 determines whether additional security information is embedded in the print data (STEP S92).

If the information is not embedded, the job control determining section 903 sets a flag LVBC_FLAG to FALSE (STEP S94). On the other hand, if the information is embedded, the job control determining section 903 sets the flag LVBC_FLAG to TRUE (STEP S93).

After STEP S93 and S94, the job control determining section 903 determines whether a compulsory information embedding setting, i.e., a compulsory information embedding setting 3304, is selected on an administrator setting dialog (see FIG. 15) (STEP S95).

If the compulsory information embedding setting is not selected, the job control determining section 903 instructs the printing section 314 to print the print data (STEP S96). In the processing at STEP S96, the print instruction can be issued since the additional-security-information embedding setting is not selected at STEP S95 regardless of whether the additional security information has previously been embedded in the printed data.

On the other hand, if the additional-security-information embedding setting is determined to exist at STEP S95, the job control determining section 903 determines whether additional security information has previously embedded in the print data based on the value of the flag LVBC_FLAG (STEP S98). If the flag LVBC_FLAG indicates FALSE, the additional security information has not been embedded. Thus, the job control determining section 903 instructs the printing section 314 to print the print data including the additional security information embedded by the image processing section 905 (STEP S99).

Since the additional security information is not embedded in the print data, the instruction for printing the print data including the additional security information embedded by the image processing section 905 can be issued in the processing of STEP S99.

After STEPs S96 and S99, the job control determining section 903 determines whether following print data exists (STEP S97). If the following print data exists, the job control determining section 903 returns the process to STEP S91 and waits for reception of the following print data to be completed. On the other hand, if the following print data does not exist, the job control determining section 903 terminates this operation.

On the other hand, if the flag LVBC_FLAG is determined to be TRUE at STEP S98 and the additional security information has previously been embedded in the print data, further embedding of additional security information means double-embedding and this has to be prohibited. The job control determining section 903 instructs the printing section 314 to cancel printing of the print data including the additional security information embedded by the image processing section 905 (STEP S100). The job control determining section 903 displays a message indicating cancellation of the job on an operation panel (STEP S101).

The image forming apparatus according to the fourth exemplary embodiment can suppress embedding of new additional security information in print data previously including embedded additional security information. More specifically, when double-embedding of digital data occurs in a print job, the double-embedding operation can be suppressed by canceling the job. This allows a printing operation to be performed without destroying additional security information and convenience of a user improves.

Fifth Exemplary Embodiment

Since configurations of an image forming apparatus and a network printing system according to a fifth exemplary embodiment of the present invention are the same as those of the first exemplary embodiment, a description thereof is omitted by using the same numerals.

[Operation of Job Control Determining Section in Print Job (Pattern 2)]

In the fourth exemplary embodiment, a printing operation is cancelled when double-embedding of additional security information possibly occurs. In the fifth exemplary embodiment, a description will be given for a case where permission or prohibition of a printing operation is decided according to an administrator's setting instead of canceling the printing operation unconditionally when the double-embedding possibly occurs. Here, the administrator's setting for permitting or prohibiting the printing operation when the additional security information is embedded doubly is the same as that described using FIG. 40.

Figure 47:
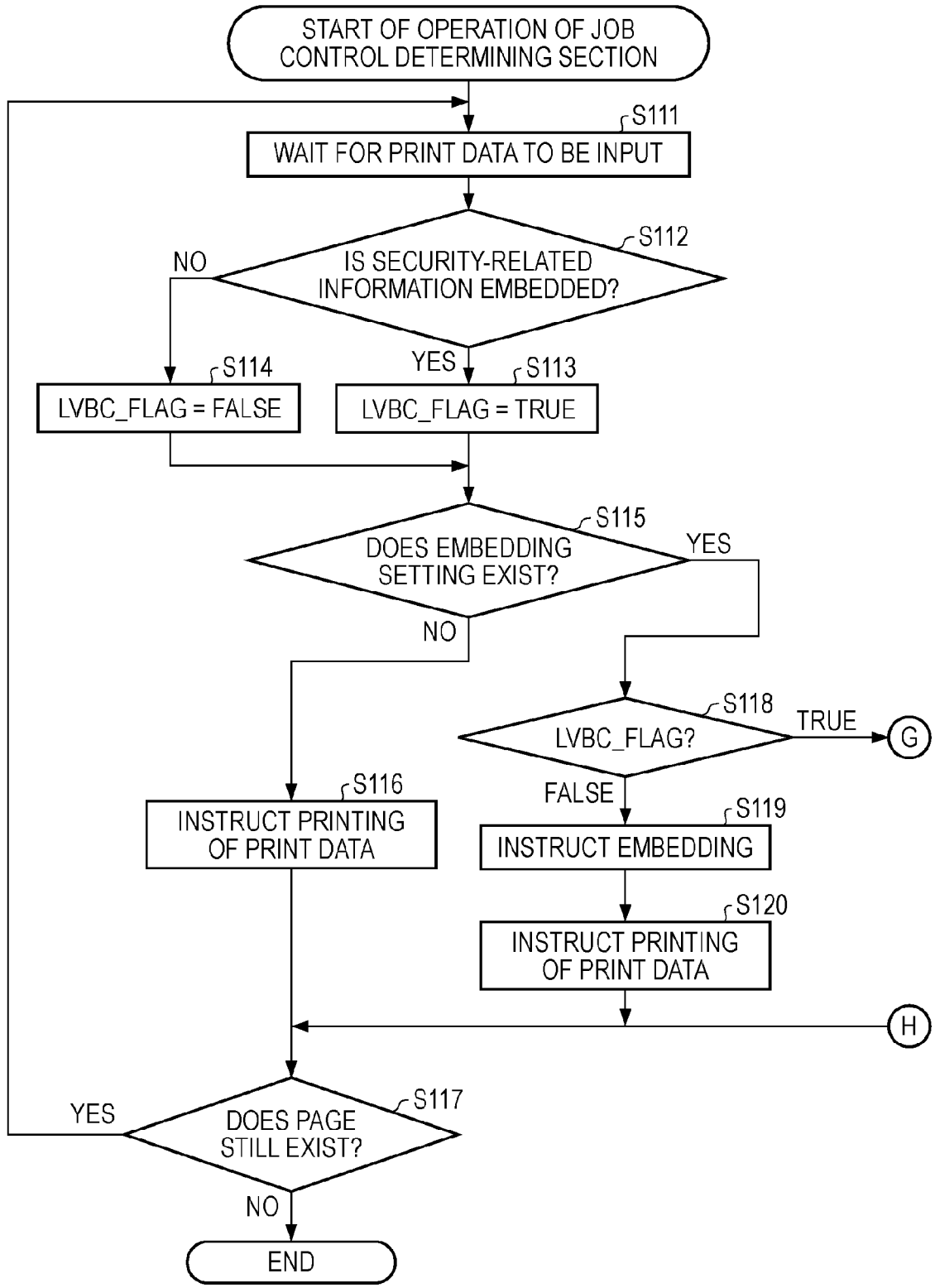
FIG. 47 is a flowchart showing a procedure of an operation performed by a job control determining section 903 according to an administrator setting in accordance with a fifth exemplary embodiment of the present invention.
Figure 48:
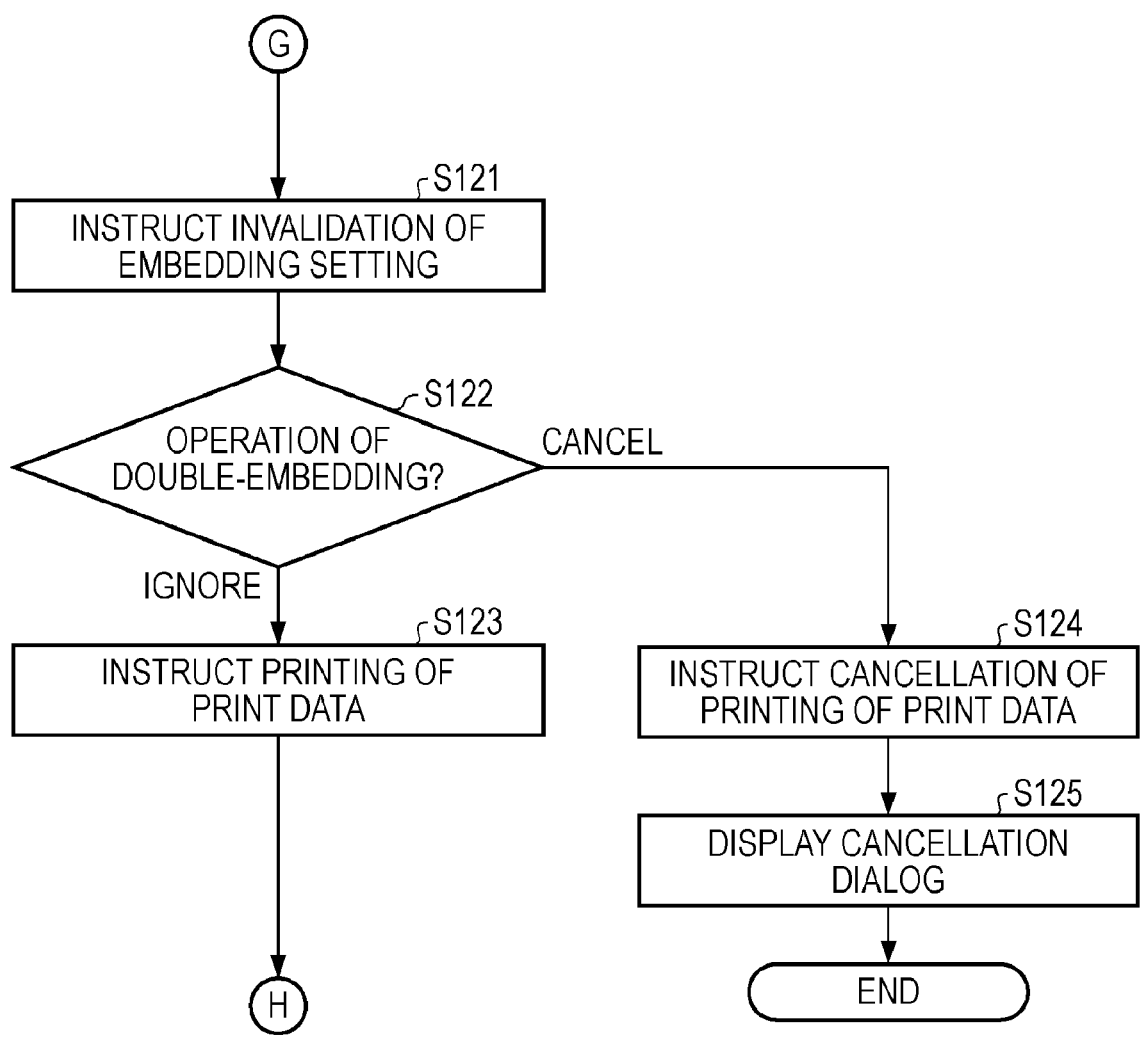
FIG. 48 is a flowchart showing a procedure of an operation performed by a job control determining section 903 according to an administrator setting following a flowchart of FIG. 47.

FIGS. 47 and 48 are flowcharts illustrating a procedure of an operation performed by the job control determining section 903 according to an administrator's setting in accordance with the fifth exemplary embodiment. In this operation, whether to invalidate embedding of additional security information in the print data 3503 previously including embedded additional security information or to cancel a job is controlled according to the administrator's setting of the double-embedding prevention button 3305.

Since processing of STEPs S111 to S118 is the same as that of STEPs S91 to S98 shown in FIG. 46, a description thereof is omitted.

If a flag LVBC_FLAG is determined to be FALSE at STEP S118, the job control determining section 903 instructs an image processing section 905 to embed additional security information since the additional security information has not been embedded (STEP S119). The job control determining section 903 instructs a printing section 314 to print the print data (STEP S120).

On the other hand, if the flag LVBC_FLAG is determined to be TRUE at STEP S118, the job control determining section 903 instructs the image processing section 905 to invalidate the additional-security-information embedding setting (STEP S121). The job control determining section 903 determines the administrator's setting of the double-embedding prevention button 3305 (STEP S122).

If the double-embedding prevention button 3305 is set to "IGNORE", the job control determining section 903 instructs the printing section 314 to print the print data (STEP S123). The print instruction issued at STEP S123 is an instruction for performing the printing operation without embedding the additional security information according to the administrator's setting when the additional security information is embedded doubly. The job control determining section 903 then advances the process to STEP S117.

On the other hand, if the double-embedding prevention button 3305 is set to "CANCEL" at STEP S122, the job control determining section 903 instructs the printing section 314 to cancel the printing operation as in the case of the double-embedding operation shown in FIG. 46 (STEP S124). The job control determining section 903 displays a message indicating cancellation of the job on an operation panel (STEP S125). The job control determining section 903 then terminates this operation.

The image forming apparatus according to the fifth exemplary embodiment can decide permission or prohibition of a printing operation according to an administrator's setting without canceling the printing operation unconditionally even if double-embedding possibly occurs. More specifically, when digital data is embedded doubly in a print job, a double-embedding operation can be suppressed while adjusting tradeoff between trackability and job output by switching contents of the printing operation according to the setting "IGNORE" or "CANCEL".

Sixth Exemplary Embodiment

Since configurations of an image forming apparatus and a network printing system according to a sixth exemplary embodiment of the present invention are the same as those of the first exemplary embodiment, a description thereof is omitted by using the same numerals.

[Operation of Job Control Determining Section in Print Job (Pattern 3)]

In the fifth exemplary embodiment, "IGNORE" for invalidating an embedding setting and "CANCEL" for canceling a job can be set according to an administrator's setting at the time of double-embedding of additional security information. In the sixth exemplary embodiment, a description will be given for a case where a content of additional security information previously embedded in print data is compared with that of additional security information to be embedded and permission or prohibition of a printing operation is decided according to the comparison result. Since the administrator's setting for permitting or prohibiting the print operation when the additional security information is embedded doubly is the same as that described using FIG. 44, a description thereof is omitted here.

Figure 49:
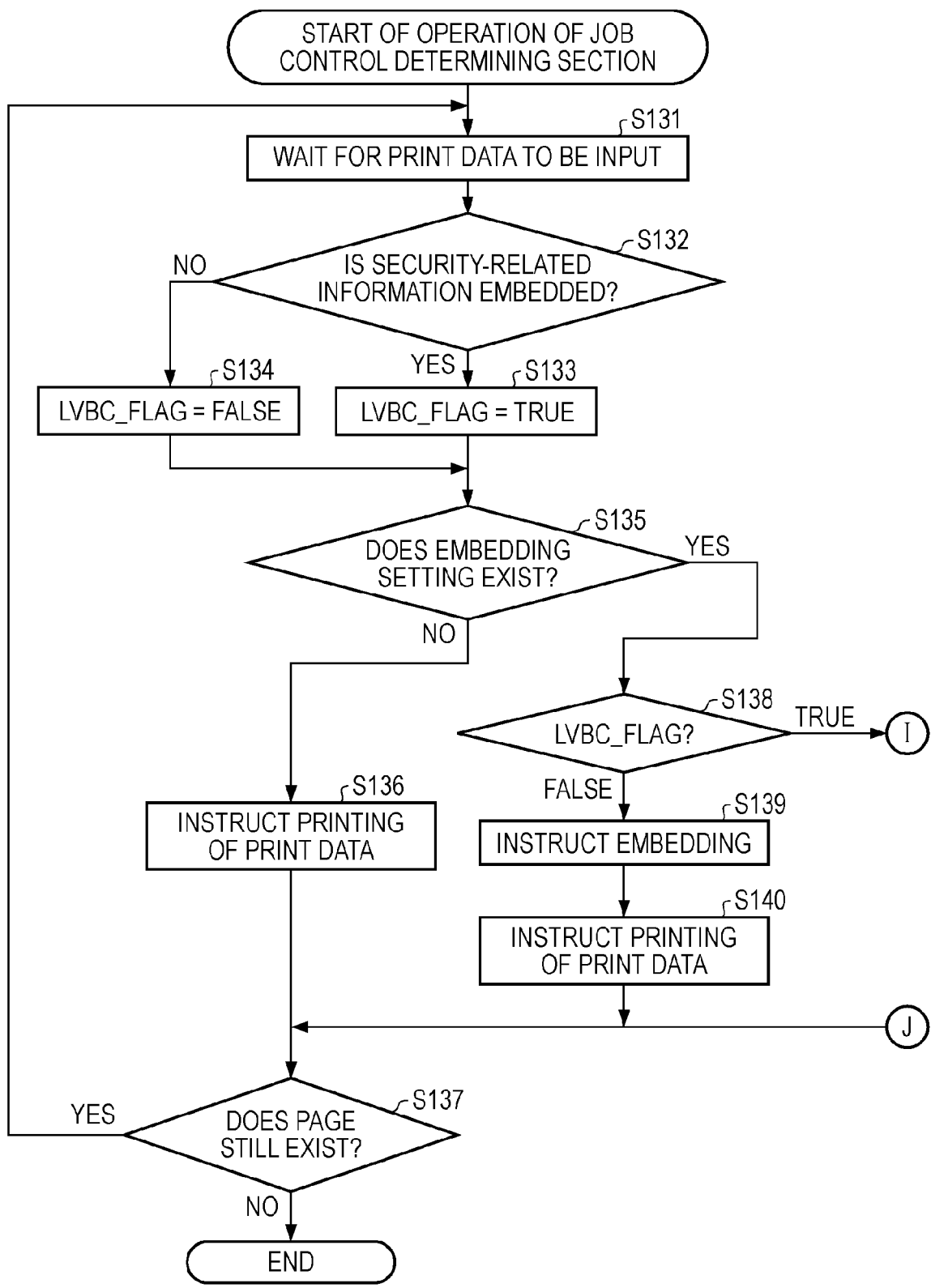
FIG. 49 is a flowchart showing a procedure of an operation performed by a job control determining section 903 according to a result of comparison of contents of additional security information.

FIGS. 49 and 50 are flowchart illustrating a procedure of an operation performed by a job control determining section 903 according to a result of comparison of contents of additional security information. Here, contents of additional security information are compared regarding further embedding of additional security information in the print data 3503 previously including embedded additional security information according to an administrator's setting of a double-embedding prevention button 3305. Whether to invalidate an embedding setting or to cancel a job is then decided. Meanwhile, since processing at STEPs S131 to S140 is the same as that at STEPs S111 to S120 shown in FIGS. 47 and 48, a description thereof is omitted.

If a flag LVBC_FLAG is determined to be TRUE at STEP S138, the job control determining section 903 instructs an image processing section 905 to invalidate an additional-security-information embedding setting (STEP S141). The job control determining section 903 determines the administrator's setting of the double-embedding prevention button 3305 (STEP S142).

If the double-embedding prevention button 3305 is set to "DETERMINE AFTER COMPARING EMBEDDED INFORMATION", the job control determining section 903 performs the following operation. In this case, the job control determining section 903 compares a content of additional security information previously embedded in print data with a content of additional security information to be embedded (STEP S143).

If the contents match, the job control determining section 903 instructs a printing section 314 to print the print data (STEP S144). On the other hand, if the contents of the additional security information do not match at STEP S143, the job control determining section 903 instructs the printing section 314 to cancel the printing operation (STEP S145). The job control determining section 903 displays a message indicating cancellation of the job on an operation panel (STEP S146). The job control determining section 903 then terminates this operation.

In addition, if the double-embedding prevention button 3305 is set to "CANCEL" at STEP S142, the job control determining section 903 instructs the printing section 314 to cancel the printing operation as in the case of the double-embedding operation shown in FIG. 46 (STEP S147). The job control determining section 903 displays a message indicating cancellation of a job on an operation panel (STEP S148). The job control determining section 903 then terminates this operation.

The image forming apparatus according to the sixth exemplary embodiment compares a content of additional security information previously embedded in print data and a content of additional security information to be embedded and can determine whether to permit a printing operation according to the comparison result. More specifically, an operation of doubly embedding digital data can be suppressed by switching kinds of the printing operation according to a result of comparison of embedded digital data with digital data to be embedded in a print job.

The present invention is not limited to the configurations of the above-described exemplary embodiments and can be applied to any given configuration as long as functions disclosed by Claims or functions of the configurations of the exemplary embodiments can be achieved.

For example, although LVBC is used as a coded image of copy restriction information and tracking information embedded in a background image in the exemplary embodiments, the coded image is not limited to the LVBC and may be one-dimensional barcode, two-dimensional barcode such as QR Code®, or digital watermark.

In addition, flowcharts shown in each exemplary embodiment may be executed by a system constituted by a plurality of devices or an apparatus constituted by a single device. In addition, the image forming apparatus includes a facsimile apparatus having a printing function and a multifunctional printer (MFP) having a printing function, a copy function, and a scanner function as well as a printing apparatus. In addition, the printing method is not limited to the electrophotographic method and various printing methods, such as an inkjet method, a thermal transfer method, a thermal method, an electrostatic method, and an electrosensitive method, can be employed.

Additionally, an object of the present invention is achieved by executing the following processing. More specifically, a storage medium having a software program code for realizing the functions of the above-described exemplary embodiments recoded thereon is supplied to the system or the apparatus and a computer (or a CPU and an MPU) included in the system or the apparatus reads out the program code stored on the storage medium.

In this case, the program code read out from the storage medium realizes the functions of the above-described exemplary embodiments and the program code and the storage medium having the program code recorded thereon constitute the present invention.

Types of the storage medium used for supplying the program code include, for example, a floppy disco, a hard disk, a magneto-optical disc, an optical disc such as a CD-ROM, a CD-R, a CD-RW, and a DVD-ROM, a DVD-RAM, a DVD-RW, and a DVD+RW, a magnetic tape, a nonvolatile memory card, and a ROM. In addition, the program code may be downloaded via a network.

In addition, a case where a computer executes the read out program code to realize the functions of the above-described exemplary embodiments is included in the present invention. Additionally, a case where an operating system (OS) operating in the computer executes part of or all of actual processing based on instructions of the program code and the functions of the above-described exemplary embodiments are realized by the processing is also included in the present invention.

Furthermore, a case where the functions of the above-described exemplary embodiments are realized by the following processing is also included in the present invention. More specifically, a program code read out from a storage medium is written in a memory included in a function expansion board inserted into a computer or a function expansion unit connected to the computer. A CPU or the like included in the function expansion board or the function expansion unit executes part of or all of actual processing based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-177634 filed on Jul. 5, 2007, which is hereby incorporated by reference herein in its entirety.

What is claimed is:

1. An apparatus for executing a copy operation having a first setting to add an image that prohibits a document from being copied to a document to create the document prohibited from being copied and a second setting to add an image that permits a document to be copied with an input of correct authentication information to a document to create the document permitted to be copied with an input of correct authentication information, comprising:
   a scanner; and
   a controlling unit to control the apparatus such that when a document having an image that prohibits the document from being copied is placed on the scanner and a user instructs start of a copy operation, not executing the copy operation for the document placed on the scanner, and
   in a case where the first setting is set, the controlling unit controls the apparatus such that when a document having an image that permits the document to be copied with an input of correct authentication information is placed on the scanner and a user instructs start of a copy operation, not executing the copy operation for the document placed on the scanner, and
   in a case where neither the first setting nor the second setting is set, the controlling unit controls the apparatus such that when the document having an image that permits the document to be copied with the input of correct authentication information is placed on the scanner and a user instructs start of the copy operation, executing the copy operation for the document placed on the scanner subject to the input of correct authentication information by a user.

2. The apparatus according to claim 1, wherein
   when the document permitted to be copied with the input of correct authentication information is placed on the scanner and a user instructs start of a copy operation,
   further executing the copy operation without adding the image that permits a document to be copied with an input of correct authentication information for the document placed on the scanner that is permitted to be copied with the input of correct authentication information, subject to the input of correct authentication information by a user, in a case where the second setting is set.

3. The apparatus according to claim 1, wherein the copy operation for the document, subject to the input of correct authentication information, comprises:
   scanning the document on the scanner;
   displaying a screen for a user to input authentication information; and
   printing a scanned image when authentication information input by a user is correct, and not printing a scanned image when authentication information input by a user is incorrect.

4. The apparatus according to claim 1, wherein each of the image added to the document to create the document prohibited from being copied and the image added to the document to create the document permitted to be copied with the input of correct authentication information is a coded image.

5. An apparatus for executing a copy operation, having a first setting to add an image that prohibits the document from being copied to a document to create the document prohibited from being copied and a second setting to add an image that permits the document to be copied with an input of correct authentication information to a document to create the document permitted to be copied with an input of correct authentication information, comprising:
   a scanner;
   a determination unit configured to determine if the obtained image contains an image that permits copy of the document with an input of correct authentication information; and
   a controlling unit configured to control the apparatus such that, when a document having an image that prohibits the document from being copied is placed on the scanner and a user instructs start of a copy operation and the determination unit determines the obtained image contains the image that permits copy of the document with an input of correct authentication information, not executing the copy operation for the document placed on the scanner, and
   in a case where the first setting is set, the controlling unit controls the apparatus such that when a document having an image that permits the document to be copied with an input of correct authentication information is placed on the scanner and a user instructs start of a copy operation, the determination unit determines the obtained image contains the image that permits copy of the document with an input of correct authentication information, executing the copy operation without adding the image that prohibits the document from being copied to the document placed on the scanner, subject to the input of correct authentication information by a user, and
   in a case where neither the first nor the second setting is set, the controlling unit controls the apparatus such that when the document having an image that permits the document to be copied with the input of correct authentication information is placed on the scanner and a user instructs start of a copy operation, executing the copy operation for the document placed on the scanner subject to the input of correct authentication information by a user.

6. An apparatus for executing a copy operation, comprising:
   a reading unit configured to read a document to obtain an image;
   a setting unit configured to set a setting to add an image indicating copy prohibition to the obtained image; and
   a controlling unit to control an image data process in which, in a case where a document having an image that permits copy of the document with an input of correct authentication information is read by the reading unit and the setting is not set by the setting unit, the image obtained by the reading unit is copied subject to the input of correct authentication information, and
   wherein in a case where a document having an image that permits copy of the document with an input of correct authentication information is read by the reading unit and the setting is set by the setting unit, the image obtained by the reading unit is not copied.

7. The apparatus according to claim 6, a setting unit is further configured to set a print control setting to set to print or not to print in case where a document having an image that permits copy of the document with an input of correct authentication is read by the reading unit and the setting is set by the setting unit, and
   in a case where a document having an image that permits copy of the document with an input of correct authentication is read by the reading unit and the setting is set by the setting unit and the print control setting is set not to print, the image obtained by the reading unit is not printed;
   wherein in a case where a document having an image that permits copy of the document with an input of correct authentication is read by the reading unit and the setting is set by the setting unit and the print control setting is set to print, the image obtained by the reading unit is printed subject to the input of correct authentication information without adding the image indicating copy prohibition to the obtained image.

8. An apparatus for executing a copy operation, comprising:
   a reading unit configured to read a document to obtain an image;
   a setting unit configured to set a setting to add an image indicating copy prohibition to the obtained image
   a determination unit configured to determine if the obtained image contains an image that permits copy of the document with an input of correct authentication information; and
   a controlling unit configured to control an image data process in which, in a case where a document having an image that permits copy of the document with an input of correct authentication information is read by the reading unit, the determination unit determines the obtained image contains the image that permits copy of the document with an input of correct authentication information, and the setting is not set by the setting unit, the image obtained by the reading unit is copied subject to the input of correct authentication information, and
   in a case where a document having an image that permits copy of the document with an input of correct authentication information is read by the reading unit, the determination unit determines the obtained image contains the image that permits copy of the document with an input of correct authentication information, and the setting is set by the setting unit, the image obtained by the reading unit is copied subject to the input of correct authentication information without adding the image indicating copy prohibition to the obtained image.

9. A method performed by an apparatus for executing a copy operation to control copying of a document, comprising:
   setting a first setting and a second setting, wherein the first setting is set to add a image that prohibits a document from being copied to a document to create the document prohibited from being copied and the second setting is set to add a image that permits a document to be copied with an input of correct authentication information to a document to create the document permitted to be copied with an input of correct authentication information; and controlling a controlling unit of the apparatus such that when a document having an image that prohibits the document from being copied is placed on a scanner and a user instructs start of a copy operation, not executing the copy operation for the document placed on the scanner, and in a case where the first setting is set, the controlling unit controls the apparatus such that when a document having an image that permits the document to be copied with an input of correct authentication information is placed on the scanner and a user instructs start of a copy operation, not executing the copy operation for the document placed on the scanner in a case where neither of the first setting and the second setting is set, the controlling unit controls the apparatus such that when the document having an image that permits the document to be with the input of correct authentication information is placed on the scanner and a user instructs start of the copy operation, executing the copy operation for the document placed on the scanner subject to the input of correct authentication information by a user.

10. The method according to claim 9, further comprising the steps of:

obtaining start of a copy operation from a user; and feeding the document permitted to be copied with the input of correct authentication information on the scanner; and further executing the copy operation without adding the image that permits the document to be copied with the input of correct authentication information for the document placed on the scanner that is permitted to be copied with the input of correct authentication information, subject to the input of correct authentication information by a user, in a case where the second setting is set.

11. The method according to claim 9, wherein the copy operation for the document, subject to the input of correct authentication information, comprises:

scanning the document on the scanner;

displaying a screen for a user to input authentication information; and printing a scanned image when authentication information input by a user is correct, and not printing a scanned image when authentication information input by a user is incorrect.

12. The method according to claim 9, wherein each of the image added to the document to create the document prohibited from being copied and the image added to the document to create the document permitted to be copied with the input of correct authentication information is a coded image.

13. A method performed by an apparatus to control copying of a document, comprising:

setting a first setting to add an image that prohibits a document from being copied to a document to create the document prohibited from being copied and a second setting to add a image that permits a document to be copied with an input of correct authentication information to create the document permitted to be copied with an input of correct authentication information;

determining if the obtained image contains an image that permits copy of the document with an input of correct authentication information; and controlling the apparatus with a controlling unit such that, when a document having an image that prohibits the document from being copied is placed on a scanner and a user instructs start of a copy operation and it is determined that the obtained image contains the image that permits copy of the document with an input of correct authentication information, not executing the copy operation for the document placed on the scanner, and in a case where the first setting is set, causing the controlling unit to control the apparatus such that when a document having an image that permits the document to be copied with an input of correct authentication information is placed on the scanner and a user instructs start of a copy operation, and it is determined that the obtained image contains the image that permits copy of the document with an input of correct authentication information, executing the copy operation without adding the image that prohibits the document from being copied for the document placed on the scanner, subject to the input of correct authentication information by a user, and in a case where neither the first nor the second setting is set, causing the controlling unit to control the apparatus such that when the document having an image that permits the document to be copied with the input of correct authentication information is placed on the scanner and a user instructs start of a copy operation, executing the copy operation for the document placed on the scanner, subject to the input of correct authentication information by a user.

14. A method of copying a document performed by an apparatus, comprising:

controlling a reading unit configured to read a document to obtain an image;

setting a setting to add an image indicating copy prohibition to the obtained image controlling an image data process in which, in a case where a document having an image that permits copy of the document with an input of correct authentication information is read by the reading unit and the setting is not set, the image obtained by the reading unit is copied subject to the input of correct authentication information, and in a case where a document having an image that permits copy of the document with an input of correct authentication information is read by the reading unit and the setting is set, the image obtained by the reading unit is not copied.

15. The method according to claim 14, the setting further sets a print control setting to set to print or not to print in case where a document having an image that permits copy of the document with an input of correct authentication is read by the reading unit and the setting is set, wherein in a case where a having an image that permits copy of the document with an input of correct authentication is read by the reading unit and the setting is set and the print control setting is set not to print, the image obtained by the reading unit is not printed and in a case where a document having an image that permits copy of the document with an input of correct authentication is read by the reading unit and the setting is set and the print control setting is set to print, the image obtained by the reading unit is printed subject to the input of correct authentication information without adding the image indicating copy prohibition to the obtained image.

16. A method of copying a document performed by an apparatus, comprising:

controlling a reading unit to read a document to obtain an image; and setting a setting to add an image indicating copy prohibition to the obtained image;

determining if the obtained image contains an image that permits copy of the document with an input of correct authentication information; and causing a controlling unit configured to control an image data process in which in a case where a document having an image that permits copy of the document with an input of correct authentication information is read by the reading unit and the setting is not set by the setting unit, it is determined that the obtained image contains the image that permits copy of the document with an input of correct authentication information, the image obtained by the reading unit is copied subject to the input of correct authentication information, and in a case where a document having an image that permits copy of the document with an input of correct authentication information is read by the reading unit and the setting is set by the setting unit, it is determined that the obtained image contains the image that permits copy of the document with an input of correct authentication information, the image obtained by the reading unit is copied subject to the input of correct authentication information without adding the image indicating copy prohibition to the obtained image.

17. A non-transitory computer-readable storage medium, that stores a program causing an apparatus to execute a print control method, the method comprising:

setting a first setting and a second setting, wherein the first setting is set to add an image that prohibits a document from being copied to a document to create a document prohibited from being copied and the second setting is set to add an image that permits a document to be copied with an input of correct authentication information to a document to create the document permitted to be copied with an input of correct authentication information; and controlling a controlling unit of the apparatus such that when a document having an image that prohibits the document from being copied is placed on a scanner and a user instructs start of a copy operation, not executing the copy operation for the document placed on the scanner, and in a case where the first setting is set, causing the controlling unit to control the apparatus such that when a document having an image that permits the document to be copied with an input of correct authentication information is placed on the scanner and a user instructs start of a copy operation, not executing the copy operation for the document placed on the scanner, and in a case where neither the first setting nor the second setting is set, causing the controlling unit to control the apparatus such that when the document having an image that permits the document to be copied with the input of correct authentication information is placed on the scanner and a user instructs start of the copy operation, executing the copy operation for the document placed on the scanner, subject to the input of correct authentication information by a user.

18. A non-transitory a computer-readable storage medium, that stores a program causing an apparatus to execute a print control method, the method comprising:

setting a first setting to add an image that prohibits a document from being copied to a document to create a document prohibited from being copied and a second setting to add an image that permits a document to be copied with an input of correct authentication information to a document to create the document permitted to be copied with an input of correct authentication information;

determining if the obtained image contains an image that permits copy of the document with an input of correct authentication information; and controlling the apparatus with a controlling unit such that, when a document having an image that prohibits the document from being copied is placed on a scanner and a user instructs start of a copy operation and it is determined that the obtained image contains the image that permits copy of the document with an input of correct authentication information, not executing the copy operation for the document placed on the scanner, and in a case where the first setting is set, the controlling unit controls the apparatus such that when a document having an image that permits the document to be copied with an input of correct authentication information is placed on the scanner and a user instructs start of a copy operation, it is determined that the obtained image contains the image that permits copy of the document with an input of correct authentication information, executing the copy operation without adding the image that prohibits the document from being copied for the document placed on the scanner, subject to the input of correct authentication information by a user, and in a case where neither the first nor the second setting is set, the controlling unit controls the apparatus such that when the document having an image that permits the document to be copied with the input of correct authentication information is placed on the scanner and a user instructs start of a copy operation, executing the copy operation for the document placed on the scanner, subject to the input of correct authentication information by a user.

19. A non-transitory computer-readable storage medium, that stores a program causing an apparatus to execute a print control method, the method comprising:

controlling a reading unit to read a document to obtain an image; and setting a setting to add an image indicating copy prohibition to the obtained image, and controlling an image data process in which, in a case where a document having an image that permits copy of the document with an input of correct authentication information is read by the reading unit and the setting is not set, the image obtained by the reading unit is copied subject to the input of correct authentication information, and wherein in a case where a document having an image that permits copy of the document with an input of correct authentication information is read by the reading unit and the setting is set, the image obtained by the reading unit is not copied.

20. A non-transitory computer-readable storage medium that stores a program, causing an apparatus to execute a print control method, the method comprising:

controlling a reading unit to read a document to obtain an image; and setting a setting to add an image indicating copy prohibition to the obtained image;

determining if the obtained image contains an image that permits copy of the document with an input of correct authentication information; and controlling an image data process in which, in a case where a document having an image that permits copy of the document with an input of correct authentication information is read by the reading unit and the setting is not set, it is determined that the obtained image contains the image that permits copy of the document with an input of correct authentication information, the image data obtained by the reading unit is copied subject to the input of correct authentication information, and in a case where a document having an image that permits copy of the document with an input of correct authentication is read by the reading unit and the setting is set, it is determined that the obtained image contains the image that permits copy of the document with an input of correct authentication information, the image obtained by the reading unit is copied subject to the input of correct authentication information without adding the image indicating copy prohibition to the obtained image.

21. A network printing system for controlling the copying of a document, the system comprising:

a client processor unit;

a print server; and an apparatus having a first setting to add an image that prohibits a document from being copied to a document to create the document prohibited from being copied and a second setting to add an image that permits a document to be copied with an input of correct authentication information to a document to create the document permitted to be copied with an input of correct authentication information, comprising;

a scanner; and a controlling unit to control the apparatus such that when a document having an image that prohibits the document from being copied is placed on the scanner and a user instructs start of a copy operation, not executing the copy operation for the document placed on the scanner that is prohibited from being copied, and in a case where the first setting is set, the controlling unit controls the apparatus such that when a document having an image that permits the document to be copied with an input of correct authentication information is placed on the scanner and a user instructs start of a copy operation, not executing the copy operation for the document placed on the scanner, and in a case where neither of the first setting and the second setting is set, the controlling unit controls the apparatus such that when the document having an image that permits the document to be copied with the input of correct authentication information is placed on the scanner and a user instructs start of the copy operation, executing the copy operation for the document, subject to the input of correct authentication information by a user.

22. The system according to claim 21, wherein when the document permitted to be copied with the input of correct authentication information is placed on the scanner and a user instructs start of a copy operation, further executing the copy operation without adding the image that permits the document to be copied with an input of correct authentication information for the document placed on the scanner that is permitted to be copied with the input of correct authentication information, subject to the input of correct authentication information by a user, in a case where the second setting is set.

23. The system according to claim 21, wherein the copy operation for the document, subject to the input of correct authentication information, comprises:

scanning the document on the scanner;

displaying a screen for a user to input authentication information; and printing a scanned image when authentication information input by a user is correct, and not printing a scanned image when authentication information input by a user is incorrect.

24. The system according to claim 21, wherein each of the image added to the document to create the document prohibited from being copied and the image added to the document to create the document permitted to be copied with the input of correct authentication information is a coded image.

25. A network printing system for controlling the copying of a document, the system comprising:

a client processor unit;

a print server; and an apparatus having a first setting to add an image that prohibits a document from being copied to a document to create the document prohibited from being copied and a second setting to add an image that permits a document to be copied with an input of correct authentication information to a document to create the document permitted to be copied with an input of correct authentication information, comprising;

a scanner;

a determination unit configured to determine if the obtained image contains an image that permits copy of the document with an input of correct authentication information; and a controlling unit configured to control the apparatus such that, when a document having an image that prohibits the document from being copied is placed on the scanner and a user instructs start of a copy operation and the determination unit determines the obtained image contains the image that permits copy of the document with an input of correct authentication information, not executing the copy operation for the document placed on the scanner that is prohibited from being copied, and in a case where the first setting is set, the controlling unit controls the apparatus such that when a document having an image that permits the document to be copied with an input of correct authentication information is placed on the scanner and a user instructs start of a copy operation, the determination unit determines the obtained image contains the image that permits copy of the document with an input of correct authentication information, executing the copy operation without adding the image that prohibits the document from being copied to the document placed on the scanner, subject to the input of correct authentication information by a user, and in a case where neither of the first setting and the second setting is set, the controlling unit controls the apparatus such that when the document having an image that permits the document to be copied with the input of correct authentication information is placed on the scanner and a user instructs start of the copy operation, executing the copy operation for the document, subject to an input of correct authentication information by a user.

26. A network printing system for controlling the copying of a document, the system comprising:

a client processor unit;

a print server; and an apparatus, the apparatus comprising;

a reading unit configured to read a document to obtain an image;

a setting unit configured to set a setting to add an image indicating copy prohibition to the obtained image; and a controlling unit to control an image data process in which, in a case where a document having an image that permits copy of the document with an input of correct authentication information is read by the reading unit and the setting is not set by the setting unit, the image obtained by the reading unit is copied subject to the input of correct authentication information, and wherein in a case where a document having an image that permits copy of the document with an input of correct authentication information is read by the reading unit and the setting is set by the setting unit, the image obtained by the reading unit is not copied.

27. A network printing system for controlling the copying of a document, the system comprising:

a client processor unit;

a print server;

an apparatus, the apparatus comprising;

a reading unit configured to read a document having a first image;

a setting unit configured to set a setting to add an image indicating copy prohibition to the obtained image;

a determination unit configured to determine if the obtained image contains an image that permits copy of the document with an input of correct authentication information; and a controlling unit configured to control an image data process in which, in a case where a document having an image that permits copy of the document with an input of correct authentication information is read by the reading unit, the determination unit determines the obtained image contains the image that permits copy of the document with an input of correct authentication information, and the setting is not set by the setting unit, the image obtained by the reading unit is copied subject to the input of correct authentication information, and in a case where a document having an image that permits copy of the document with an input of correct authentication is read by the reading unit, the determination unit determines the obtained image contains the image that permits copy of the document with an input of correct authentication information, and the setting is set by the setting unit, the image obtained by the reading unit is copied subject to the input of correct authentication information without adding the image indicating copy prohibition to the obtained image.

* * * * *